US010946567B2

(12) United States Patent
Katzin et al.

(10) Patent No.: US 10,946,567 B2
(45) Date of Patent: Mar. 16, 2021

(54) APPARATUS AND METHOD OF FORMING CONNECTORS BRACKETS FOR IRRIGATION LATERALS ALONG AN ALREADY MADE LAY-FLAT PIPE

(71) Applicants: RIVULIS PLASTRO LTD., Kibbutz Gvat (IL); Tal Ben-Dor, Kibbutz Lotem (IL)

(72) Inventors: Asaf Katzin, Kibbutz Gvat (IL); Dotan Shmueli, Kibbutz Sarid (IL); Rimon Ben-Dor, Kibbutz Lotem (IL)

(73) Assignee: Rivulis Plastro Ltd., Kibbutz Gvat (IL)

( * ) Notice: Subject to any disclaimer, the term of this patent is extended or adjusted under 35 U.S.C. 154(b) by 322 days.

(21) Appl. No.: 15/575,081

(22) PCT Filed: May 10, 2016

(86) PCT No.: PCT/IL2016/050492
§ 371 (c)(1),
(2) Date: Nov. 17, 2017

(87) PCT Pub. No.: WO2016/185461
PCT Pub. Date: Nov. 24, 2016

(65) Prior Publication Data
US 2018/0154561 A1 Jun. 7, 2018

(30) Foreign Application Priority Data

May 17, 2015 (IL) .......................................... 238861

(51) Int. Cl.
*B29C 45/14* (2006.01)
*A01G 25/02* (2006.01)
(Continued)

(52) U.S. Cl.
CPC ........ *B29C 45/14344* (2013.01); *A01G 25/02* (2013.01); *A01G 25/026* (2013.01);
(Continued)

(58) Field of Classification Search
CPC .................. A01G 25/02; A01G 25/026; B29C 45/14344; B05B 1/20; F16L 31/02
See application file for complete search history.

(56) References Cited

U.S. PATENT DOCUMENTS 4,473,525 A   9/1984   Drori
4,702,787 A   10/1987  Ruskin
(Continued)

FOREIGN PATENT DOCUMENTS

CN   1272039 A   11/2000
CN   1925739 A   3/2007
(Continued)

*Primary Examiner* — Alison L Hindenlang
*Assistant Examiner* — Alexander A Wang
(74) *Attorney, Agent, or Firm* — Rodney J. Fuller; Booth Udall Fuller, PLC

(57) ABSTRACT

Apparatus and method of forming connector brackets for irrigation laterals along a prefabricated lay-flat pipe and lay-flat pipe with such connector's brackets, wherein an opening is formed at one wall of the premanufactured pipe, a separation means is positioned inside the pipe opposite the opening while separating the one wall from the second wall of the pipe, and an injunction molding is performed into a mold cavity, in order to form the bracket affixed to the one wall of the prefabricated pipe and around the opening.

13 Claims, 42 Drawing Sheets

(51) Int. Cl.
  *B05B 1/20* (2006.01)
  *F16L 41/08* (2006.01)
  *B29L 23/00* (2006.01)
  *F16L 41/10* (2006.01)

(52) U.S. Cl.
  CPC .......... *B05B 1/20* (2013.01); *B29C 45/14598* (2013.01); *F16L 41/082* (2013.01); *B29C 2045/1436* (2013.01); *B29L 2023/005* (2013.01); *F16L 41/10* (2013.01)

(56) References Cited

U.S. PATENT DOCUMENTS

| | | | |
|---|---|---|---|
| 5,163,622 | A | 11/1992 | Cohen |
| 6,251,325 | B1 * | 6/2001 | Karlsson ........... B29C 45/14344 264/266 |
| 8,672,240 | B2 | 3/2014 | Masarwa |
| 2003/0201345 | A1 | 10/2003 | Jeong |
| 2007/0228725 | A1 | 10/2007 | Campau |
| 2009/0035501 | A1 | 2/2009 | Wallace |

FOREIGN PATENT DOCUMENTS

| | | |
|---|---|---|
| EP | 0284570 | 9/1988 |
| GB | 1023886 | 3/1966 |
| GB | 2187662 | 9/1987 |
| IL | 174875 | 2/2014 |
| RU | 2371911 C2 | 11/2009 |

\* cited by examiner

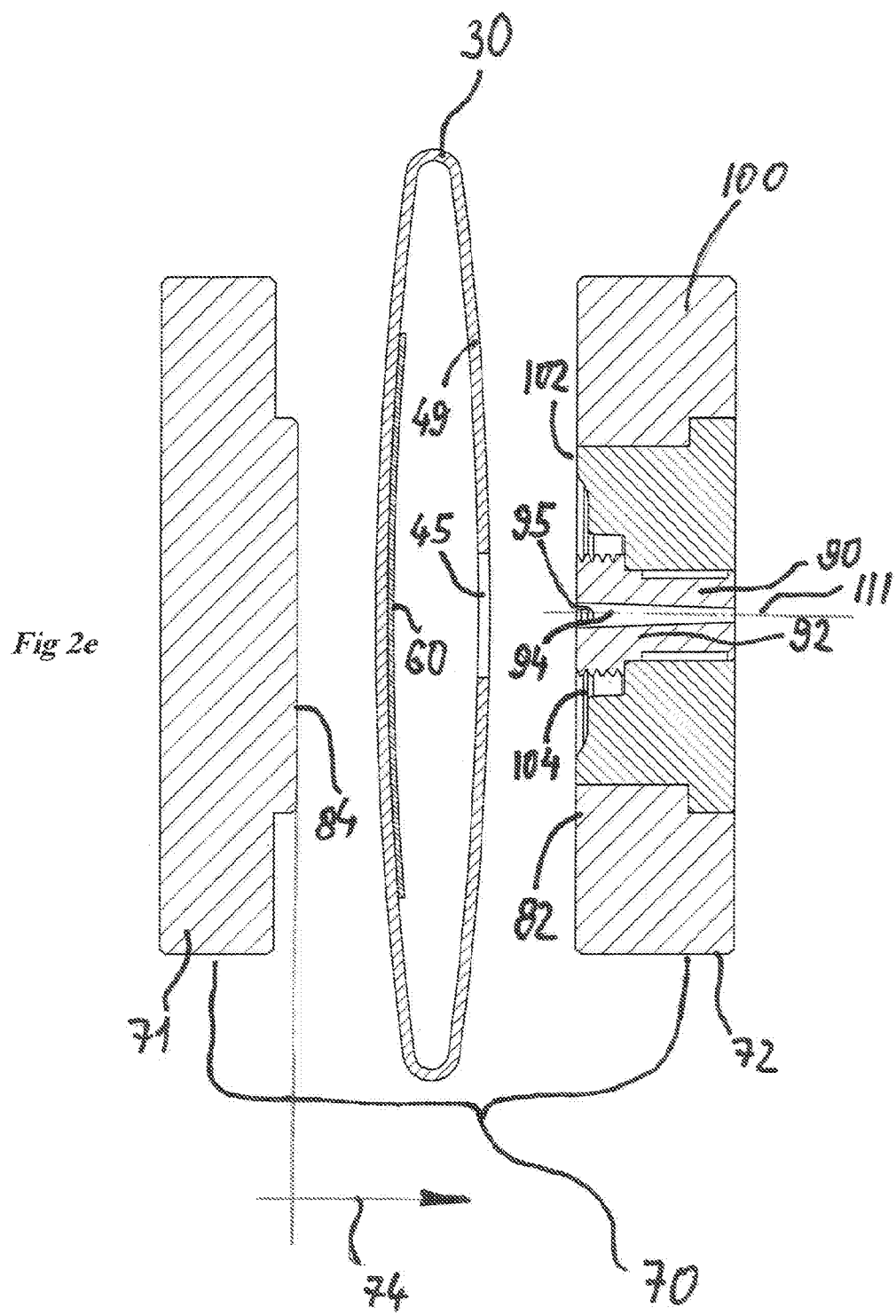

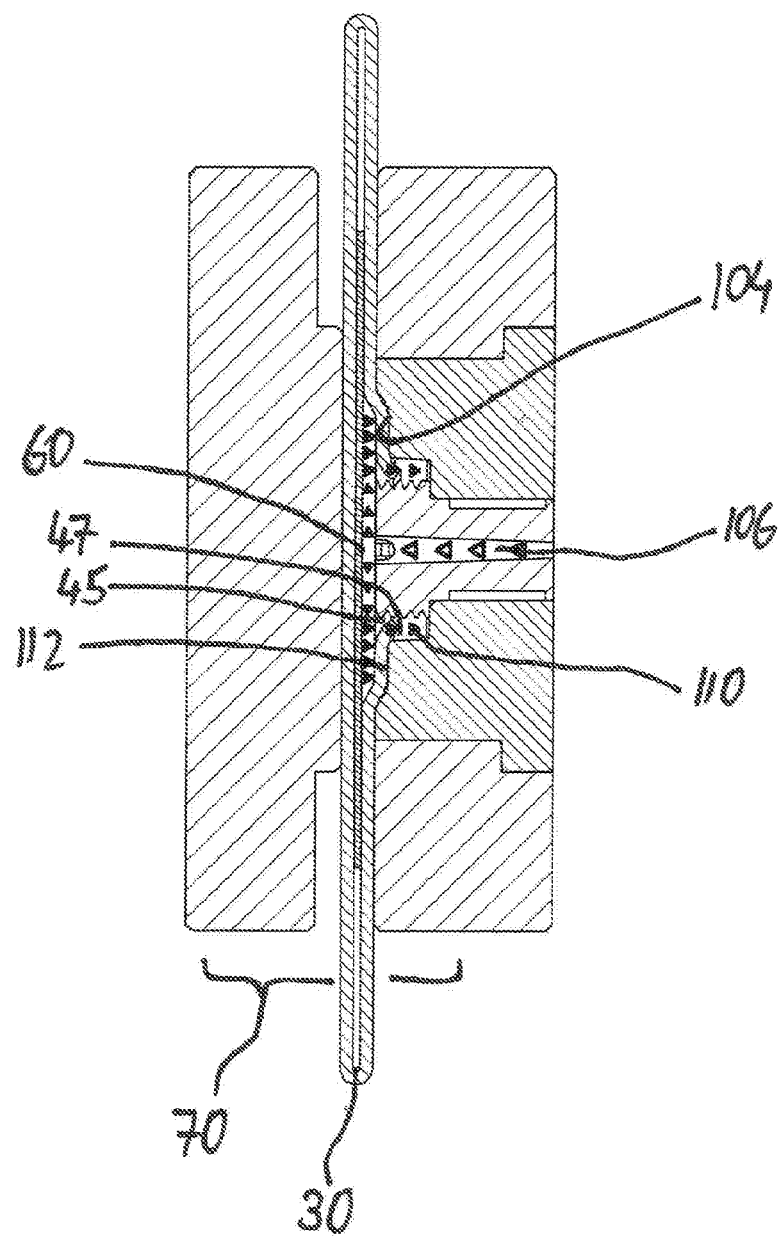

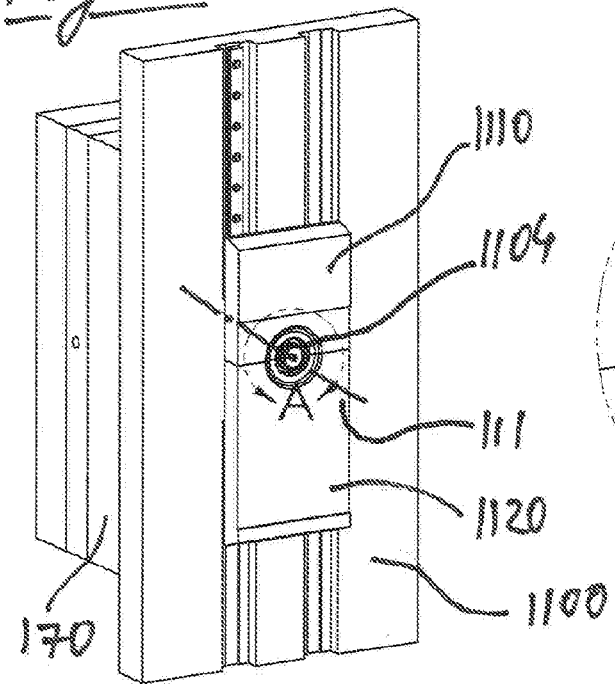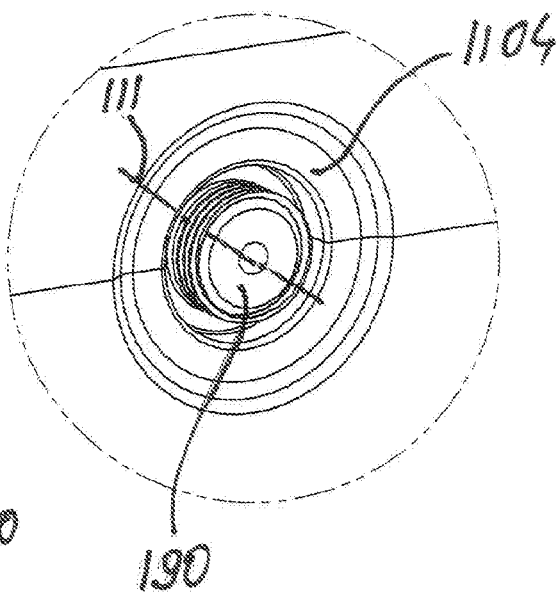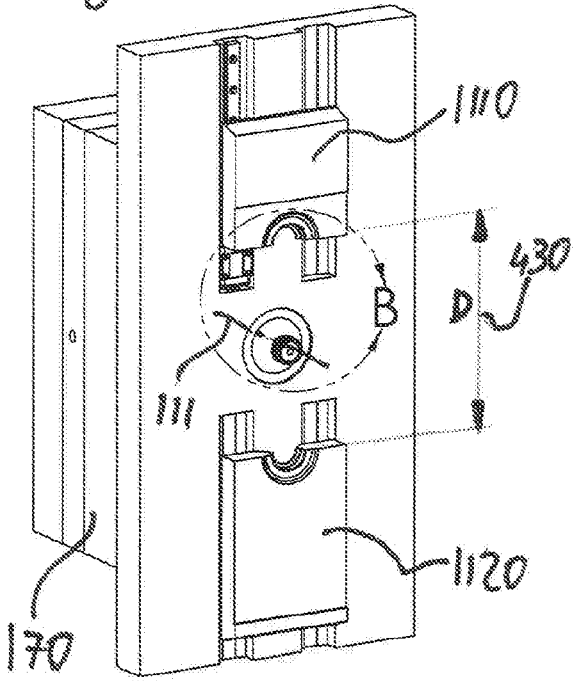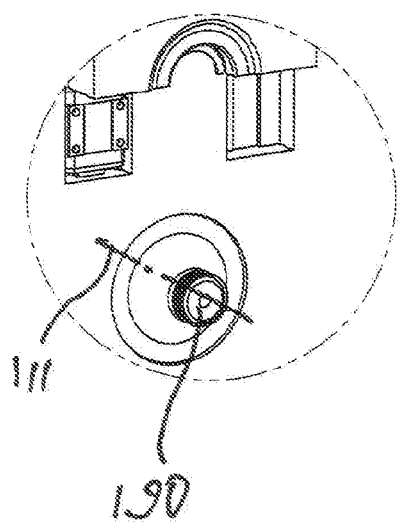

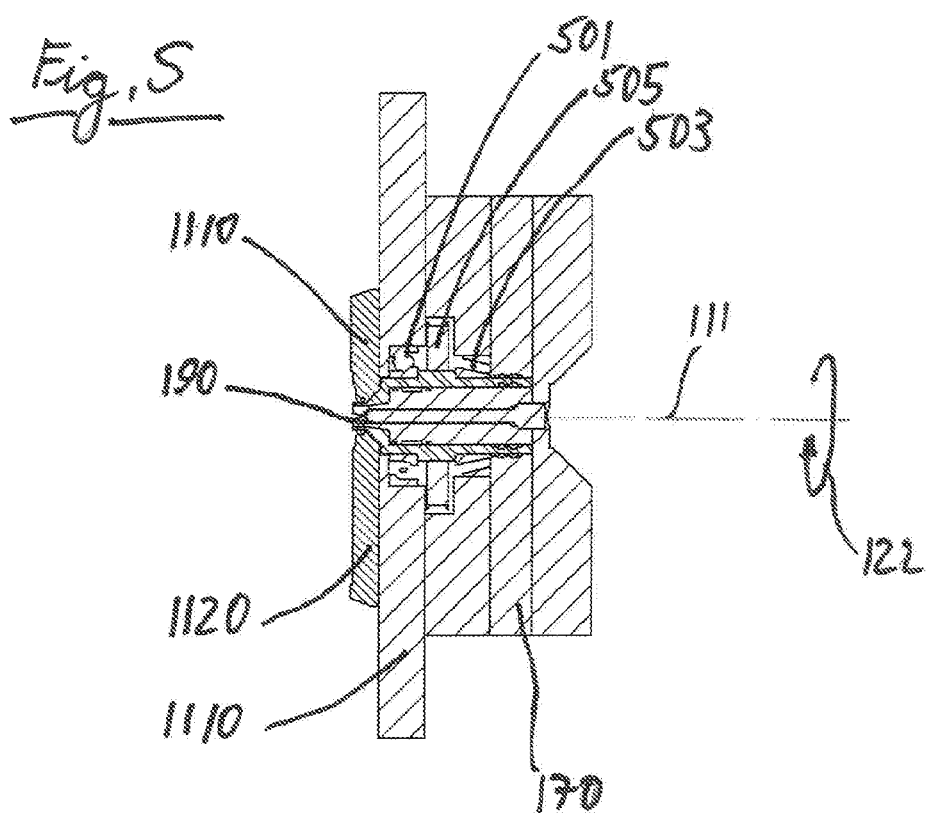
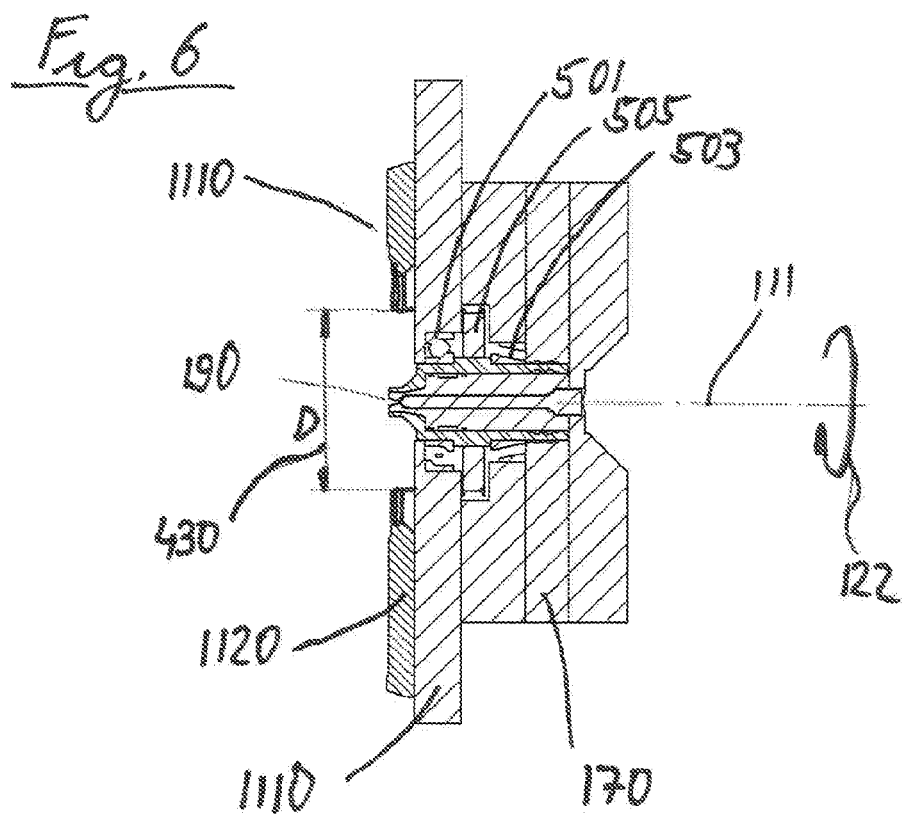

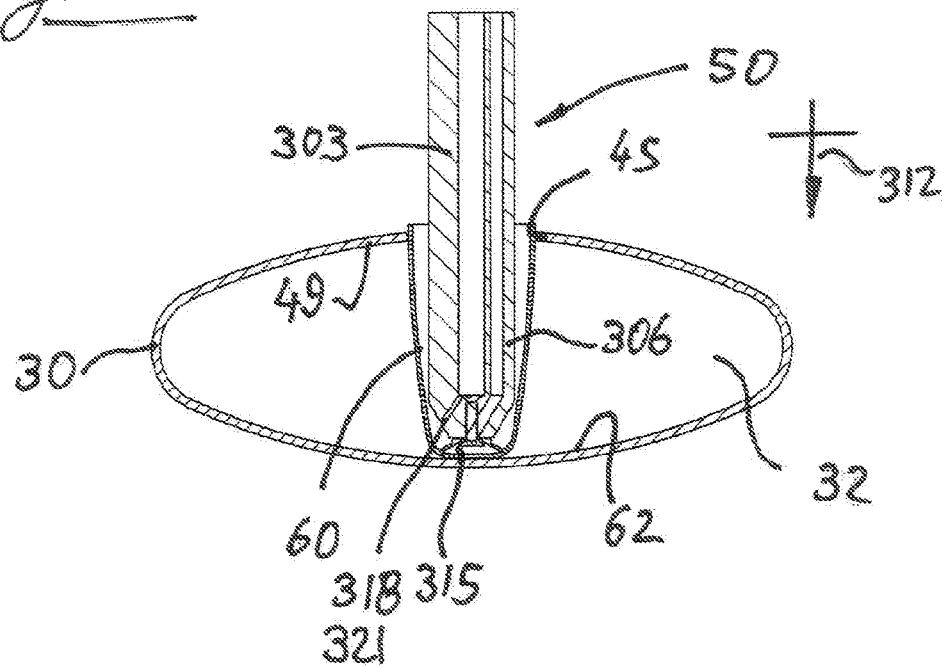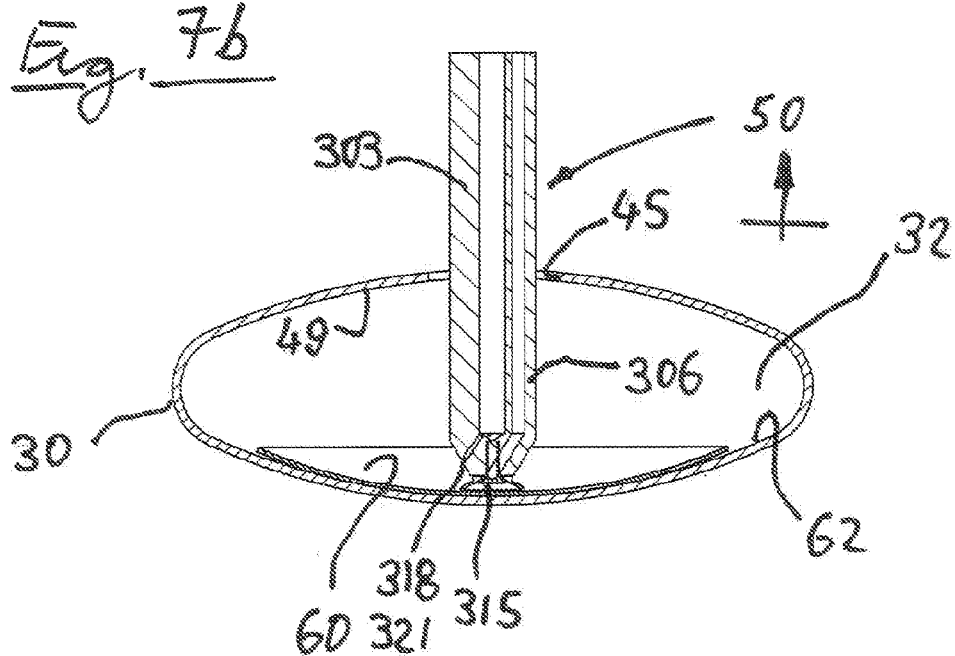

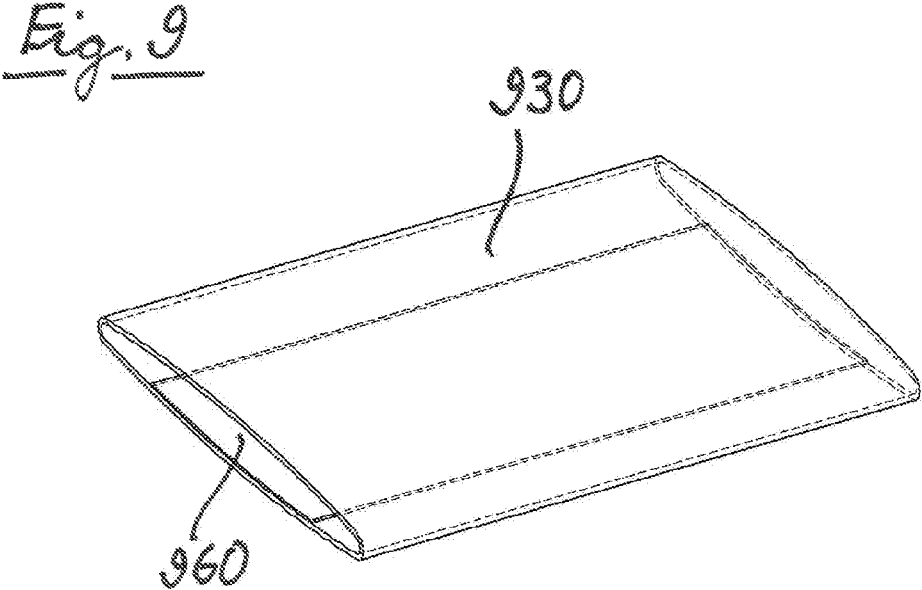
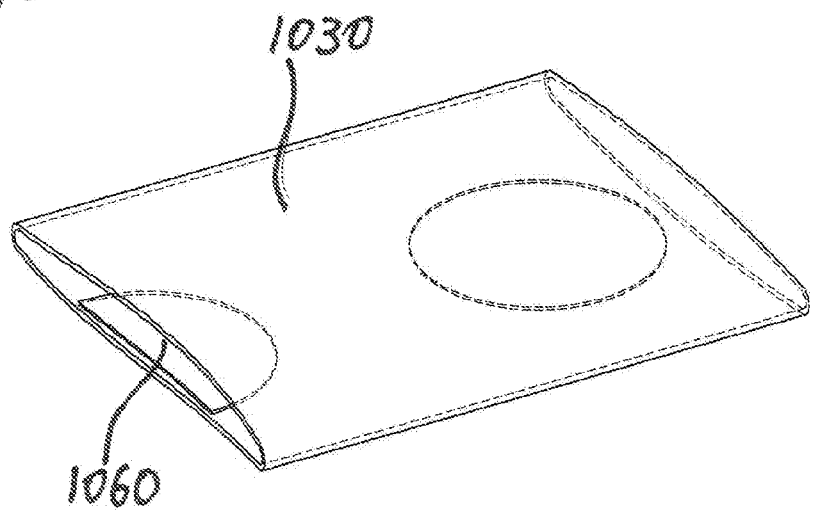

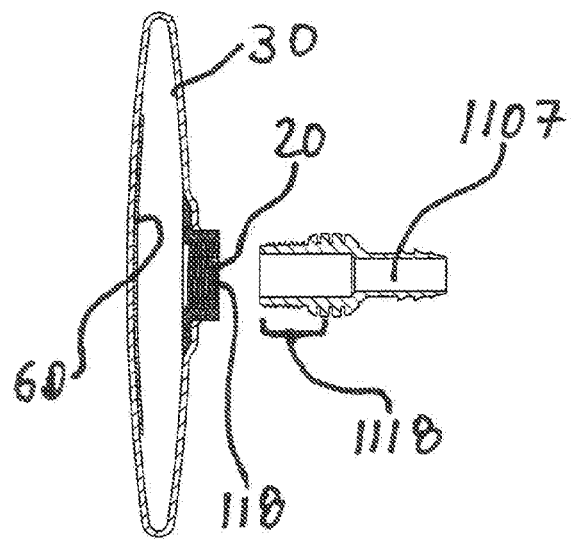
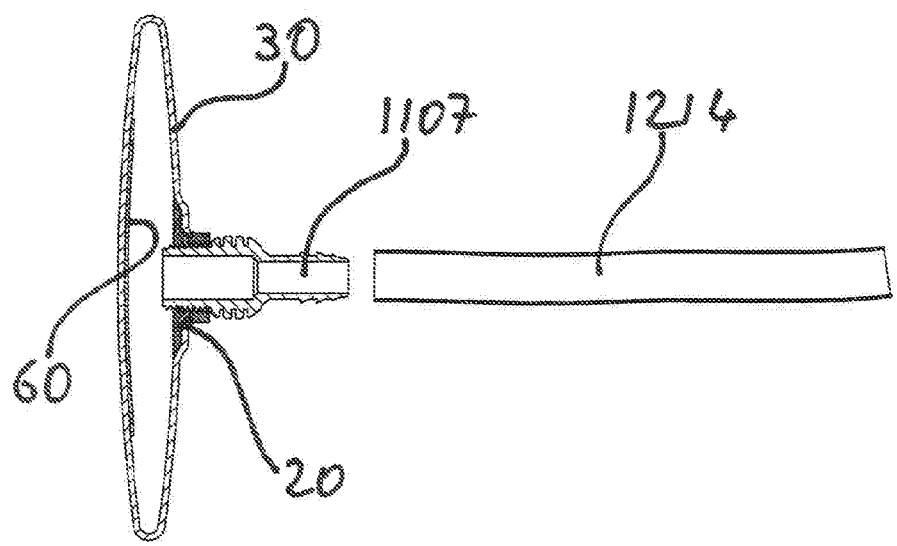

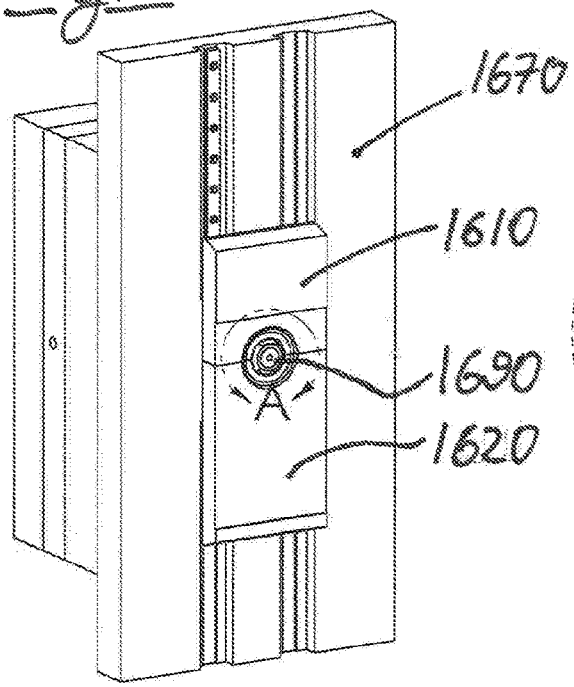
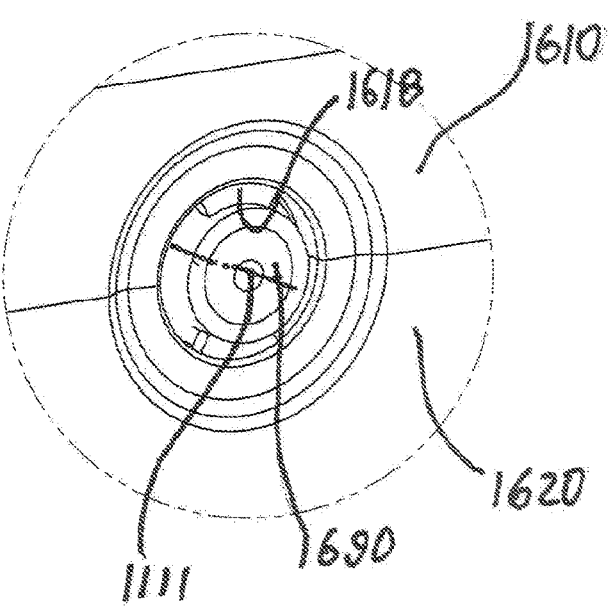
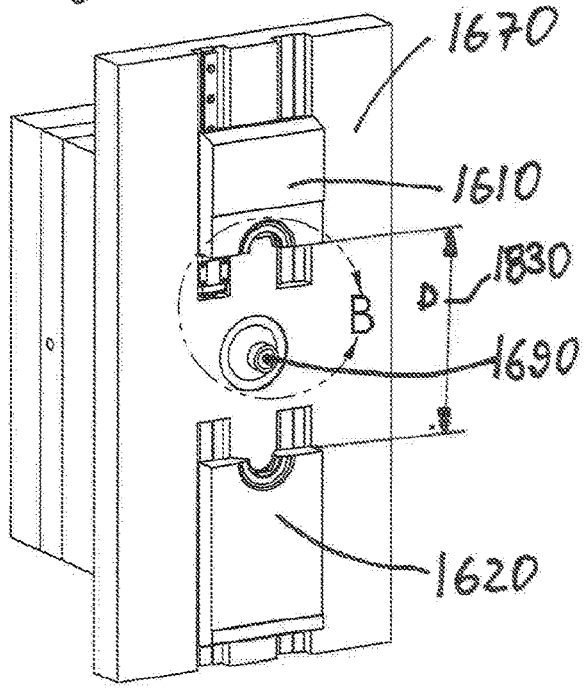
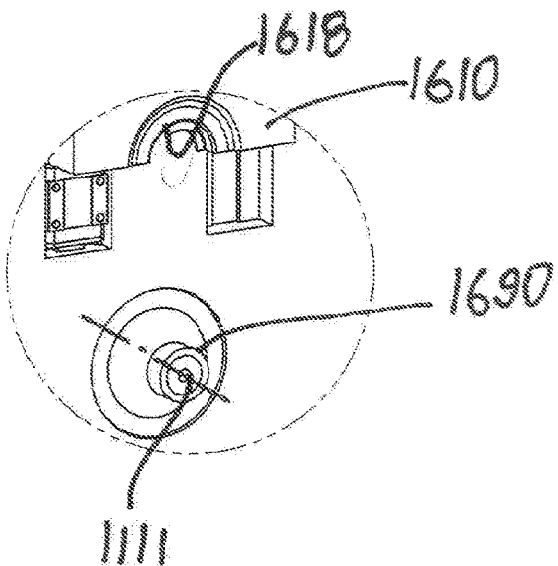

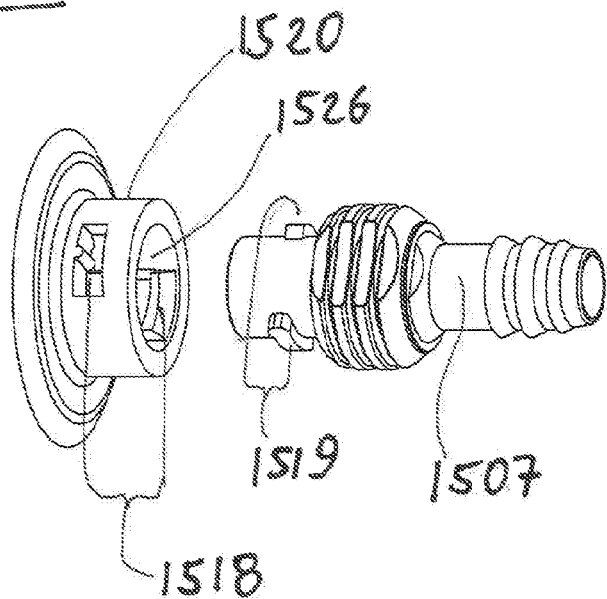
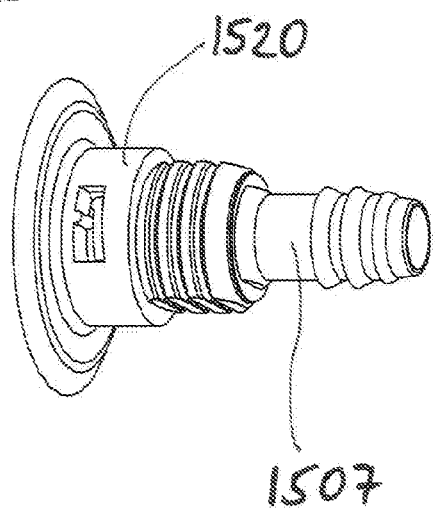

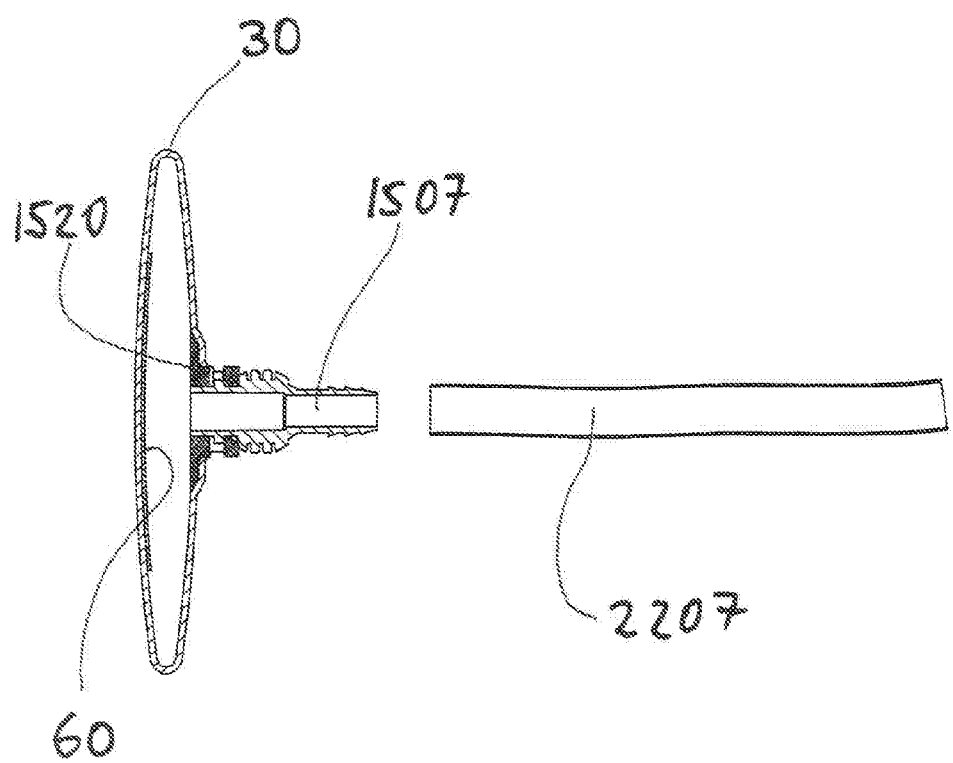

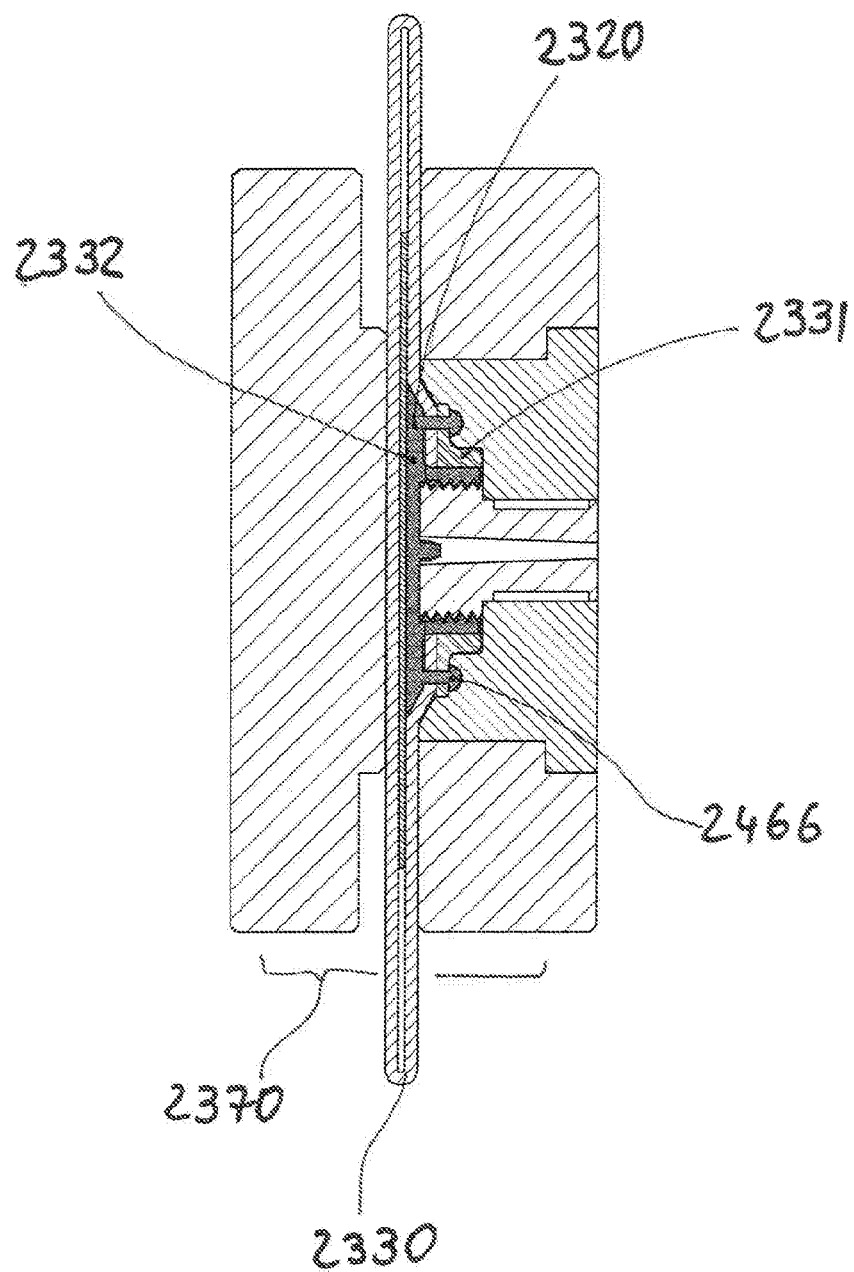

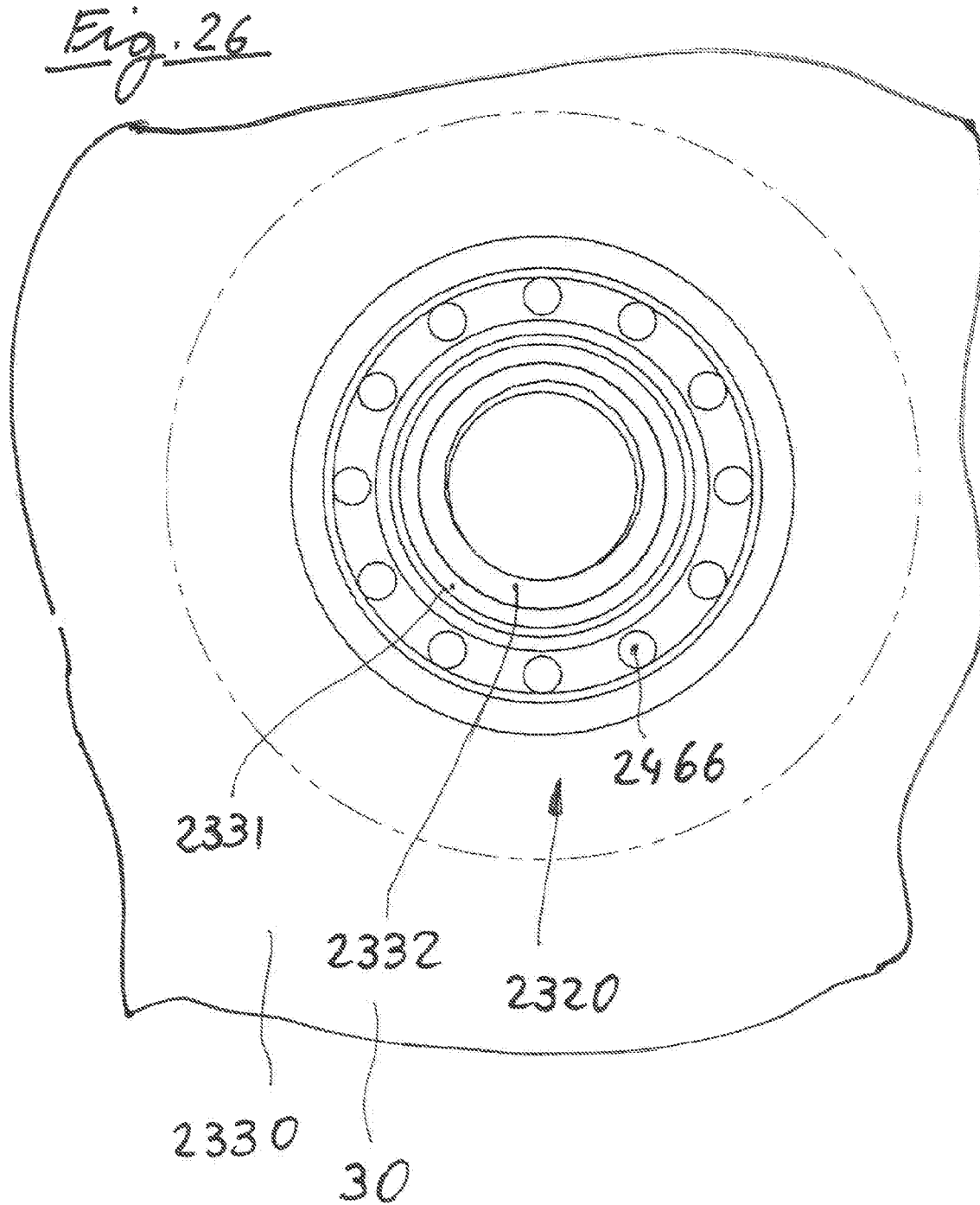

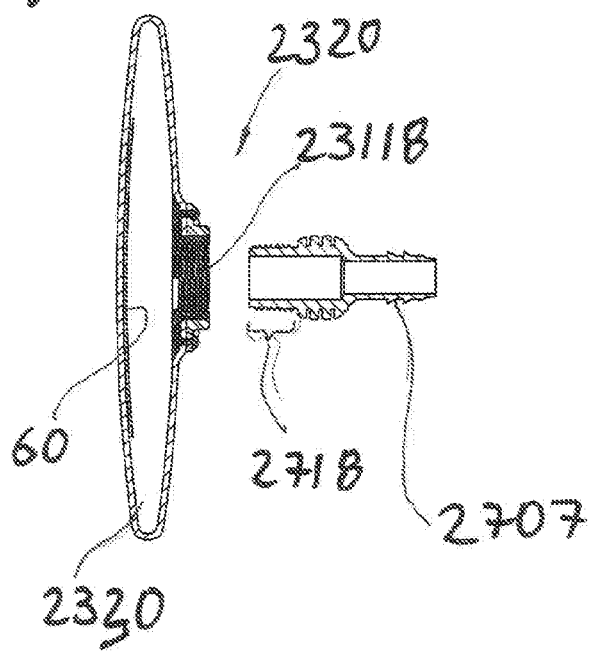
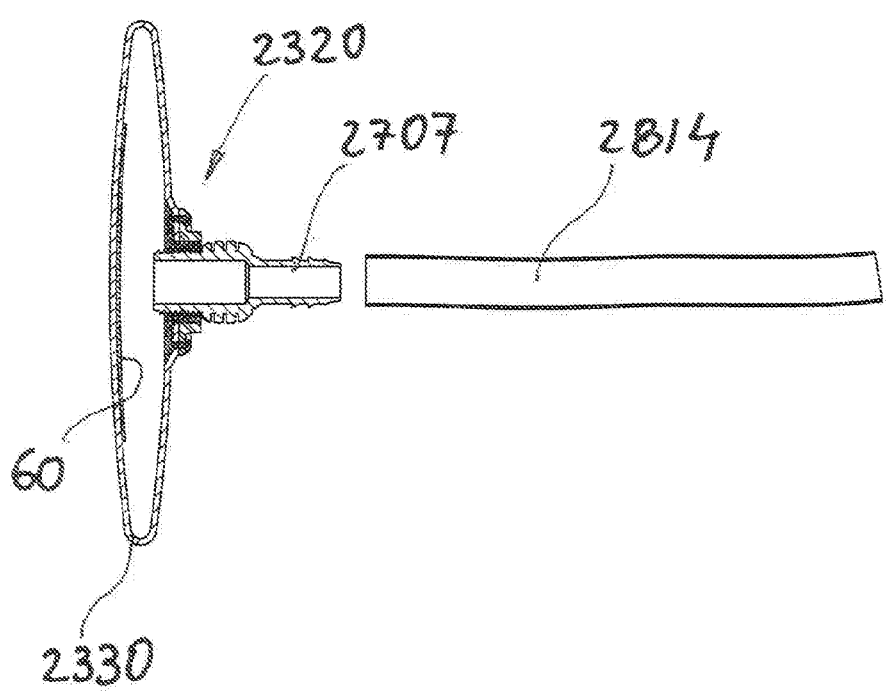

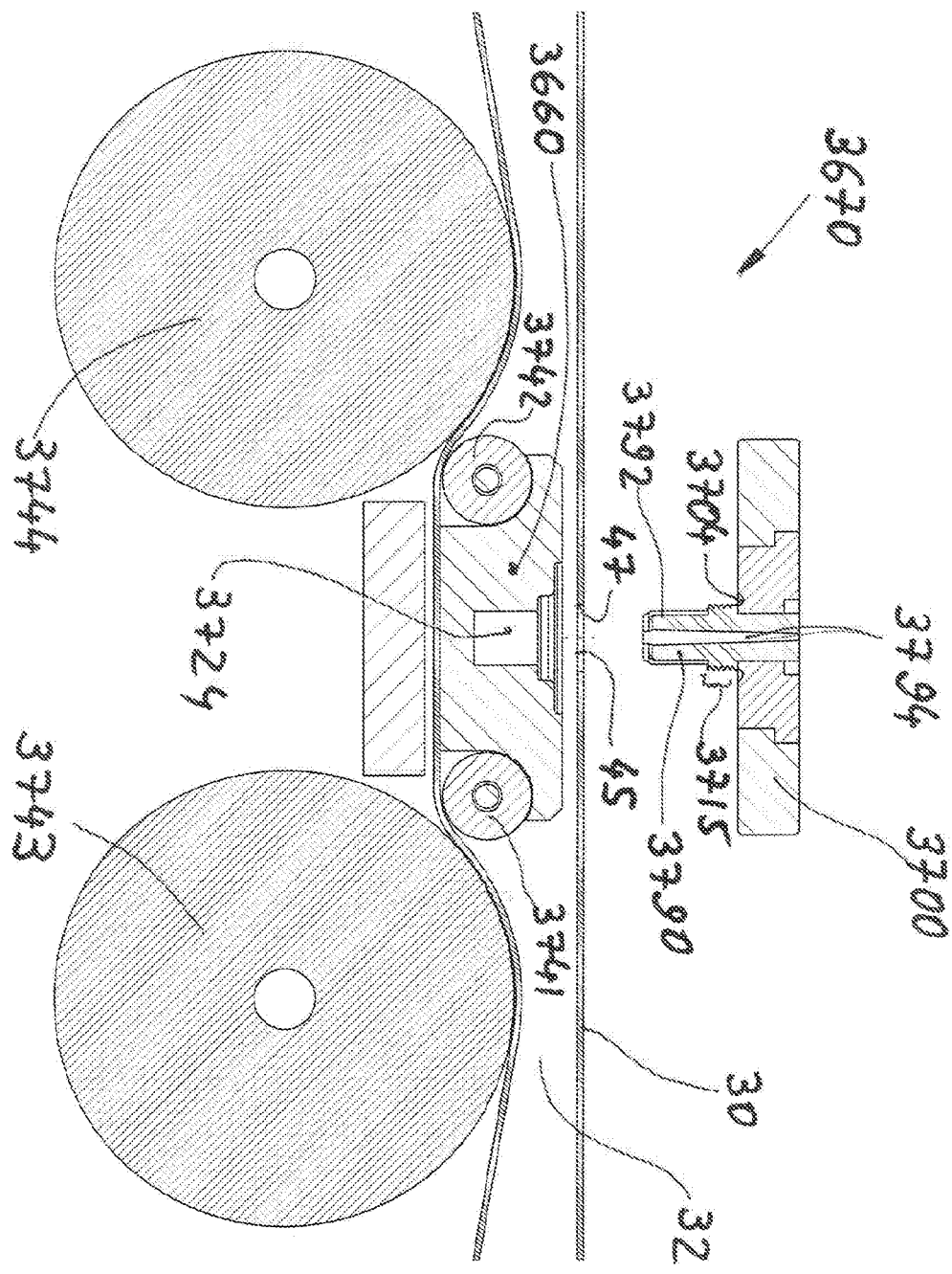

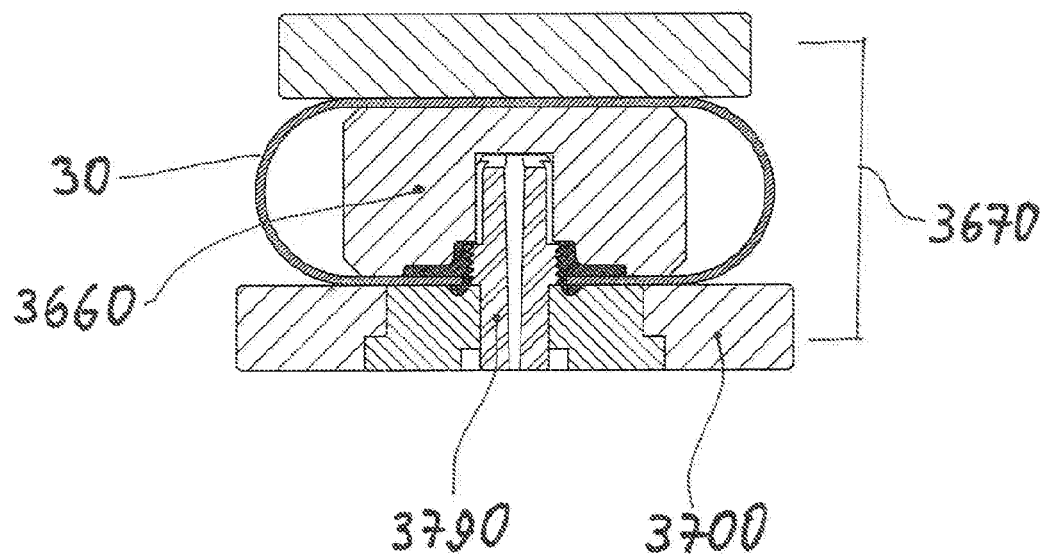

Fig. 39
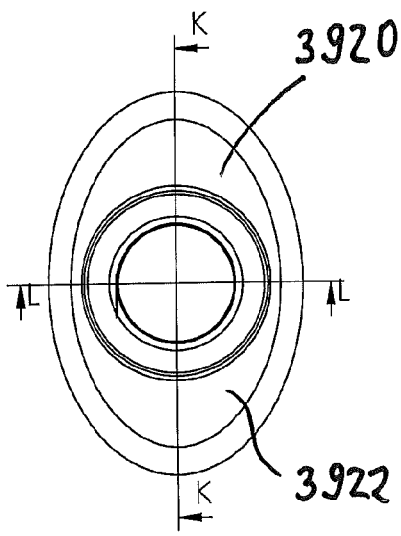
Fig. 39a
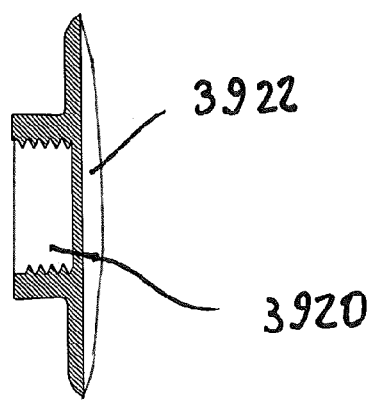
SECTION K-K
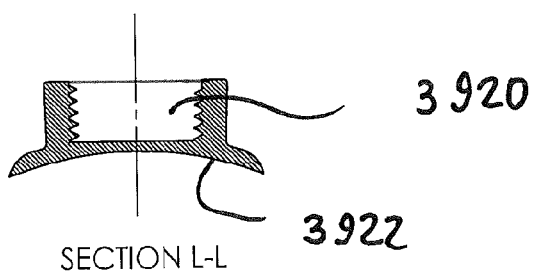
SECTION L-L
Fig. 39b

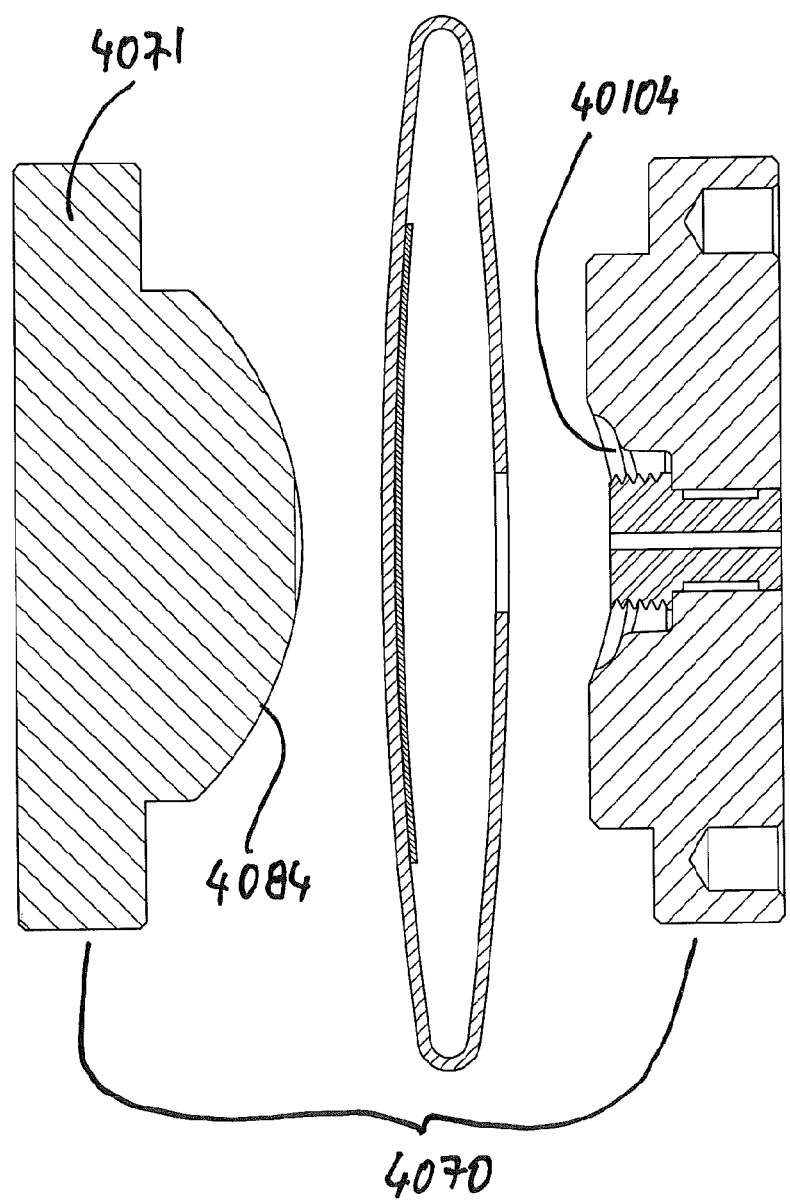

4071

US 10,946,567 B2

APPARATUS AND METHOD OF FORMING CONNECTORS BRACKETS FOR IRRIGATION LATERALS ALONG AN ALREADY MADE LAY-FLAT PIPE

CROSS-REFERENCE TO RELATED APPLICATIONS

This application is the U.S. National Stage of International Application No. PCT/IL2016/050492, filed on May 10, 2016, which claims the benefit of and priority to Israeli Application No. 238861, filed on May 17, 2015, the contents of each of which are hereby incorporated by reference in their entireties.

FIELD OF THE INVENTION

The various embodiments described herein generally relate to an apparatus for forming components on a thin substrate by injection molding and to methods that are implemented in the actuation of such manufacturing apparatuses, and in particular to an apparatus and methods as said, which are implemented for manufacturing systems for agricultural irrigation that comprise a thin wall pipe, which is amenable to being flattened (lay-flat type of pipe), and to such systems that integrate in them irrigation laterals that may be drip irrigation laterals.

BACKGROUND OF THE INVENTION

Recent years have seen increased usage of agricultural irrigation systems that integrate in them a pipe, which is amenable to being flattened (hereinafter—lay-flat pipe), as the water feeding conduit (for example—as an alternative to an open dug canal), in combination with an array of drip irrigation laterals that are mounted along the lay-flat pipe, are fed from this pipe, and extend from the pipe, for example—an array of drip irrigation laterals parallel one to the other—in a manner that they convey the irrigation water from the lay-flat pipe, navigate them in their route and deliver the water to the plants in the field in a dripping manner.

In such systems, anchoring a drip irrigation lateral to a wall of the water supply pipe, namely to a wall of a pipe that naturally is a relatively thin wall (as the pipe that by its definition—is amenable to being flattened from the instant that a water pressure no longer prevails inside the pipe and it swells—returning to its regular (circular) pipe's shape; but from the instant of di novo (a new) increasing of the water pressure within it in a repeating cycles of shape as per water pressure and so forth). Such anchoring requires a reliable connector. The task of forming an opening in the rather thin wall of the lay-flat pipe, and mounting over the thin edge of the pipe's wall a connector that is suited for anchoring an irrigating lateral with it, was found (proven) highly challenging and difficult to be performed on the spot and by farmers (agriculturists) in the field.

The prior art points to several methods and means that enable pre-fabrication of suitable connectors along the lay-flat pipe (or at least pre-preparation of an infrastructure of brackets suitable for accommodating connectors on them and this in a manner that would make it simpler for the farmer in the field to anchor the drip irrigation laterals through them. Given an infrastructure that is ready in advance as said, along the lay-flat pipe, the farmer in the field does not have to cut proper openings in the pipe on the spot and is not required to mount a connector over the thin edge of an opening in the pipe wall as punctured and exposed by him.

Patent GB 2187662 described a lay-flat pipe with connectors to the drip irrigation laterals along its length. The connectors that were prefabricated and, as per the patent, could have been formed with a cylindrical section that passes through an opening in the pipe and with a flange sector that is positioned inside the pipe and bonded to it. This configuration of a connector (in accordance with the patent) might be assembled when forming the pipe in a manufacturing plant.

A publication of patent application EP 0284570 described a flexible, flattenable pipe with an outlet fitting along its length, particularly for irrigation. A typical outlet fitting, as per the patent, is also prefabricated and includes a neck section with an external thread and a flange sector. The neck section passes through an opening that is formed in the wall of the pipe while the flange sector is left in it. On the neck there is mounted from the outside a washer and a lock nut that are tightened contra the flange and the pipe's wall is pressed between them. The patent made a point that the option exists for automating such an assembly procedure wholly or in part; the patent further remarked that the outlets constitute no obstacle when winding the pipe onto the reel.

Published patent application US 2003/0201345 described the possibility of manufacturing a lay-flat pipe for agricultural irrigation implementations, as a multi layered pipe that has high durability against high pressure while maintaining the multi layers construction as said as a rather relatively thin wall. Concurrently, any professional would understand that the multilayer structure of the wall exposes it to the so called condensation phenomenon (also known as a "sweating phenomenon"), wherein from the instant of forming an exposed edge at the pipe wall, for example—such an exposed edge is created as occurs when forming an opening in the pipe wall for installing a connector to a drip irrigating lateral on it.

Patent GB 1,023,886 described for the professionals a method of and mould for forming a bushing in an opening in a sheet material wall, and sheet material wall produced by said method. From considering the patent it becomes clear that the bushing that is described in it is formed by injecting a molten material which solidifies on cooling into a mould cavity defined by a plurality of separable dies wherein two of which together clamp a portion of a wall around an opening therein while leaving free the opening circumferential edge.

U.S. Pat. No. 8,672,240 described a lay-flat pipe with brackets for connectors for drip irrigation laterals along its length. Brackets for the connectors that according to the patent's provisions are liable to be manufactured by a way of molding directly on the pipe and in a manner that would enable rolling up of the pipe on a reel, and this even though the brackets were formed as said, on its top surface—and concurrently—also in a manner that would enable sealing the opening's edges in the pipe wall in which the brackets are mounted. From considering the patent it becomes clear that the manufacturing array described in it is an array that enables the mounting of the brackets on a flat strip of raw material, even before forming the flat strip into a pipe item. In other words—only after installing the brackets on the strip, the strips with the connectors that are already installed on the strip are fed unto a piping apparatus that forms the flat strip unto the shape of a cylindrical profile (to the shape of a sleeve). There (in the piping apparatus) the strip is bent (twisted) into a sleeve with juxtaposed edges or overlapping margins, and the edges or margins are welded by a watertight seam into a pipe with a closed section.

That is to say, U.S. Pat. No. 8,672,240 described a manufacturing array that enables executing the step of forming of brackets for connectors in the way of molding directly on the pipe, wherein similarly to the above cited patent GB 1,023,886, the topic discussed was a rather a flat sheet (strip): a flat sheet that as per cited in U.S. Pat. No. 8,672,240 can be—later on—formed unto a cylindrical pipe.

In addition, while considering U.S. Pat. No. 8,672,240 one learns that those brackets that were described in it as molding directly on the pipe, each one of them, were formed with a circumferential slot that includes opposing top abutment and bottom abutment surfaces which are mirror images of one another, in a manner such that the flat sheet from which, as said, the sleeve-like profile of the pipe would be formed later, is positioned wherein it is found inside the circumferential slot between the opposing top abutment and bottom abutment surfaces. Top abutment and bottom abutment surfaces that as said, in accordance with the teaching of the patent, there exists between them—a special relation of being mirror images of one another (and see also in said patent GB 1,023,886—see FIGS. 1 and 2, ibid).

Israeli patent IL 174875 described a lay-flat pipe with brackets in the configuration of an outlet tubules that enables interlocking through them with connectors of drip irrigation laterals, wherein they are heat soldered along the pipe's length. Positioning and soldering each one of the outlet tubules is described in the patent as being executed by a manufacturing array that includes a bracket assembly which is suited to be positioned inside the pipe that is already formed and designated as such (i.e. inside the pipe which is already in the configuration of a cylindrical sleeve). The bracket assembly is positioned inside the pipe between a deploying assembly from which the already formed lay-flat pipe is unloaded and a rolling a new assembly on which there is executed rolling anew of the lay-flat pipe following the soldering of the outlet tubules along its length and in a manner that the bracket assembly that is positioned as said, inside the prefabricated pipe, is suited to carry the advancement (the movement) of the pipe around it.

At the period that preceded the invention which is the subject matter of this patent application, professionals in this field were undoubtedly aware of the limitations (short comings) that should be allocated to the variety of prior art which we pointed hereinabove—lack (deficiency) to form in accordance with the teaching of the prior art brackets for connectors for drip irrigation laterals wherein it concerned with a lay-flat pipe which is already ready from before, namely—wherein it concerned with a pipe which its forming into an elongated rather sleeve shape was already completed and it is provided (supplied) as a pipe rolled up on a reel, and in a manner that the connectors' brackets will seal also the edges of the openings at the thin wall of the pipe.

Production of lay-flat pipes can be executed in factories that do not dedicate all of their production capability only for the installation of irrigation systems, which are integrated as said with drip irrigation laterals. In this state of affairs, a manufacturer of lay-flat pipes is liable to refrain from assimilation of processes for forming connector's brackets and the apparatus utilized in such processes, as part of the manufacturing line of lay-flat pipes that exist in his factory. Alternatively, the pipe manufacturer might manufacture and market the lay-flat pipes as "blind" pipes (without having brackets for connectors formed on them) in a manner that necessitates an additional and late stage of forming brackets for connectors as said, at the wall of a pipe already manufactured, or at most the pipes manufacturer is liable to agree with forming brackets for connectors as said, and this as only an additional and optional step in the pipes production process that anyway is conducted in his factory, namely as a step to be performed in his factory only after finalizing the manufacturing of the pipes from his side and on a stock of pipes already existing in his plant.

Thus, an object of the invention which is the subject matter of this patent application, is providing a solution to the need of forming connectors' brackets for irrigation laterals along a lay-flat pipe that is already there, namely along a pipe that is already formed as a kind of a long sleeve that has a cylindrical profile, and while referring—hence, to the fact of existence of an opposing wall and an inner space which extends along the pipe, to do so in a manner that the connectors' brackets would seal the edges of the openings at the walls of the pipe in which they were formed, and all without detracting from the capability of a repeated rolling of the ready pipe on a reel, this time with the connectors' brackets where they are already installed along its length.

SUMMARY OF THE INVENTION

Aspects and embodiments are directed to an apparatus for forming brackets for connectors to irrigation laterals along a lay-flat pipe which was already prepared before (a lay-flat pipe ready in advance long ago), to a method for forming brackets for connectors to irrigation laterals along a lay-flat pipe which is already formed as such, and to products which are produced by implementing said apparatus or implementing said method namely—a lay-flat pipe with at least one connector bracket on it.

According to one embodiment, an apparatus according to the invention, for forming brackets for connectors to irrigation laterals along the length of a ready from before lay-flat pipe, comprises—
means for forming an opening endowed with a circumferential edge on one wall of a ready from before (prefabricated) lay-flat pipe; and; —
means for positioning a separation means inside the pipe, in a manner that from the instant of forming the opening at one wall of the ready from before pipe, the separation means would be found facing opposite the opening wherein it separates between the one wall of the pipe to the second wall of the pipe; and—
a mold for injection molding that is suitable for injecting molten plastic material through it into a cavity, and wherein the mold comprises—
means for flattening said pipe in a manner that said opening would be found (prevail) opposite said separation means prior to the injection; and—
a core component that is formed at its end with at least one passage (gate) for injecting the molten material into said injection cavity and that from the instant of flattening, the pipe is suited to be positioned inside said opening; and—
said mold is suited to be installed inside the opening with the circumferential edge which was formed in the wall of the prefabricated pipe in such a manner that the separation means that we pointed out above as positioned inside the pipe, participate in demarking of the injection cavity, and the circumferential edge of the opening protrudes into said cavity; and—
the mold is suited for pressure injecting of molten plastic material into the cavity in such a manner that it affixes the injected material only to the one wall of the ready from before pipe and to the circumferential edge of the opening that was formed in it; and—

The mold is retractable away from the opening that was formed in the wall of the ready from before pipe, while leaving behind the material that was injected while using it, as a bracket that is affixed on the one wall of the pipe, and the bracket is suited for installing a connector means to a drip irrigation lateral that would be fed by water from the lay-flat pipe.

In one example of the method, the method in accordance with the invention for forming brackets for connectors for irrigation laterals along ready from before lay-flat pipe, comprises the steps of— forming an opening endowed with a circumferential edge in one wall of already prepared lay-flat pipe; and— positioning separation means inside the inner space of the pipe, in such a manner that from the instant of forming the opening in the one wall of the already prepared pipe, the separation means would be found opposite the opening wherein it separates the one wall of the pipe and the second wall of the pipe;

positioning a mold for injecting molding that is suited for injecting molten plastic material by it into a cavity, in such a manner that the core component of the mold that is formed at its end with at least one passage (gate) for the flow of the molten material to said injection cavity, from the instant of flattening the pipe, is suited for positioning inside the opening having the circumferential edge that was formed in the wall of the ready from beforehand pipe, in a manner that the separation means that we have pointed to above as positioned inside the pipe, participates in demarcating the injection cavity, and the circumferential edge of the opening protrudes into the cavity;

injecting molten plastic material under pressure using the mold into the cavity in a manner that fixes the injected material only to the one wall of the pipe and to the circumferential edge of the opening that was formed in it;

retracting the mold from the opening that was formed at the wall of the already made pipe so that it leaves the material that was injected by it wherein it is formed as a bracket that is affixed on the one wall of the pipe and the bracket is suited to installing a connector means to an irrigation lateral that would be fed by water from the lay-flat pipe.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIGS. 2a to 2i constitute side views of cross sections that present a sequence (continuum) of the manner of forming a connector's bracket to an irrigation lateral along the length of a ready-made lay-flat pipe, while using an apparatus such as the example apparatus whose parts were illustrated in FIGS. 1 and 2.

FIGS. 3, 3a and 4 and 4a constitute schematic views in perspective of an injection mold with carriages (trolleys) that are mobilized in a direction perpendicular to the axis of the core axis, in order to manufacture a connector's bracket such as the one whose forming manner is illustrated in FIGS. 2a to 2i. FIG. 3 constitutes a view of the mold that is given in a closed state while FIG. 3a provides a near view of the region (area) marked A in FIG. 3. FIG. 4 is a view of the mold in its open state and FIG. 4a provides a near view of the region (area) marked B in FIG. 4.

FIGS. 5 and 6 constitute schematic views in cross section of the injection mold with the mobilized carriages illustrated in FIGS. 3, 3a, 4 and 4a. FIG. 5 is a view in cross section with the mold in its closed state and FIG. 6 is cross section with the mold in its open state.

FIGS. 7a and 7b constitute side views in cross sections that present one example of means for positioning a separation means inside a lay-flat pipe, which was made in advance, and its mode of operation, that can be implemented in an apparatus similar to the apparatus whose parts are illustrated in FIGS. 1 and 2.

FIG. 9 constitutes schematic views in perspective of a sector of a lay-flat pipe made in advance with separation means in the form of an elongated strip that was installed in the pipe in advance, during the process of the pipe manufacturing.

FIG. 10 constitutes schematic views in perspective of a sector of a lay-flat pipe made in advance with separation means in the form of discrete discs installed in it during the pipe manufacturing process.

FIG. 11 constitutes a side view in cross section that presents one example of connector's bracket that can be formed by an apparatus in accordance with the invention and a connector means that can be installed in the bracket—a bracket in the configuration of a bushing with an inner thread and a "tooth" type of connector, having a matching threaded sector.

FIG. 12 constitutes a side view in cross section that presents the connector that is illustrated in FIG. 11, wherein it is installed inside the bracket that is illustrated there, while the connector is ready to have installed an irrigation lateral on it, in a manner that the lateral is fed by water from the lay-flat pipe.

FIGS. 16 to 19 are schematic views in perspective of an injection mold with mobilized carriages (trolleys) in a direction perpendicular to the core's axis, in order to manufacture a connector's bracket in the configuration of an array of slots that are suited to receive matching protrusions in them as a part of a mechanism known by its nickname "bayonet" connector (such as the one whose forming manner is illustrated in FIG. 15). FIG. 16 constitutes a view of the mold in its closed state, FIG. 17 depicts a near view of the region marked A in FIG. 16, FIG. 18 is a view of the mold in its open state, and FIG. 19 is a near view of the region marked B in FIG. 18.

FIG. 20 is a schematic view in perspective of the bracket and a connector illustrated in FIG. 15 before their installation one to the other by a bayonet type of connecting mechanism.

FIG. 21 is a schematic view in perspective of the bracket and the connector illustrated in FIGS. 15 and 21 wherein they are connected one to the other by a bayonet type of connecting mechanism.

FIG. 22 is a side view in cross section that presents the connector and the bracket that are illustrated in FIG. 21 wherein they are installed one to the other by a bayonet type of connecting mechanism, wherein the connector is ready for having an irrigation lateral installed on it in a manner that the lateral would be fed by water from the lay-flat pipe.

FIG. 24a to 24e constitute side views in cross section that present a sequence (continuum) of the manner of forming a bi components connector's bracket for an irrigation lateral along a lay-flat pipe, in accordance with the example that was illustrated in FIG. 23—the connector's bracket is formed of bi components—the prefabricated one and the second one that was injected into the mold in a manner such that the injected material affixes to the pipe's wall also the one component that was prefabricated.

FIG. 26 constitutes a view from the outside of a sector of the pipe in which a bi components bracket for a connector to irrigation lateral was formed according to the example illustrated in FIGS. 24a to 24e, and in a manner that presents the circumferential array of as a kind of "rivets" that were created from making the molten material flow unto the surface area of the connector's bracket component that is prefabricated.

FIG. 27 constitutes a side view in cross section that presents an example of the manner of bi components connector's bracket in accordance with the examples illustrated in FIGS. 23 to 26 and connector means that can be installed in the bracket—a bi components bracket in the configuration of a bushing with an inner thread and a "tooth" type of connector formed with a matching threaded sector.

FIG. 28 constitutes a side view in cross section that depicts the connector illustrated in FIG. 27, wherein it is installed inside the bi components bracket illustrated there wherein the connector is ready for installing an irrigation lateral on it, in a manner that the lateral could be water fed from the lay-flat pipe.

FIG. 37 constitutes a side view in cross section of a part of the apparatus in accordance with the invention for forming connector's brackets for irrigation laterals along the prefabricated lay-flat pipe that was illustrated in FIG. 36.

FIGS. 38a to 38c constitute side views in cross section that present in a continuum (succession) the mode of forming the connector's bracket for irrigation laterals along a lay-flat pipe by using an apparatus like the apparatus that was illustrated in FIGS. 36 and 37.

FIGS. 39, 39a and 39b constitute (accordingly) a top view of a connector's bracket which can be manufactured too while using an apparatus as the example apparatus which its parts were illustrated in FIGS. 1 and 2, wherein in the depicted bracket, the flat circumferential sector is rounded in a pattern that correspond to the lay-flat pipe diameter upon swelling into its full tubular profile, and two cross sections of this bracket (along lines K-K and L-L as marked in FIG. 39).

DETAILED DESCRIPTION OF PREFERRED EMBODIMENTS

Aspects and embodiments are directed to an apparatus for forming brackets for connectors to irrigation laterals along a lay-flat which was already prepared before (a lay-flat pipe ready in advance long ago), to a method for forming brackets for connectors to irrigation laterals along a lay-flat pipe which is already formed as such, and to a products which are produced by implementing said apparatus or implementing said method, namely—a lay-flat pipe with at least one connector bracket on it.

It is to be appreciated that embodiments of the method and apparatus discussed herein are not limited in application to the details of the construction and the arrangement of components set forth in the following description or illustrated in the accompanying drawings. The method and apparatus are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
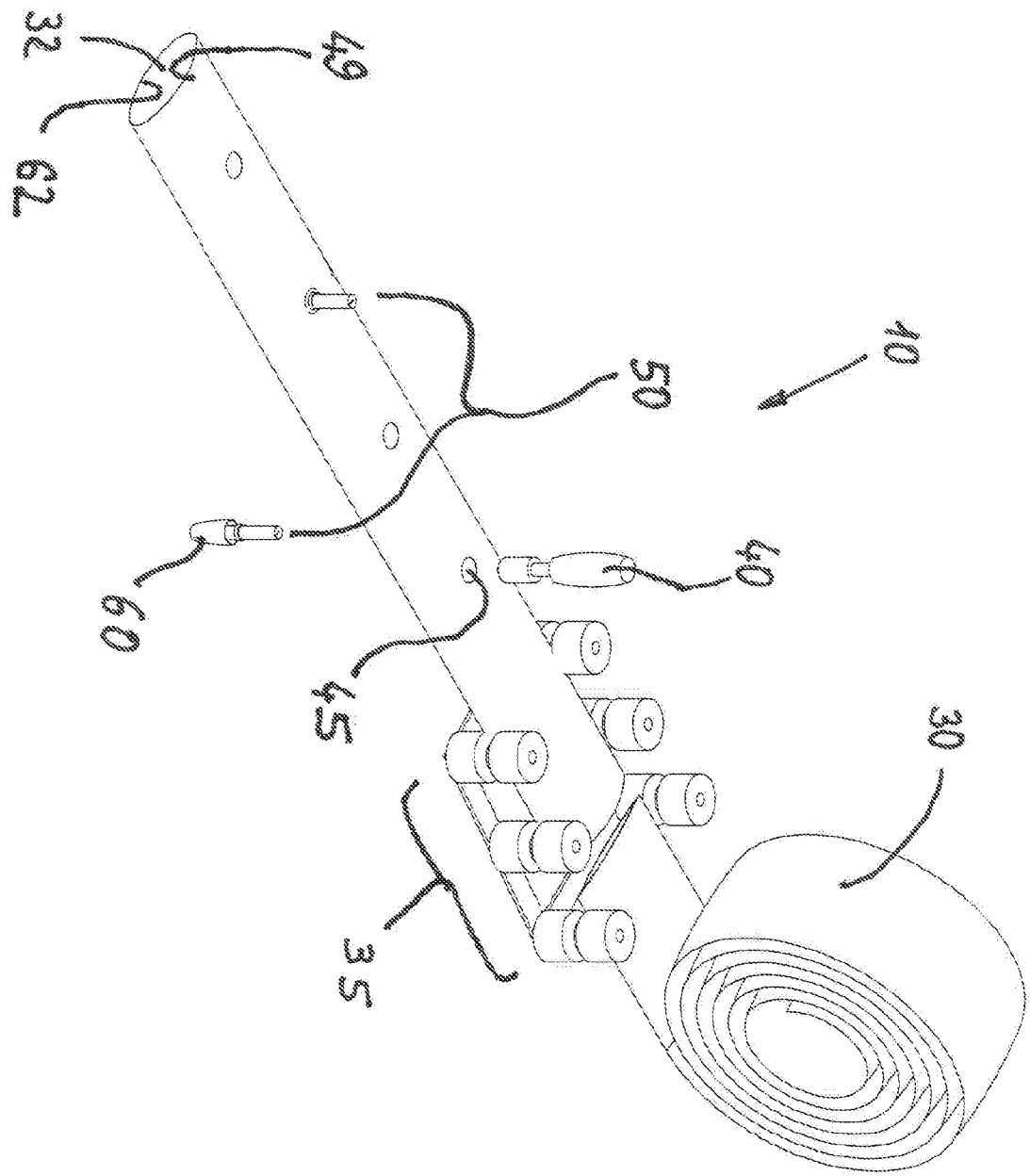
FIG. 1 constitutes a schematic view in perspective of the first part of an apparatus in accordance with the invention for forming brackets for connectors to irrigation laterals along the length of a ready-made (i.e. made in advance) lay-flat pipe.
Figure 2:
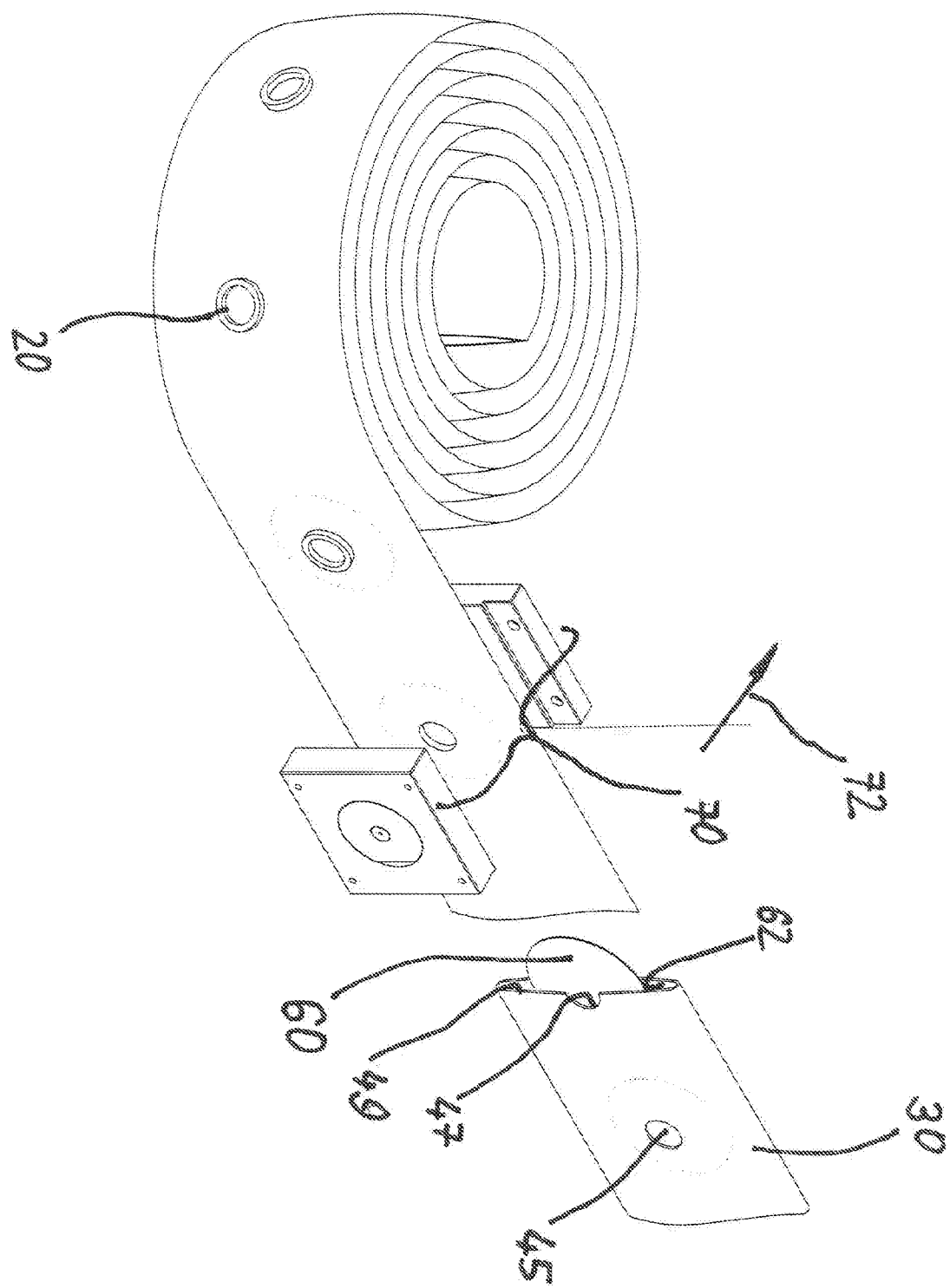
FIG. 2 constitutes a schematic view in perspective of a second part of an apparatus in accordance with the invention for forming brackets for connectors to irrigation laterals along the length of a premanufactured lay-flat pipe, wherein the apparatus's first part is depicted in FIG. 1.

Referring to FIG. 1-2, there is illustrated apparatus 10 in accordance with the invention for forming connector's brackets 20 for irrigation laterals (that are not illustrated) along a lay-flat pipe 30 that was already previously formed.

Any professional would understand that an already made lay-flat pipe that can be implemented in an apparatus in accordance with the invention, can be a pipe that was manufactured from one (single) flat sheet that was folded to create the tubular profile, namely a kind of a long sleeve-like object or from a pile of sheets (unto producing a multi layered tubular pipe). A lay-flat pipe as said, single or multi layered as cited above, may also be manufactured in such tubular profile, also in an extrusion process or by other technologies (for example—film blowing). The prefabricated pipe can be manufactured from a variety of materials, for example—PE, PP, PET, PVC, PA and in a variety of different diameters (for example 3", 4", 6") and in a variety of wall thicknesses (e.g. –0.6, 0.8, 1.2, 2 mm).

In the illustrated example, apparatus 10 comprises means 35 for swelling the pipe 10 through a configuration of an array of turning wheels that from the instant of unloading the flat pipe, biases the ends of the pipe and causes it to swell a little, while creating an inner space 32. As will be explained in full detail below, a tiny swelling volume action, would facilitate the operations that would be executed on it and inside it (for example—forming an opening only in one wall of the pipe (but only on one wall of it) propelling separation means through the opening and positioning it inside the pipe, affixing the opening edge to the tip of the core element of the injection mold).

In the illustrated example, apparatus 10 comprises means 40 for forming opening 45. Means 40 serves for forming opening 45 that has circumferential edge 47 in one wall 49 of pipe 30. Any professional would understand that means 40 is liable to be means from a kind of a rotating knife, cutting sleeve, or cutting means that is not mechanical (for example—a laser means).

The apparatus also comprises means 50 for positioning separation means 60. Actuating means 50 leads to propelling and to positioning of separation means 60 inside pipe 30. In the example, from the instant of forming opening 45 in a one wall 49 of pipe 30, separation means 60 would be found on the other (second) wall 62 of pipe 30 on its internal side. Separation means 60 would be positioned opposite to opening 45 and in a manner that separation means 60 separates the one wall 49 of pipe 30 and the second wall 62 of pipe 30.

In the illustrated example, separation means 60 constitutes a sheet resembling a disc. The sheet is liable (prone) to become as if glued to second wall 62 of pipe 30 on its inner side 30 from the instant of bringing it into contact with it (for example, aided by a layer of glue or adhesive restickable that can be spread on its other side—the side facing the second wall of the pipe from its inner side). Any professional would understand that the coupling could also be done by different means, for example—by injecting a layer of glue through opening 45 over the second wall 62 prior to propelling separation means 60 and bringing it into contact with the pipe's wall. On the manner of propelling separation means 60 and bringing it to contact with the pipe's wall we will write more when describing FIGS. 2c, 2d, 7a-7b, 8a-8b.

Apparatus 10 comprises in addition mold 70 for injection molding that is suited to injecting molten plastic material through it and into a cavity.

As will be explained later, when referring to FIGS. 2e to 2i, the core component (the component through which the molten plastic material is injected) of mold 70, is suited to being installed inside opening 45, in a manner that separation means 60 participates in delineating the cavity into which the molten plastic material is injected (the injection cavity), wherein the circumferential edge 47 of opening 45, protrudes wherein its lips (margins) extend into the inside of the cavity space into which the molten plastic material would be injected (the injection cavity).

Mold 70 is suited to injecting plastic material under pressure into the inside of the cavity, in a manner that it affixes the injected molten material only to the one wall 49 of pipe 30 and to the circumferential edge 47 of opening 45, and in such a manner that separation mean 60 prevents the affixing of the injected material to the second wall 62 of pipe 30.

Any professional would understand that in order to prevent affixing of the molten plastic material on the second wall 62 of pipe 30 and thus avoiding damage due to that, separation means 60 is required to withstand the pressures and temperatures of the injection (for example—temperature of 250° C. and pressure of 1,000 bar).

In the configuration of the coupling disc, means 60 can be manufactured from PA, PET, and PMMA.

Mold 70 is liable to retract from opening 45 (see in FIG. 2 arrow 72 that displays the retreat direction). From the instant of retracting mold 70, the material that was injected through it is left (stayed) as bracket 20 that is affixed on the one wall 49 of pipe 30.

From the instant of forming bracket 20 on pipe 30, it is possible to return and flatten the pipe through rolling it anew (as shown in FIG. 2), this time—wherein it carries on its top the connector's brackets. In other words—bracket 20 has a relatively flat profile that does not protrude much into beyond the flat surface area of the pipe and hence it does not constitute an obstacle to rolling it up anew in a tightened manner and in a relatively volume saving manner.

As will be described below, when referring to FIGS. 11 to 22, bracket 20 is suited for installing connector means for an irrigation lateral that is given to be water fed from lay-flat pipe 30.

Reference is given to FIGS. 2a to 2i. FIGS. 2a to 2i constitute side views in cross section that present a sequence (continuum) of one example of the manner of the technique (method) of forming a connector's bracket 20 for irrigation laterals along the length of lay-flat pipe 30 by using apparatus 10.

Figure 2A:
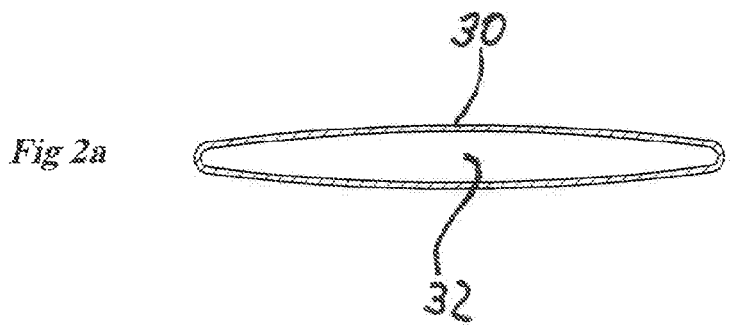

FIG. 2a presents the first step, namely—the mere fact of pipe 30 existence, wherein it is ready from before (prefabricated), and wherein it already has a tubular profile as the like of a long sleeve having inner space 32 (as opposed to a flat sheet). In the illustrated example, the pipe is of the kind that is manufactured by extrusion through continuous feeding via a cross head, but any professional would understand that a similar pipe could also be manufactured by other (well) known methods, for example—from folding a flat sheet, by continuous gluing along the sheet before folding it and forming it to provide a pipe.

Figure 2B:
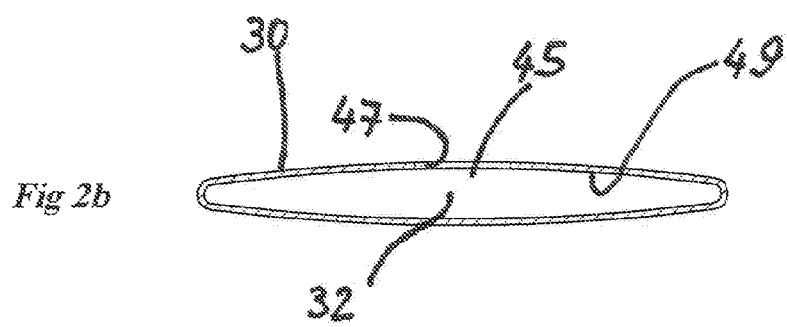

FIG. 2b presents pipe 30 in cross section, following the stage of actuating means 40 (see FIG. 1) to form opening 45 on it. Opening 45 has a circumferential edge 47 and is formed in one wall 49 of pipe 30. Any professional would understand that in a pipe that has a seam (a pipe that was manufactured by folding a sheet as explained), it is better not to form the opening in the stich area (in order not to aggravate the challenge of obtaining a good sealing in the vicinity of the opening's edge). Any professional would also understand that the challenge of forming the opening in only one wall of the pipe, is somehow made a little easier from the instant of making the pipe swell up a little (via means 35—see FIG. 1) and creating inner space 32 before forming said opening.

Figure 2C:
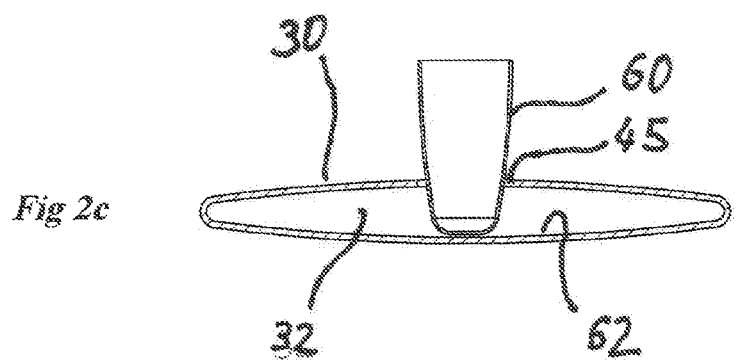

FIG. 2c displays pipe 30 in cross section view, at the middle of the step of actuating means 50 (see FIG. 1) for positioning of separation means 60 inside the inner space 32 of pipe 30. As is possible to see, and we will delve into fuller explanations later when referring to FIGS. 7a and 7b and 8a and 8b, in the illustrated example separation means 60 is carried in a converge configuration and is propelled through opening 45 into space 32 and towards the second wall 62 of pipe 30.

In similarity to the challenge of forming the opening only in one wall of the pipe but without harming (striking) the other one, also the deployment and coupling of the separation means demand operating in the inner space 32 of the pipe in a manner that due to the regular flattened condition of pipe 30, may require a preliminary step of making (driving) the pipe swell a little (from a flat state to a state of being akin to a sleeve having inner volume). Let's return and refer again to FIG. 1—there, as said, there is illustrated means 35 for making the pipe swell in the configuration of an array of rotating cylinders that from the instant of unloading the flat pipe, biases the ends of the pipe and cause it to swell a little and to form an inner space as may be required.

Figure 2D:
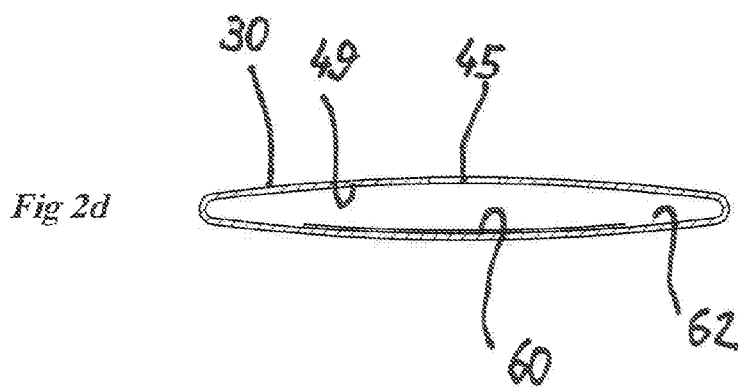

FIG. 2d presents the pipe 30 in cross section view from the instant of the termination of the stage of actuating means 50 (see FIG. 1) for positioning separation means 60 inside inner space 32 of pipe 30. At this stage, separation means 60 is positioned inside inner space 32 of pipe 30.

In the illustrated example, upon forming opening 45 at the one wall 49 of pipe 30, separation means 60 is found on the (top of) the second wall 62 of pipe 30 from its inner side, facing opening 45.

At this state, separation means 60 separates the one wall 49 of pipe 30 from the second wall 62 of the pipe. Any professional would understand that separation as required in accordance with the invention, could also exist also by anchoring the separation means 60 to the one wall 49 of pipe 30 and not as illustrated in this example—to wall 62 (for example—by anchoring the ends of the separation means to wall 49 while forming a "pocket" like shape that its opening is opening 45).

Another example of positioning separation means inside the inner space of the pipe, as is mandatory in accordance with the invention, but not by way of coupling the separation means to either one of the pipe walls, is described below when referring to FIGS. 36 to 38.

FIG. 2e displays the step of advancing mold 70 to injection molding (see arrow 74 that presents the advancing direction of the propelled cheek 71 of mold 70) towards the closure state as required for injection. Mold 70 comprises means for flattening pipe 30 in a manner that opening 45 would be found opposite separation means 60 before the injection by the mold of the molten plastic material. In the illustrated example, and in a schematic mode, the means are illustrated as surfaces (planes) 82 and 84, wherein plane 84 is formed on the propelled (movable) cheek 71 of the mold and plane 82 is formed on the fixed (static) cheek (the injecting cheek) 72 of the mold.

Mold 70 comprises a core component 90. Core component 90 is installed in the fixed (static) cheek 72 of the mold. Core component 90 is formed at its end 92, with at least one passage 94 for driving the molten plastic material to flow. In the illustrated example the core component tip is also formed with at least one passage 95 that extends in a radial direction and leads the molten plastic material to flow in this direction. Any professional would understand that a number of passages can be formed at the tip of the core component, or—alternatively, injecting the molten material can occur also in a free manner from the tip of passage 94.

Mold 70 comprises also bushing assembly 100. Bushing assembly 100 is suited to have core component 90 installed in it. Any professional would understand that from the instant of closing the mold (completing the step of advancing it in the direction of arrow 74), pipe 30 is flattened and one end 102 of bushing assembly 100 is suited for contacting the external side of one wall 47 of the pipe.

The one end 102 of bushing assembly 100 is formed with a terraced shaped bracket 104 that is formed wherein it is said one end 102. From the instant of installing core component 90, terraced shaped bracket 104 is positioned around the circumference of core component one end 92 with a space away from it.

In the illustrated example, bushing assembly 100 is formed as an assembly of static bushings (in the illustrated example—two) that are installed one within the other around a common axis 111 that is also the axis along which core component 90, which is installed in it, is extended. Any professional would understand that we are discussing solely an example, and that a bushing assembly in accordance with the invention is liable to be assembled also from different components, including such ones that are propelling (moveable). Other examples of such assemblies are described below, where reference is given to FIGS. 3 to 6 and 16 to 19.

Figure 2F:
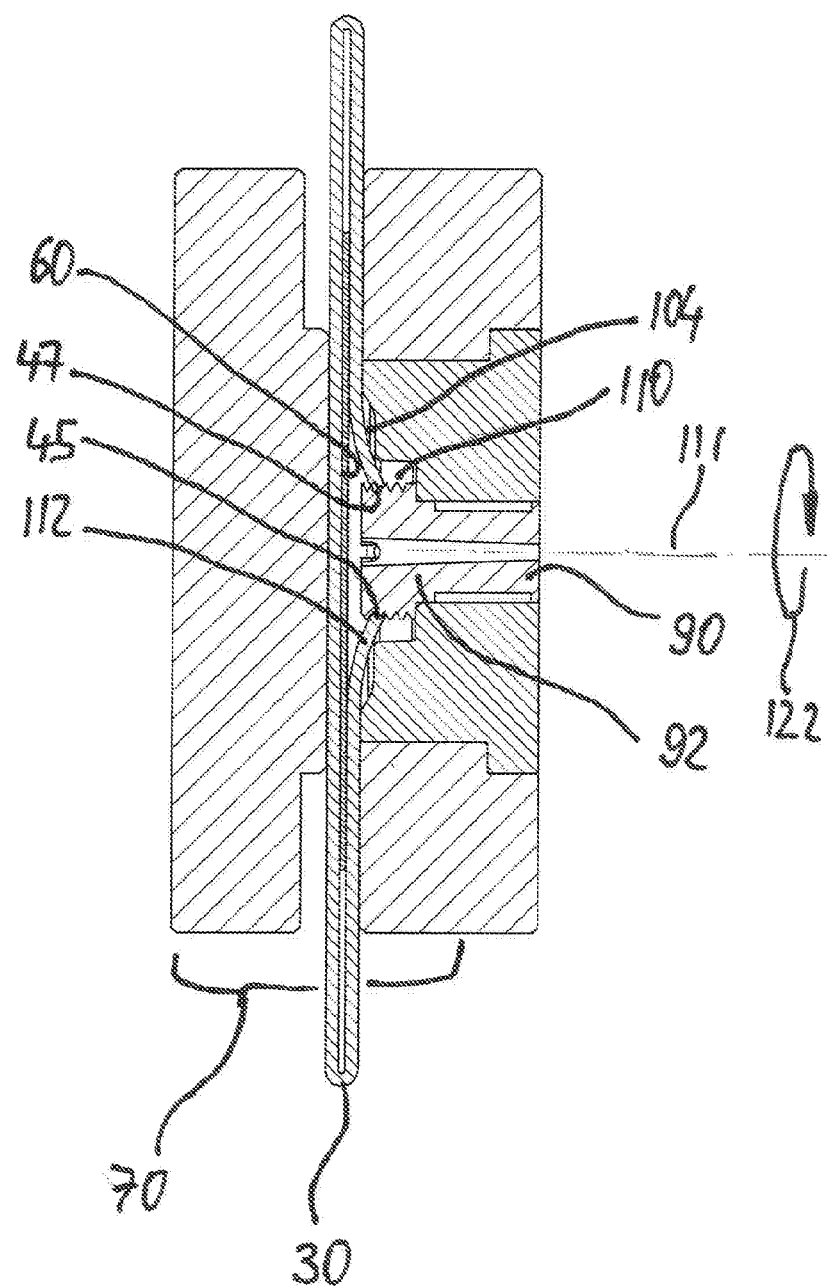

FIG. 2f presents the stage of closing mold 70 before injecting the molten plastic material. Closing mold 70 flattens pipe 30 as said. From the instant of flattening the pipe and closing mold 70, end 92 of the core component 90 of the mold is suited to positioning inside opening 45.

In the illustrated example, end 92 is suited in its dimensions to the dimension of opening 45 and from the instant of closing the mold it is positioned adjacent to the surface area of separating means 60. In accordance with the illustrated example, core component 90 may also be suited to rotational motion (see arrow 122) in a manner that enables even anchoring by turning of end 92 to circumferential edge 47 of opening 45. Any professional would understand that for achieving preferred affixation of the end of the core component in the edge of the opening that was formed in the pipe, indeed a tiny (small) swelling of the pipe can facilitate paving the way to the core component end at the opening edge. In addition, or alternatively, it is possible to implement a mold with propelling components (such as the molds described later (below) while referring to FIGS. 3 to 6 and 16 to 19), and a device that would draw near the slightly swelling pipe in a linear movement towards the core component end (before closing the mold that leads to flattening the pipe).

Closing the mold defining the injection cavity—cavity 110 that in the next stage is destined to receive into it the molten flow of the plastic material. Cavity 110 is delineated by the surface area of terraced bracket 104, the outer surface area of the end of core component 90 and separation means 60.

At this state, the circumferential edge 47 of opening 45 protrudes wherein its circumferential lips 112 stick out into cavity 110 (they are not tightened between rigid planes surfaces). In the configuration of anchoring the end of a rotating core component to the opening edge, the circumferential lips 112 are slightly distanced away from separation means 60 (see the state illustrated in FIG. 2f).

In accordance with the illustrated example, core component 90 is liable to be also suited to rotational motion (see arrow 122) in a manner that enables even anchoring by turning of end 92 to the circumferential edge 47 of opening 45, and even pulling lips 112 towards the surface area of terraced bracket 104.

FIG. 2g presents the step of injecting the molten plastic material (see the continuum of illustrations of arrowheads 106) into the inside of cavity 110. From the instant, as said, that separation means 60 participates in the delineation of cavity 110, then—as illustrated in the figure, injecting under pressure of molten plastic material into cavity 110, affixes the injected material only to the one wall of pipe 30 and to the circumferential edge 47 of opening 45. Further, in accordance with the illustrated example, the pressure injection of a molten plastic material causes shoving and propelling to movement (due to the pressure of the molten plastic material) of circumferential edge 47 of opening 45 that, as said, before the injection of the molten plastic material was protruding wherein its lips 112 stick into (inside) cavity 110. Shoving and propelling of the circumferential edge 47 and lips 112 is executed towards the surface area of terraced bracket 104.

Figure 2H:
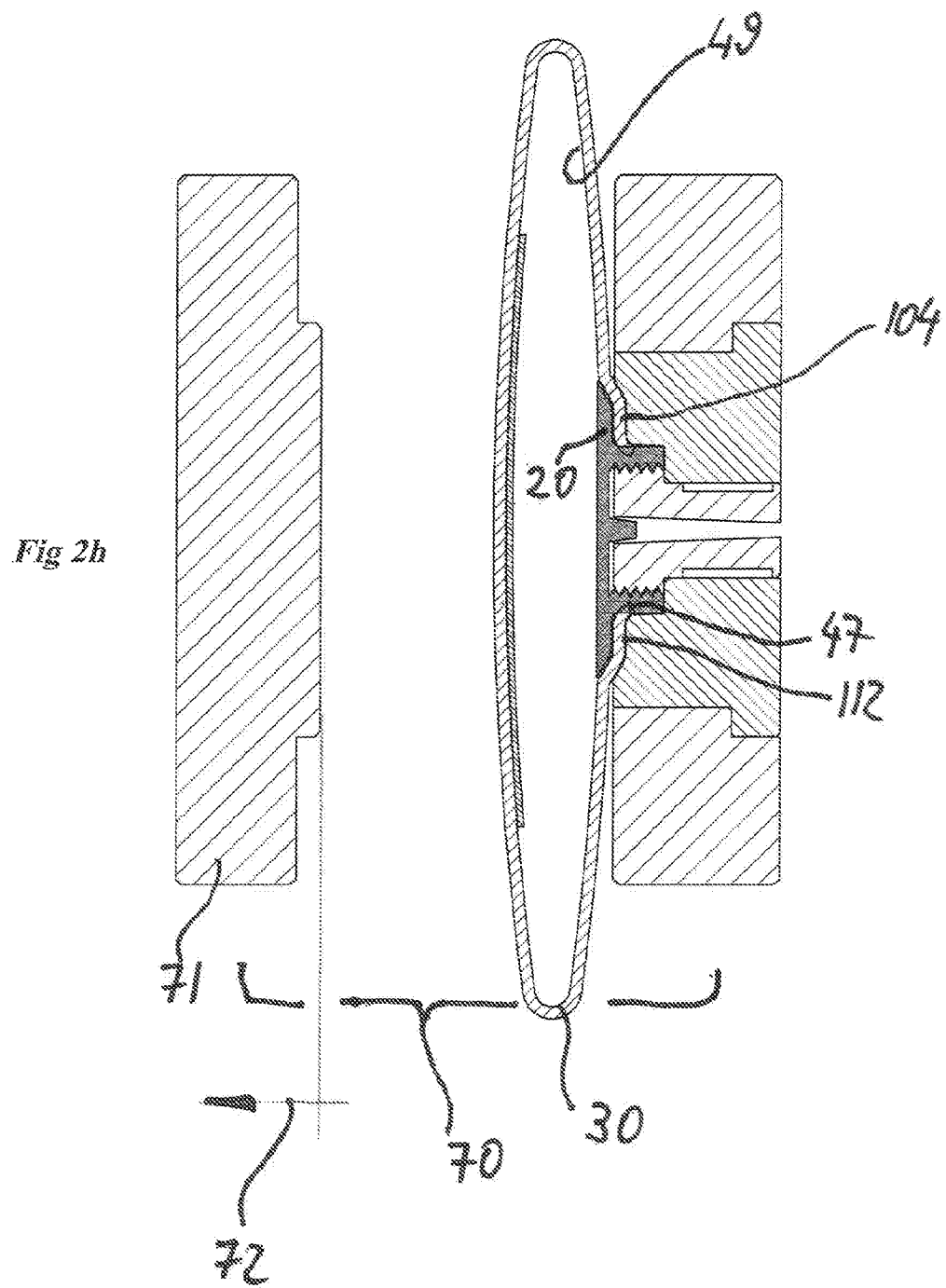

FIG. 2h presents the stage of retreating mold 70 from opening 45 (see propelling the propelled cheek 71 of the mold in the direction of arrow 72). The retreating of the mold leaves behind the material that was injected through it wherein it is formed as bracket 20 that is affixed on the one wall 49 of pipe 30.

In accordance with the illustrated example, in view of the shoving and propelling of the circumferential edge 47 of opening 45 and lips 112 that were executed towards the surface area of terraced bracket 104, the opening edge is found inside the plastic material that was injected to fill up the injection cavity (in a manner that ensures sealing of the opening's edge).

Figure 2I:
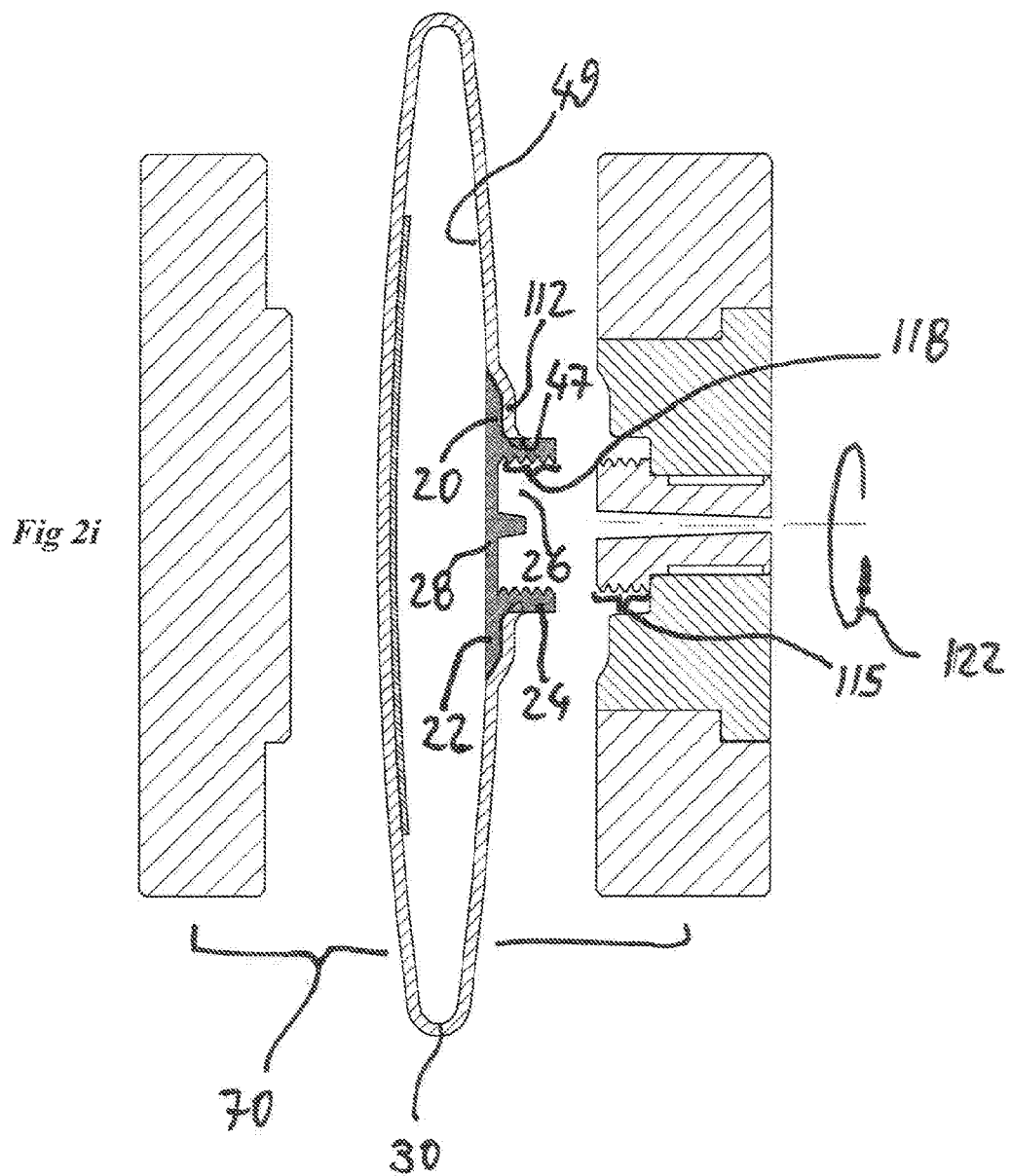

FIG. 2i, similarly to FIG. 2h, also presents the stage of retreating mold 70 from the opening in a manner that it leaves behind the material that was injected wherein it is formed as bracket 20 that is affixed on said the one wall 49 of pipe 30.

In accordance with the illustrated example, from the instant of opening mold 70, bracket 20 is being left as it was formed in the configuration of a bushing endowed with a circumferential flat sector 22 and a reed (cane) sector 24 that protrudes from circumferential sector 22. Circumferential sector 22 is affixed to the inner side of the one wall 49 of pipe 30 (to the inner side of lips 112). Reed sector 24 protrudes from circumferential sector 22 to the external surface area of pipe's 30 wall, wherein—as said, the circumferential edge 47 of the opening, through which passes reed sector 24, is inside reed sector 24 (in a manner that ensures the sealing of the opening edge).

Bracket 20 is formed, as said, as a bushing, which has a central passage 26 that connects between the inside of pipe 30 and the external side of the pipe and enables passage of water through it. In the illustrated example, from the instant of retreating mold 70, residues 28 of the injected plastic material (the angus) are left in the opening of central passage 26. Any professional would understand that these residues might be removed at once (for example—by positioning along the production line, which is presented in FIGS. 1 and 2, of an additional removing station equipped with suiting cutting and removing means) or to be left there and be exploited as a kind of a cork, removable by the farmer in the field, at the time that he would like to install a lateral connector on bracket 20 (and see herein below when referring to FIGS. 11 to 22), (in a manner that would even provide the farmer with operational flexibility as to the locations of the laterals which he wants to (water) feed using the pipe).

Simultaneously, in the illustrated example, also separation means 60 was left inside the pipe but any professional would understand that in accordance with the illustrated example, as a flat sheet that is relatively thin, its being left inside the pipe, would not significantly diminish the water flow rate within the pipe (and anyway it is apt to be disconnected from the pipe wall and be washed away from the pipe wall down the flowing water later on), not to mention the fact that it is possible to combine along the production line that is displayed in FIGS. 1 and 2, also a removal and extracting station for the removal and extracting of separation means 60 out from the pipe, following after the completion of the bracket's forming.

More in accordance with the illustrated example, the circumference of the end of the core component 90 of mold 70 is formed with a thread sector 115 in a manner that it forms the injected material that was injected for filling up cavity 110, with an inner thread sector 118. Therefore, and in order to enable extraction, core component 90 is adapted for rotational movement (see arrow 122) during the retracting step of the mold, in a manner that extracts the end of core component 90 from within bracket 20 (that as said, in accordance with the illustrated example, bracket 20 was formed by injection molding while forming (of) inner thread's sector 118 inside it).

Any professional would understand that in the retreating stage of the mold there might be coupled actuating of additional means for separating (for example—ejectors) or propelling carriages (cheeks) in a manner that would facilitate, inter alia, severing the pipe from the mold (and see hereinafter when reference is given to FIGS. 3 to 6 and 16 to 19).

Any professional would also understand that severing the pipe from the mold would enable, for example, the advancing of the pipe with the bracket as it was formed by injection molding on it, and accurate positioning of an additional sector of the pipe's wall unto being opposite the mold, for the sake of forming a bracket at an additional opening that was earlier formed at the pipe's wall, at a pre-designed distance from the opening in which was formed just now the previous bracket and repeated anew time after time in a continuous process, which is timed and accurate.

Needless to elaborate, that from the instant of completing the process and forming the brackets on the pipe, it is possible to once more flatten the pipe while being engaged in rolling it up anew (as illustrated in FIG. 2), this time—where it carries the brackets for the connectors. Any professional would also understand that unloading the ready pipe, and then (later) rolling it up anew, this time with the brackets that were formed on it, can be executed by the aid of propelled reel means (that are not illustrated).

Injection mold 70, which was described above when referring to FIGS. 2a to 2i, is solely an example, and an additional example—mold 170, would be described now, when referring to FIGS. 3, 3a, 4 and 4a and to FIGS. 5 and 6. In contradistinction to the example illustrated in FIGS. 2a to 2i, in mold 170 bushing assembly 1100 is formed as an assembly that comprises components that are propelled in a direction perpendicular to the core axis 111. This is in addition to the possibility of propelling the core component to a turn around its axis (a possibility that we already pointed out above when referring to FIGS. 2f to 2i).

FIGS. 3, 3a, 4 and 4a constitute schematic views in perspective of injection mold 170 with carriages (cheeks)— 1110 and 1120 that are propelled in a direction perpendicular to the core axis 111, and are implemented for manufacturing a connector's bracket as the one whose forming manner is illustrated in FIGS. 2a to 2i.

FIG. 3 constitutes a view of mold 170 in its closed state—before the injecting of the plastic material, carriages 1110 and 1120 were movably brought to contact towards lengthwise axis 111 of core component 190 (linear motion performed in a direction that is perpendicular to the lengthwise axis of the core component). The carriages' edges are formed with indentations in a manner that from the instant of pinning them together one to the other, there is formed a terraced bracket 1104 (similar to terraced bracket 104, as it was described when referring to FIGS. 2e to 2i).

FIG. 3a constitutes a near view of the area marked A in FIG. 3.

FIG. 4 constitutes a view of mold 170 in its open state—following the injecting the plastic material, carriages 1110 and 1120 are propelled to distance away one from the other (in a linear motion that, as said, is occurring in a direction that is perpendicular to the lengthwise axis of the core component). Any professional would understand that the gap dimension D (see tagging 430) that becomes possible upon opening of the mold and the distancing away of the carriages one from the other, is liable to be larger than the pipe's width dimension in its flattened condition, and as a consequence (result) enable advancing of the pipe's wall in which the opening was formed, while the pipe is in a slightly swelled condition, towards the end of the core component (that might be a rotating core component, in order to enable anchoring of the opening edge to the end of the core component before closing of the mold (that brings about flattening of the pipe)).

FIG. 4a constitutes a near view of the area marked B in FIG. 4.

FIGS. 5 and 6 constitute schematic views in cross section of injection mold 170 with the propelled carriages (cheeks) 1110 and 1120.

FIG. 5 constitutes a cross section view of injection mold 170 in a closed state.

FIG. 6 constitutes a cross section view of injection mold 170 in its open state.

In accordance with the illustrated example, core component 190 is a rotatable component around axis 111 (see arrow 122—similarly to core component 90 as it was schematically described hereinabove while referring to FIGS. 2f to 2i). In the illustrated example, solely a graphical expression was given, hence, also to the bearings and propelling array which enable the turning of the core component—two bearings, one frontal 501 and one rear 503, and a cog (gear) that propels the core component to turn.

Any professional would understand that fabricating the injection mold as said, in manner that enables delineating (of) the injection cavity, and this—also in a way of propelling structural components of the mold into a linear motion that occurs in a direction that is perpendicular to the axis of the mold's core component (and to the length axis of the bracket that is intended to be formed by injection utilizing said mold) has some (hidden) advantages when implemented—such a mold is liable to facilitate both the linkage of the mold's core component to the opening edge in the thin wall of the pipe before the injection, as well as the retreating and separation step of the mold following after the injection, and also to enable forming by the mold, of brackets having a rather complex structures (and on this we will elaborate when referring to FIGS. 16 to 19 at large).

As is illustrated in a schematic mode in FIGS. 2c and 2d and as was pointed at above while relating to them, in the illustrated example, separation means 60 is carried in a converge configuration and propelled through opening 45 into space 32, and toward the second wall 62 of pipe 30. Hereinafter we will elaborate a little in relation to this example while giving reference to FIGS. 7a and 7b and 8a and 8b.

FIGS. 7 and 7b are side views in cross section that present one example of means 50 for positioning separation means 60 inside an already made lay-flat pipe 30 and the manner of its operation. Any professional would understand that means 50 is given to be implemented in an apparatus like apparatus 10 whose parts were illustrated in FIGS. 1 and 2. In accordance with the illustrated example, means 50 for positioning separation means 60 inside pipe 30 and for bringing separation means 60 into contact with second wall 62 of pipe 30 from its inner side, comprises an elongated nozzle means 303 whose end 306 is suited to be propelled trough opening 45 that was formed in the one wall 49 of pipe 30, into the inner space 32 of the pipe and towards the second wall 62 of the pipe from its inner side (in the direction of arrow 309), and to retreat from there (in the direction of arrow 312). Means 350 comprises vacuum mouthpiece 315 operated in a controlled manner wherein it is installed at the end 306 of nozzle means 303 for carrying separation means 60 in a converge configuration, and propelling it through opening 45 at the one wall 49 of the pipe into (the inside) of space 32 of the space and towards the second wall 62 of the pipe from its inner side. Nozzle means 303 comprises means 318 for timed and controlled deployment of separation means 60 from its converged configuration (as illustrated in FIG. 7a) to an open state (as illustrated in FIG. 7b), while affixing it in a deployed state on the second wall 62 of the pipe from its inner space.

In the example illustrated in FIGS. 7a and 7b, controlled means 318 for deploying separation means 60, is a nozzle 321 that is formed on nozzle means 303, for timed biasing (traction) by air pressure of separation means 60 as required for its deployment on the inner wall of the pipe. Any professional would understand that nozzle 321 is liable to be a part of a complete array of nozzles that can be formed on the circumference of nozzle means 303.

Figure 8A:
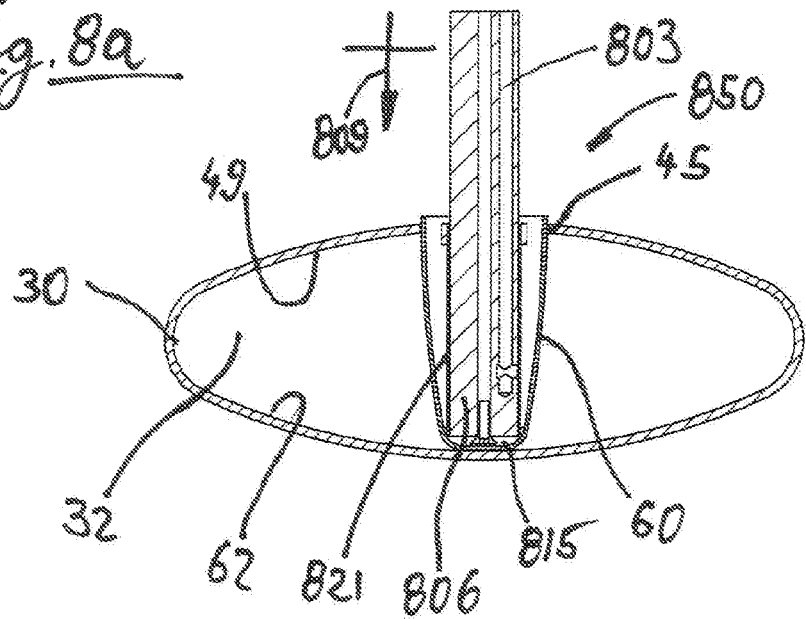
FIGS. 8a and 8b constitute side views in cross sections that present a second example of a means for positioning separation means inside a lay-flat pipe which was formed in advance, and its mode of operation, that can be implemented in an apparatus similar to the apparatus whose parts are illustrated in FIGS. 1 and 2.
Figure 8B:
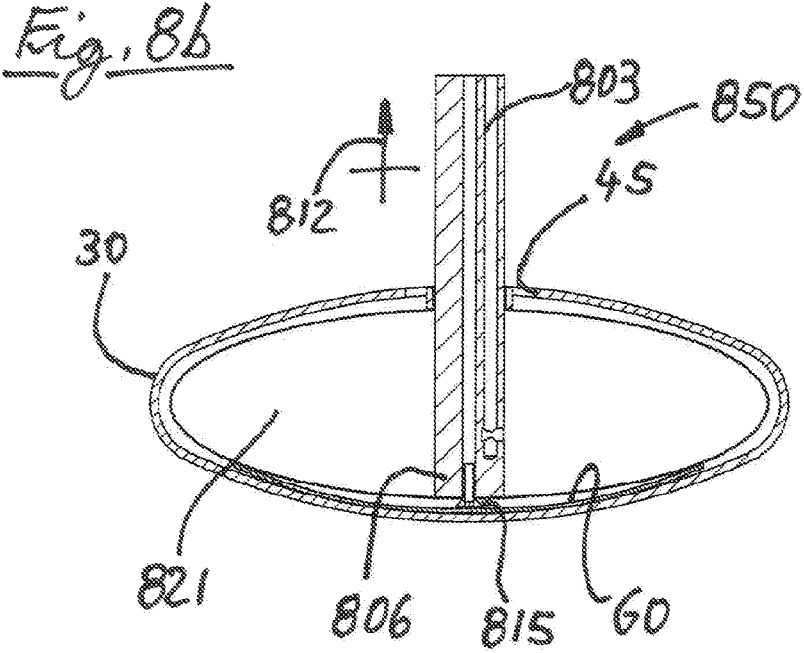

FIGS. 8a and 8b are side views in cross section that present a second example —850, of means for positioning separation means 60 inside a lay-flat pipe 30 that was already made up as a pipe and the manner of its operation. Also as per this second example, any professional would understand that means 850 is given to be implemented in an apparatus like apparatus 10, whose parts were illustrated in FIGS. 1 and 2. In accordance with the illustrated example, means 850 for positioning separation means 60 inside pipe 30 and for bringing separation means 60 into contact with the second wall 62 of pipe 30 from its inner side, comprises elongated nozzle 803 whose end 806 is suited to be propelled through opening 45 that was formed in the one wall 49 of pipe 30 into the inside 32 of the pipe and towards the second wall 62 of the pipe 30 from its inner side (in the direction of arrow 809) and to retreat from there (in the direction of arrow 812). Means 850 also comprises a vacuum mouthpiece 815. Vacuum mouthpiece 815 is operated in a controlled manner wherein it is installed at the end 806 of nozzle means 803 in order to carry separation means 60 in a converge configuration, and for its propelling through opening 45 that was formed in the one wall 49 of a pipe, into the inside 32 of the pipe and towards the second wall 62 of the pipe from its inside (inner) side. Nozzle means 803 comprises means 818 for timed and controlled deployment of separation means 60 from its converge configuration (as illustrated in FIG. 8a) to an open condition (as illustrated in FIG. 8b), while pinning (attaching) it in a deployed condition on the second wall 62 of the pipe from its inner side. In the example illustrated in FIGS. 8a and 8b, controlled means 818 for deploying separation means 60, is inflatable balloon 821 that is positioned around the circumference of nozzle means 803, for timed biasing (traction), by means of inflating it, of separation means 60 (towards the inner wall of the pipe, see in FIG. 8b). Timed emptying of balloon 821 enables retreating nozzle means 803 from inside the pipe.

Thus, as it is schematically depicted in FIGS. 2c and 2d, and was described above when referring to FIGS. 7a and 7b and FIGS. 8a and 8b, positioning of separation means 60 inside the space 32 of pipe 30, comprises the steps of carrying the separation means, propelling it through opening 45 that was formed in the wall of the already made pipe, deploying the separation means and pinning it to the second wall of the pipe from its inner side upon bringing the separation means into contact with it.

Any professional would understand that positioning of functionally equivalent separation means is liable to be executed even at an earlier stage—during the manufacturing phase of the pipe and in a manner that an apparatus in accordance with the invention would not need to implement means for positioning the separation means at a later stage, namely—at the time when the pipe is already formed as such (and as was described above while providing references to the FIGS. 1, 2c-2d, 7a and 7b and also 8a and 8b).

Reference is given to FIGS. 9 and 10. FIG. 9 is a schematic view in perspective of a sector of an already manufactured lay-flat pipe 930 with separation means 960 in a configuration of an elongated strip that was installed in it already in an earlier period while being in the process of manufacturing the pipe (for example—in a pipe manufactured by extrusion, through continuous feeding via a cross head, or—as per another example—in a pipe manufactured by folding a sheet, by continuous gluing along the sheet before folding it and forming it to produce a pipe). FIG. 10 is a schematic view in perspective of a sector of an already made lay-flat pipe sector 1030 with separation means in a configuration of discreet disks 1060 that were installed in advance, during the pipe manufacturing phase (for example in a pipe manufactured by extrusion through a continuous timed feeding one after the other of the disks trough a cross head, or—in another example—in a pipe fabricated by folding a sheet, by timed gluing of the disks, one after the other and along the sheet before it is folded and formed into a tubular pipe).

A lay-flat pipe in accordance with the invention, comprises as said, at least one bracket, that is suited for the installation of a connector means for an irrigation lateral that would be amenable to being fed with water from the lay-flat pipe. Any professional would understand that a complete set of a variation of connectors is apt to be suited to be installed on such a bracket (at most after a preliminary step of breaking and removing a "cork" like of molten plastic material residues—material that could have been left at the central passage opening of the bracket).

So for example, reference is given to FIGS. 11 and 12. FIG. 11 constitutes side view in cross section that presents one example of connector's bracket 20, which is liable to be formed by an apparatus in accordance with the invention (as it was described above when referring to FIGS. 1 to 8 at al.), and connector means 1107 that is installable in bracket 20.

Bracket 20 was manufactured in a configuration of a bushing with an inner threaded sector 118 formed inside it (see above when referring to FIG. 2*i*). Connector 1107 in the illustrated example is a connector of the type known as "tooth" type connector that is formed too, with a matching threaded sector 1118. FIG. 12 constitutes a side view in cross section that presents connector 1107 wherein it is installed inside bracket 20, while connector 1107 is ready for the installation of irrigation lateral 1214 on it, in a manner that lateral 1214 can be fed by water from lay-flat pipe 30.

Figure 13:
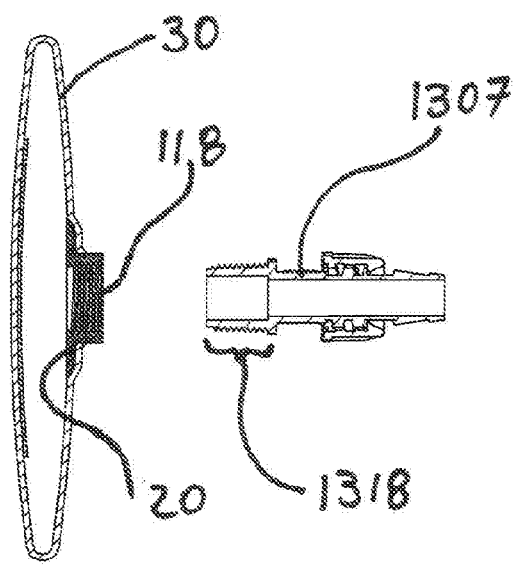
FIG. 13 constitutes a side view in cross section that presents a connector's bracket that can be formed by an apparatus in accordance with the invention as illustrated in FIG. 11, and an example of an additional connector means that can be installed in such a bracket—fastening connector (in the illustrated example—a fastening connector that is known by its commercial nickname—Pro-Grip), wherein it has a matching thread sector.
Figure 14:
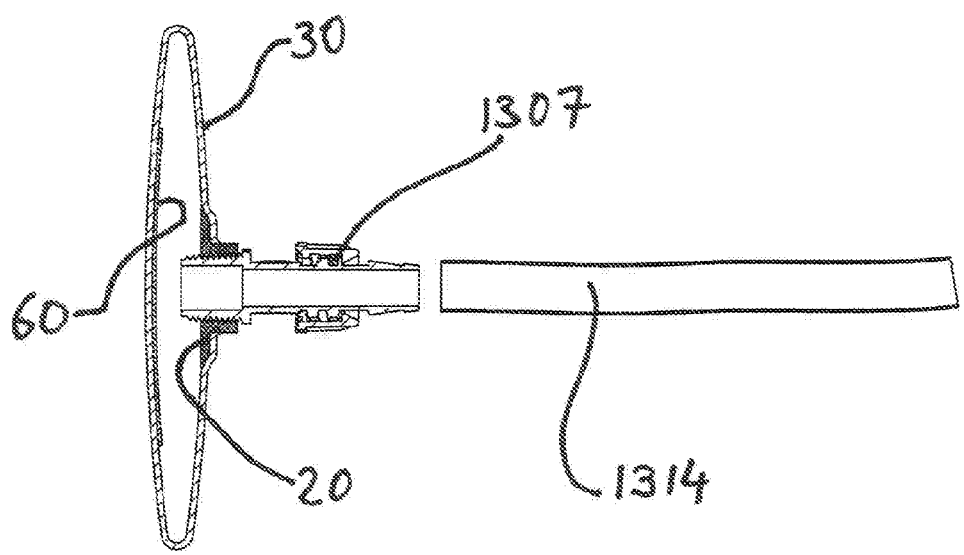
FIG. 14 constitutes a side view in cross section that presents the connector that is illustrated in FIG. 13, wherein it is installed inside the bracket that is illustrated there, where the connector is ready for installing an irrigation lateral on it, in a manner that the lateral will be fed by water from the lay-flat pipe.

As an additional example, reference is given to FIGS. 13 and 14. FIG. 13 is a side view in cross section that presents the same connector's bracket 20 wherein it is formed in pipe 30 and ready to receive a different connector means 1307—fastening connector (in the illustrated example—fastening connector of the kind known in its commercial nickname—Pro-Grip), wherein it too has a threaded sector 1318 matching to inner threaded sector 118 that was formed in bracket 20. FIG. 14 is a side view in cross section that presents connector means 1307, wherein it is installed inside bracket 20, where the connector is ready for installation of irrigation lateral 1314 on it in a manner that the lateral can be fed by water from lay-flat pipe 30.

Figure 15:
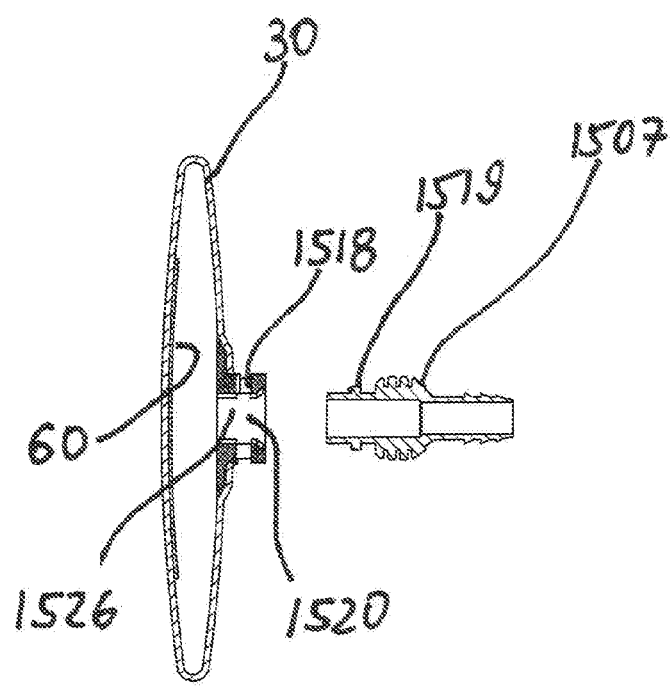
FIG. 15 constitutes a side view in cross section that presents an additional example of a connector's bracket that can be formed by an apparatus in accordance with the invention and a connector means that can be installed in such a bracket—a bracket in the configuration of a bushing with an array of slots that are suited to receive (accept) into them a matching protrusion, as a part of a mechanism known by its nick-name as a "bayonet" connector, and a "tooth" type of connector having a matching protrusion array as said.

As an additional example, reference is given to FIGS. 15 to 22. FIG. 15 is a side view in cross section that presents another example of a connector's bracket —1520, wherein this one too, similarly to bracket 20, is liable to be formed by (using) an apparatus in accordance with the invention. Bracket 1520 is illustrated wherein it is formed in pipe 30, on the side of connector 1507 that is installable in bracket 1520. As different from bracket 20, that, as said, was formed in a configuration of a bushing, with an inner threaded sector, bracket 1520 is formed in a configuration of a bushing with an array of slots 1518, which is formed on the circumference of the central passage 1526 of the bracket. Slots 1518 are suited for receiving within them matching protrusions, and this, as a part of a mechanism of the type known by its name "bayonet" type connector. Connector 1507 is a tooth type connector with an array of matching protruding protrusions 1519, as said.

As we pointed out above, when referring to FIGS. 3 to 6, a mold in accordance with the invention can contain structural components that are moveable in linear motion that occurs in a direction which is perpendicular to the axis of the mold's core component (and to the lengthwise axis of the bracket that is to be injection formed) and this capability provides the possibility of delineating a complex injection cavity that would enable forming by the mold of a bracket having a somewhat complex structure such as bracket 1520.

Reference is given to FIGS. 16, 17, 18 and 19. The figures are schematic views in perspective of an injection mold 1670 with carriages (cheeks)—1610 and 1620 that are propelled in a direction perpendicular to the core's lengthwise axis 1111, as required for the fabrication of bracket 1520.

FIG. 16 is a view of mold 670 in a closed state—the condition before injecting the plastic material. Carriages 1610 and 1620 were brought into contact through a motion towards lengthwise axis 1111 of core component 1690 (a linear motion that occurs in a direction perpendicular to the core's lengthwise axis 1111). The carriages' edges are formed with protrusions 1618 in a manner that from the instant of pinning them onto one another, there is formed an array of protrusions 1618 that form slots array 1518.

FIG. 17 is a near view of the region that is marked A in FIG. 16.

FIG. 18 is a view of mold 1670 in an open state—the mold condition after the injection of the plastic material, carriages 1610 and 1620 are propelled to distance away (retreat) one from the other (in a linear motion that, as said, occurs in a direction that is perpendicular to the lengthwise axis of the core component) Similarly to the mold illustrated in FIGS. 3 to 6, here also any professional would understand that gap D dimension (see tagging 1830) that is enabled upon opening of the mold and distancing backwards of the carriages one from the other, is liable to be larger than the width dimension of the pipe in its flattened condition, and in consequence—(to) enable advancing of the pipe's wall in which the opening was formed, when the pipe is in a slightly swelled condition, towards the end of the core component, that is liable to be a rotating core component, in order to enable anchoring of the opening edge unto the end of the core component before closing the mold (that ensues in flattening the pipe).

FIG. 19 is a near view of the region that is marked B in FIG. 18

Reference is given to FIGS. 20 to 22. FIG. 20 is a schematic view in perspective of bracket 1520 and connector 1507 prior to being installed one to the other via a bayonet connector mechanism. FIG. 21 is a schematic view in perspective of bracket 1520 and connector 1507, wherein they are installed one to the other via the bayonet connector mechanism. FIG. 22 constitutes a side view in cross section that presents bracket 1520 and connector 1507, wherein they are installed one to the other via the bayonet connector mechanism, and wherein connector 1507 is ready to have irrigation lateral 2214 mounted on it, in a manner that the lateral would be liable to be fed with water from lay-flat pipe 30.

Brackets 20 and 1520, as they were described above, are affixed unto the inner surface area of the lay-flat pipe 30, which was manufactured as a pipe in advance. As a pipe of the lay-flat type of pipes, the pipe does swell up to its pipe form as the water pressure in it rises. Increased water pressure and the change in the swelled up profile as an outcome, are liable to exert significant stress on the contacting surfaces (those surfaces between the pipe wall and the bracket)—a condition that might dictate stronger affixation of the bracket unto the pipe's wall.

Figure 23:
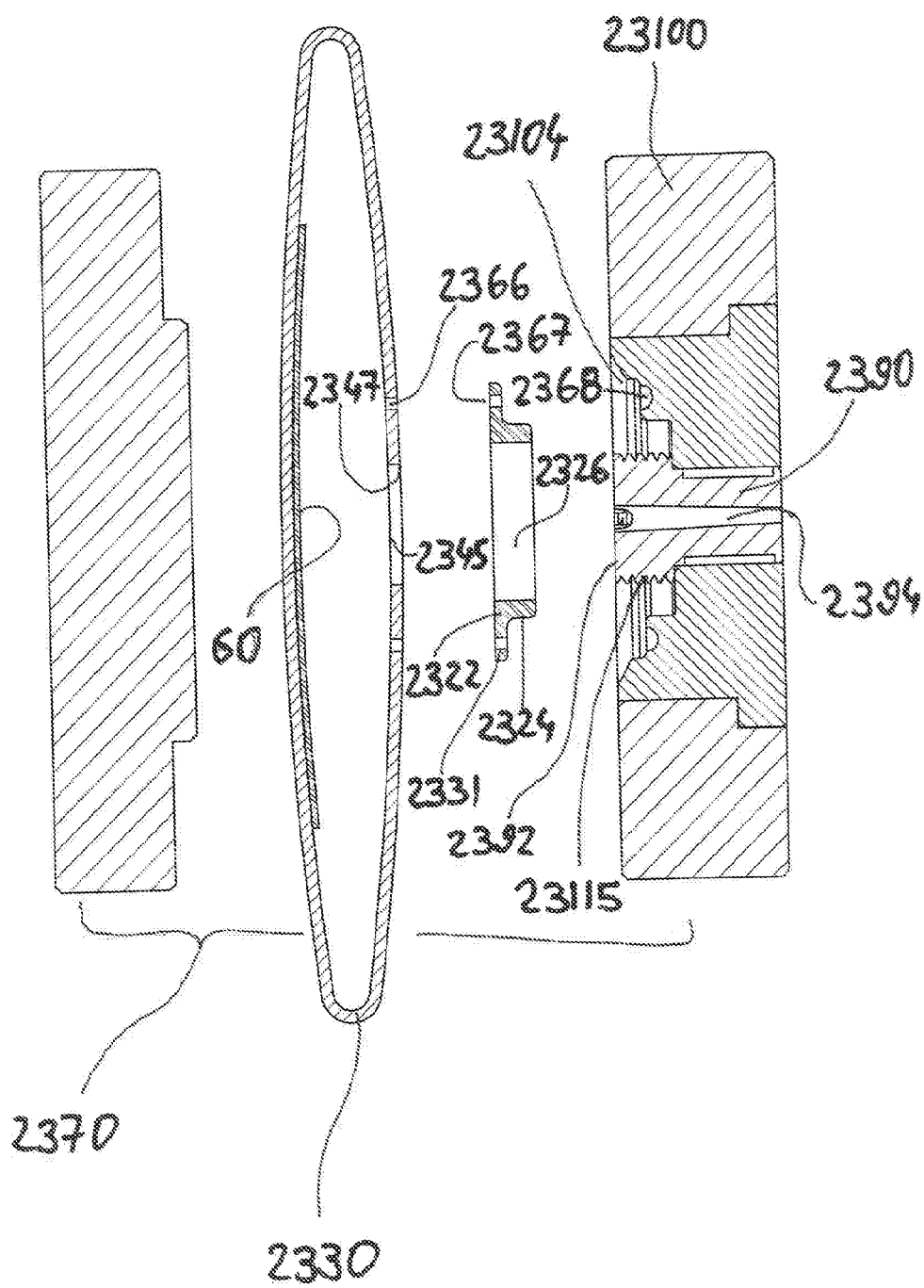
FIG. 23 is a side view in cross section that presents an additional example of components that serve for forming a connector's bracket to an irrigation lateral along lay-flat pipe by an apparatus as the example apparatus whose parts were illustrated in FIGS. 1 and 2. In the illustrated example forming the bracket is as a bi components bracket, one prefabricated in advance and the second one being injected under pressure to a mold in a manner that the molten material would flow through an array of prefabricated bores that extend around an opening with a circumferential edge that was formed on one wall of the lay-flat pipe.

Reference is given to FIG. 23. The figure is a side view in cross section that presents an additional example of a manner of forming a connector's bracket for an irrigation lateral along a lay-flat pipe by utilizing for this purpose an apparatus such as the example apparatus whose parts were presented in FIGS. 1 and 2. Forming the bracket here is as a bi-components bracket. As opposed to the above cited brackets 20 and 1220, bi components bracket is affixed to two sides of the pipe's wall and is therefore more durable against those significant stresses that it might encounter when the water pressure within the pipe increases and the pipe profile swells.

FIG. 23 is a side view in cross section that presents an example of the components that serve to form said bi components bracket. The bracket that would be created would be assembled from two components—the one 2331 is prefabricated (manufactured in advance) and the second (as would be clarified below when referring to FIGS. 24*b* to 24*e*) would be injected into mold 2370 in a manner that the molten plastic material would be made to flow under pressure through an array of openings 2366 (prepared in advance) that extends around opening 2345 with a circumferential edge 2347, which was formed in one wall of lay-flat pipe 2330.

Any professional would understand that for obtaining this example's configuration, when apparatus 10 is given (the apparatus whose components are illustrated in FIGS. 1 and 2), means 40, which serves there to form the opening in said one wall of the pipe, would additionally comprise also means for forming an array of additional openings 2366, which would extend around opening 2345 in such a manner that from the instant of closing of mold 2370 they would be found formed in the opening lips that stick out into the injection cavity. An additional example that does not necessitate forming additional openings in advance, but rather forms them by the pressure of the molten plastic material flow at the time of injection is described below when referring to FIG. 26.

Any professional would understand that the one component that is prefabricated in advance. 2331, is liable to be fabricated from a variety of materials (for example—as a component that is manufactured, also it, by injection of plastic material or from another material (for example—steel)). Moreover, every professional can understand that a bi-component bracket is apt to be manufactured by multi-shots injection to one (single) mold (injection of a first component and then injection of the second one to be linked later to the first injected perform component).

Similarly to mold 70, to which we referred above when referring to FIGS. 2e to 2h, also mold 2370 comprises a core component 2390 that is formed at its end 2392 with at least one passage 2394 for routing the molten material flow, and from the instant of flattening pipe 2330, then the core's end is suited to be positioned inside opening 2345. The mold comprises furthermore, bushing assembly 23100 that is suited for positioning core component 2390 inside it. From the instant of flattening the pipe, the one end 23102 of bushing assembly 23100 is suited for contact with the external side of the pipe's one wall. The one end 23102 of the bushing assembly is also formed with a terraced bracket 23104 that is formed as a socket in it, and in a manner that from the instant of installing core component 2390, terraced bracket 23104 is positioned around the circumferential end of core component 2390 and distance (with a gap) away from it.

Terraced bracket 23104 is formed with an array of depressions 2368 that extend around core component 2390. In the illustrated example, each one of the depressions is formed in the configuration of a hemisphere.

Terraced bracket 23104 is suited to have installed in it, before closing of the mold and injecting the molten plastic material, a pre-fabricated (manufactured in advance) component 2331, which in accordance with the illustrated example, is manufactured in advance by injection into a separate mold which is not illustrated, and as it will be clarified below (when referring to FIGS. 24a to 26 will constitute an integral part of the bi-components bracket. In the illustrated example, pre-fabricated component 2331 is formed in the configuration of a bushing endowed with a circumferential flat sector 2322, a reed sector 2324 that protrudes from the circumferential sector, an array of passages 2367 that are formed in circumferential sector 2322, and a central passage 326 that extends along the bushing length.

Reference is given to FIGS. 24a to 24e. The figures are side views in cross section that present in continuum (sequence) depicting the manner of forming a bi components connector's bracket as per the example illustrated in FIG. 23. Bi-components bracket 2320 is described in the continuum of figures, how it is formed from two components, (the) one 2331—that was fabricated in advance—and the second, 2332, that was formed by injection into mold 2370 in a manner that the injected material affixes to the wall of pipe 2330 also the prefabricated component —2331.

Upon installing the prefabricated component 2331 on terraced bracket 23104 (see FIG. 24a), core component 2390 is positioned inside central passage 2326 of the prefabricated component and with a gap away from it. Passages array 2367 is positioned opposite depressions array 2368 that are formed in terraced brackets 23104 (in a manner that each passage faces a matching depression and is connected with it).

Upon closing mold 3370 (see FIG. 24b), openings array 2366, which in accordance with the illustrated example, is an array of a prefabricated openings and which—as said, extends around opening 2345 that was formed in a one wall of the lay-flat pipe, is positioned opposite to passages array 2367, which is found in the prefabricated component. Passages array 2367 is positioned opposite depression array 2368, which is formed in terraced bracket 23104 (in a manner that every opening appears at its turn opposite a matching passage that in turn is positioned opposite a matching depression and they are all connected one to the other).

Any professional would understand that it is feasible to form the terraced bracket 23104 and prefabricated component 2331 with means that would ensure the correct orientation as required between the arrays of the passages and those of the depressions (for example—an array of socket and matching key into which robotic loading means would aim).

In accordance with the illustrated example, core component 2390 is liable to be suited also to a rotational motion (see arrow 24122) in a manner that enables also anchoring with turning of the end of the core component to the circumferential edge of the pipe's opening. Any professional would understand that for obtaining a preferred affixing of the core's end at the opening's edge in the pipe, indeed a slight swelling of the pipe is also apt to facilitate and clear the path for the core's component end to find its way at the opening's edge. Additionally or alternatively, it is possible to implement a mold with propelled components (as the example molds that were described above while referring to FIGS. 3 to 6 and 16 to 19), and an apparatus that would get the slightly swelled pipe nearer by linear motion towards the core's component end (before closing the mold that leads to the flattening of the pipe).

At this point, from the instant of closing mold 2370, injection cavity 24110 is delineated by separation means 60 and additionally by the surface area of terraced bracket 23104, by surface area of the prefabricated component 2331 that is installed in due time on the terraced bracket and by the external surface area of core component 2390.

At this state, the circumferential edge of the opening at the pipe's wall protrudes, wherein its circumferential lips stick out into cavity 11024 (they are not fastened between rigid plans areas). In the configuration of anchoring the end of a rather rotating core component to the opening's edge, the circumferential edges are slightly distanced from separation means 60 (see the state illustrated in FIG. 24b).

Upon injecting of the plastic material into injection cavity 24110 (see FIG. 24c), the injected material affixes to the wall of pipe 2330 also the one component 2331 that was prefabricated.

Furthermore, in mold 2370 a passage is enabled of molten plastic material through an array of passages 2367 into an array of depressions 2368 (whether after passing the array of openings that were pre-prepared at the pipe's wall (as illustrated in the above-cited figures), or after breaking through of passages at the pipe's wall by the injection pressure (as would be described below when referring to the illustrated example in FIG. 26). Solidification of the plastic material formed a circumferential array of a kind of "rivets" 2466 (see hereinafter when referring to FIG. 26) in a manner that it instills greater durability on affixing the connector's bracket to the wall of the pipe. The circumferential array of a kind of "rivets" that links the two components of the bracket one to the other wherein between them there is the pipe's openings edges, is liable to ensure that the increase of the water pressure and the change in the profile of the pipe (accordingly), would not cause a failure (breaking apart) of the bracket from the pipe's wall, and this even despite the significant stress that would be created.

This and more, similarly to mold 70, to which we referred above in reference to FIGS. 2e to 2i, also as per mold 2370, from the instant of injecting the molten material, it is feasible for the circumferential edge of the opening that protrudes, wherein its lips stick out into the injection cavity, to force its way and to move, due to the pressure of the molten plastic material, towards the surface area of the terraced bracket.

In the configuration of the bi-components bracket, the circumferential edge is pushed and moves also unto the surface areas of prefabricated component 2331 and in a manner that the edges would cling together both on the surface areas of terraced bracket 23104 as well as on the surface area of prefabricated component 2331, while the edge of the opening would be found inside the molten material that is injected to fill up the cavity (in a manner that ensures sealing of the opening's edge).

Figure 24A:
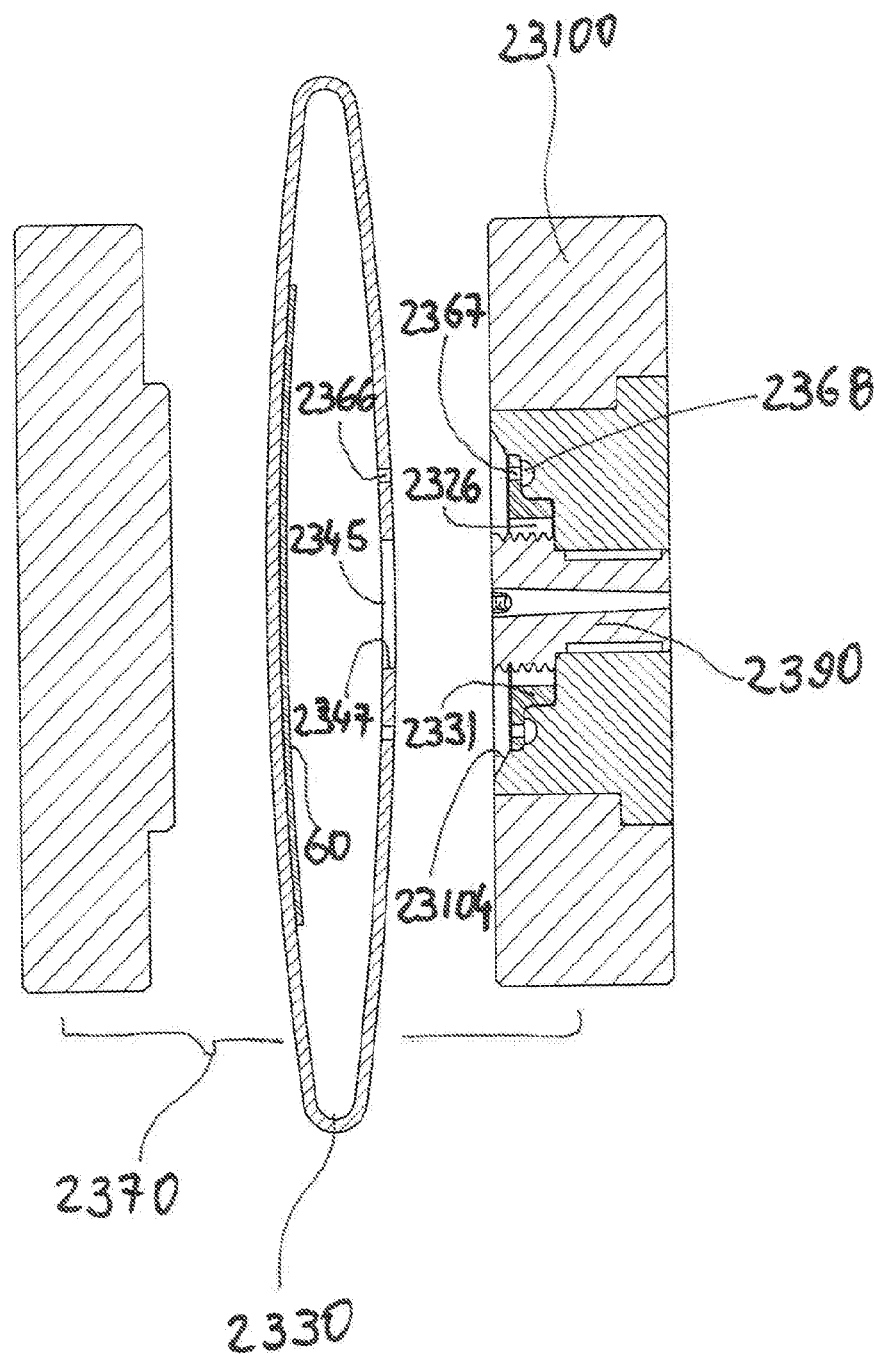
Figure 24B:
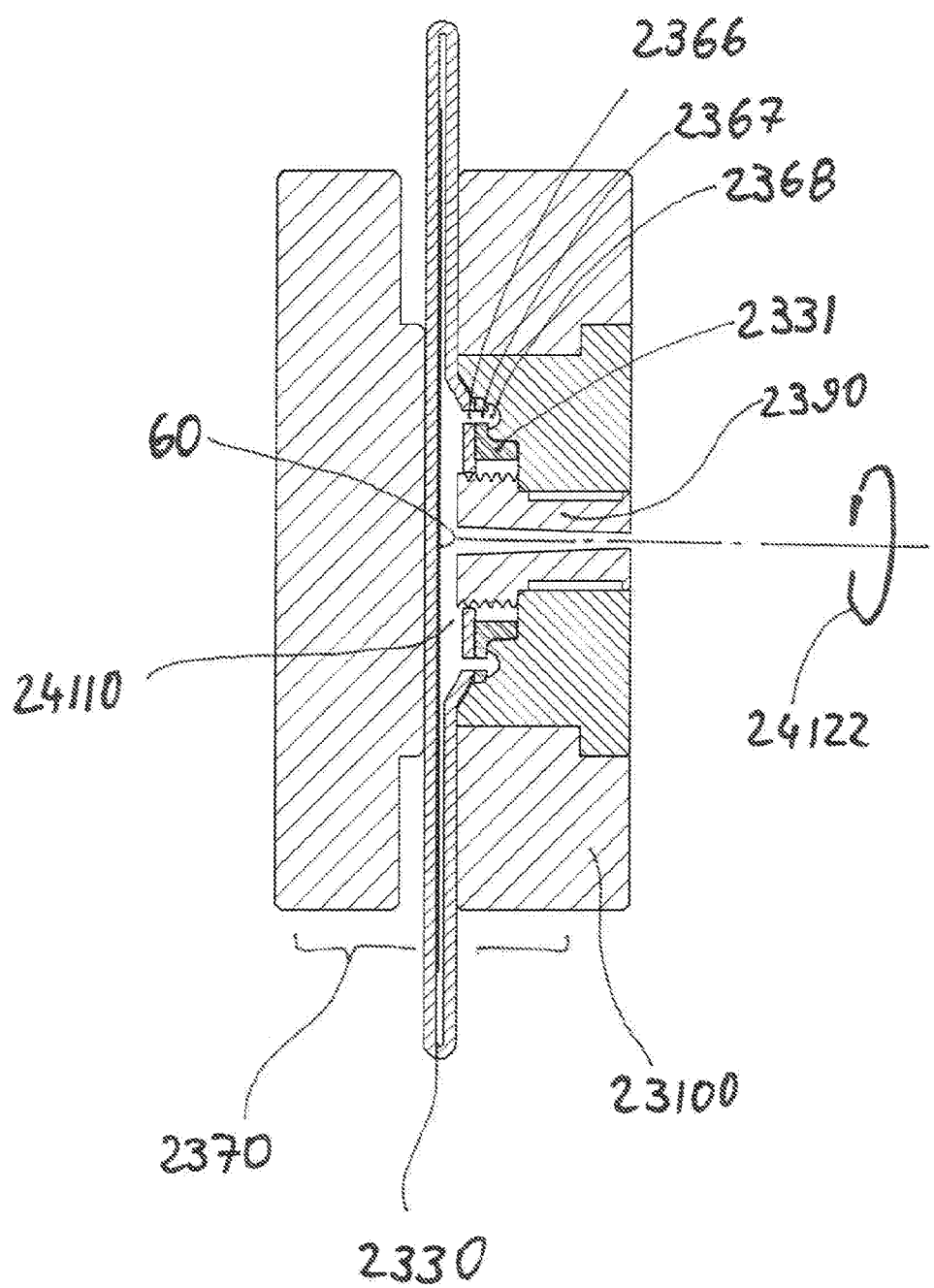
Figure 24D:
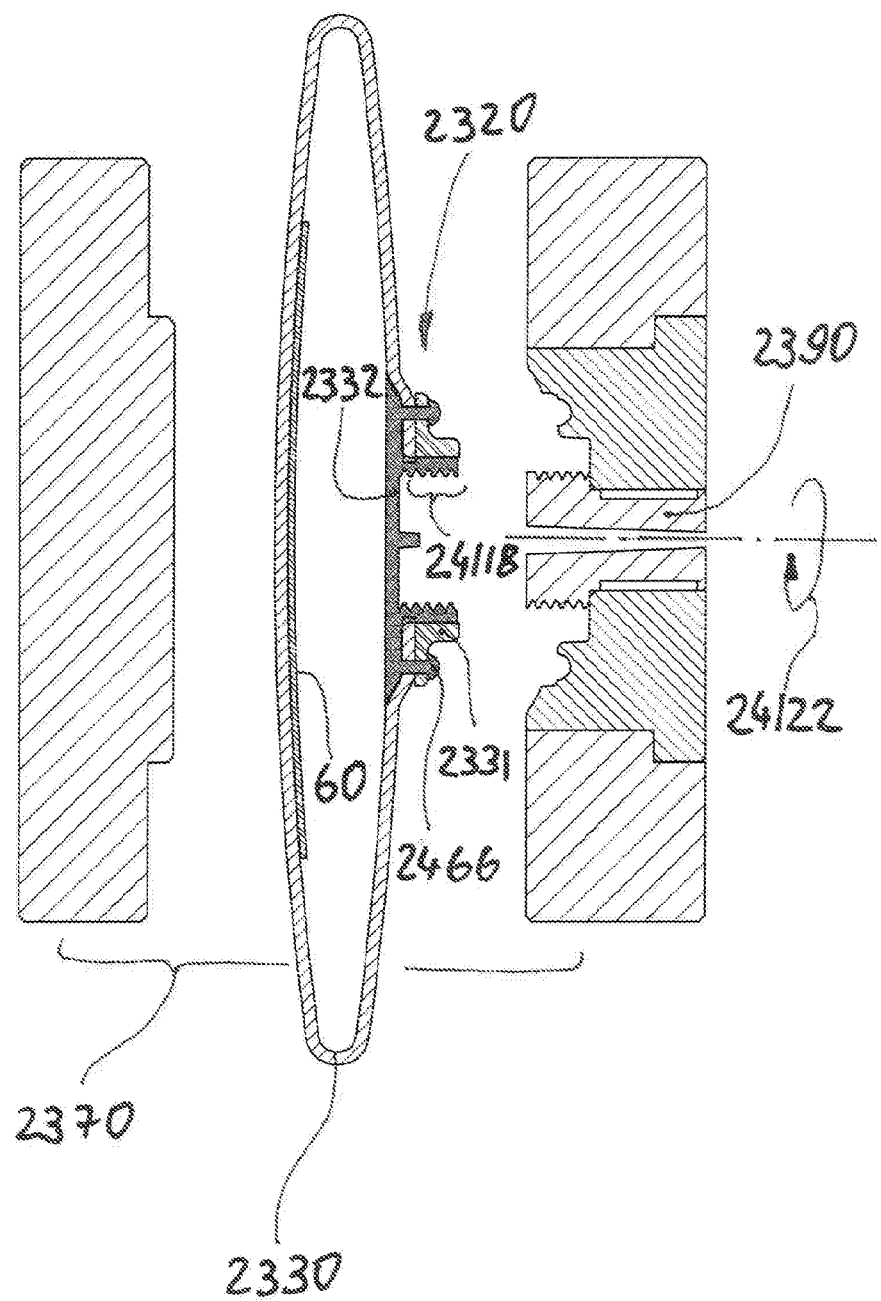
Figure 24E:
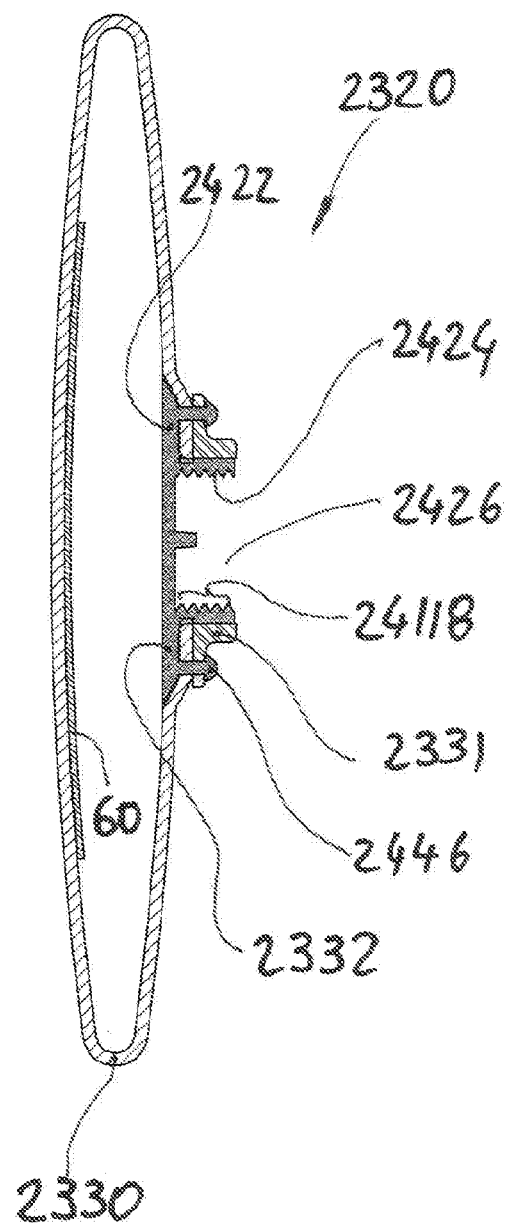

FIGS. 24d and 24e present the step of retreating mold 2370 from opening 2345 in a manner that it leaves bi components bracket 2320 affixed on the one wall of pipe 2330. In accordance with the illustrated example, from the instant of opening mold 2370 bracket 2320 is left wherein it was formed from two components, the one that was prefabricated—2331, and the second 2332 that was injected into the mold. Component 2332, which was formed by injection to the mold, is formed in a configuration of a bushing having a circumferential flat sector 2422 and reed sector 2424 that protrudes from circumferential sector 2422. Circumferential sector 2422 is affixed to the inner side of the one wall of the pipe. Reed sector 2424 is formed by injection, wherein it protrudes from circumferential sector 2422 to the outwards from the outer surface area of the pipe's wall.

Following the injecting of the molten plastic material, the circumferential edge of the opening in the pipe wall through which the reed sector passes, is found inside, as said, the molten material that forms the reed sector (in a manner that it ensures sealing of the opening edge).

Component 2332 that was injected into the mold, is formed also with a central passage 2426 that connects the inside of the pipe to its outer side and enables passage of water through it (subject to removal of residues of the molten material (as if it was left as kind of a "cork")).

The component 2331, which was manufactured in advance (prefabricated as said), is formed too (and see FIG. 23) in a configuration of a bushing with a flat circumferential sector 2322 and reed sector 2324 that protrudes from the circumferential sector and with a central passage 2326 alongside the bushing. In addition, as said, prefabricated component 2331 is formed with a circumferential array of passages 2367 that are formed in the flat circumferential sector 2322.

Following the forming, as said, by injection molding (as illustrated in FIG. 24d), the protruding reed sector 2424 of component 2332 that was injected into the mold, is affixed to the inner plane surface area of central passage 2326 of prefabricated component 2331. In addition, molten plastic material fills up the circumferential array of passages 2367 while it protrudes from the second side of flat circumferential sector 2322 of prefabricated component 2331 unto providing a circumferential array of the like of "rivets" 2466 and in manner that the injected material affixes to the wall of the pipe—also the one part 2331 that was prefabricated.

More as per the illustrated example, similarly to mold 70 to which we referred above when giving reference to FIG. 2i, also in mold 2370 (see FIG. 23) the end of core component 2390 in mold 2370 is formed on the core circumference with a threaded sector 23115 in a manner that it forms the molten material, which was injected to fill cavity 24110 with an inner threaded sector 24118 (see FIG. 24d).

Hence, and in order to enable extraction, core component 2390 is suited to rotational motion (see arrow 23122 in FIG. 24d) while being in the retreating stage of the mold in a manner that it extracts the end of core component 2390 from bracket 2320 (as said, in accordance with the illustrated example, the second component 2332 of the bracket, the one that was formed by injection molding through mold 2370, was formed with an inner threaded sector 24118 inside it).

In the illustrated example in FIGS. 23, and 24a to 24e, the driving of the molten material to flow was executed through an array of openings 2366, which were formed in advance in the wall of the pipe. Another possibility is exploiting the injection pressure to form the openings.

Figure 25:
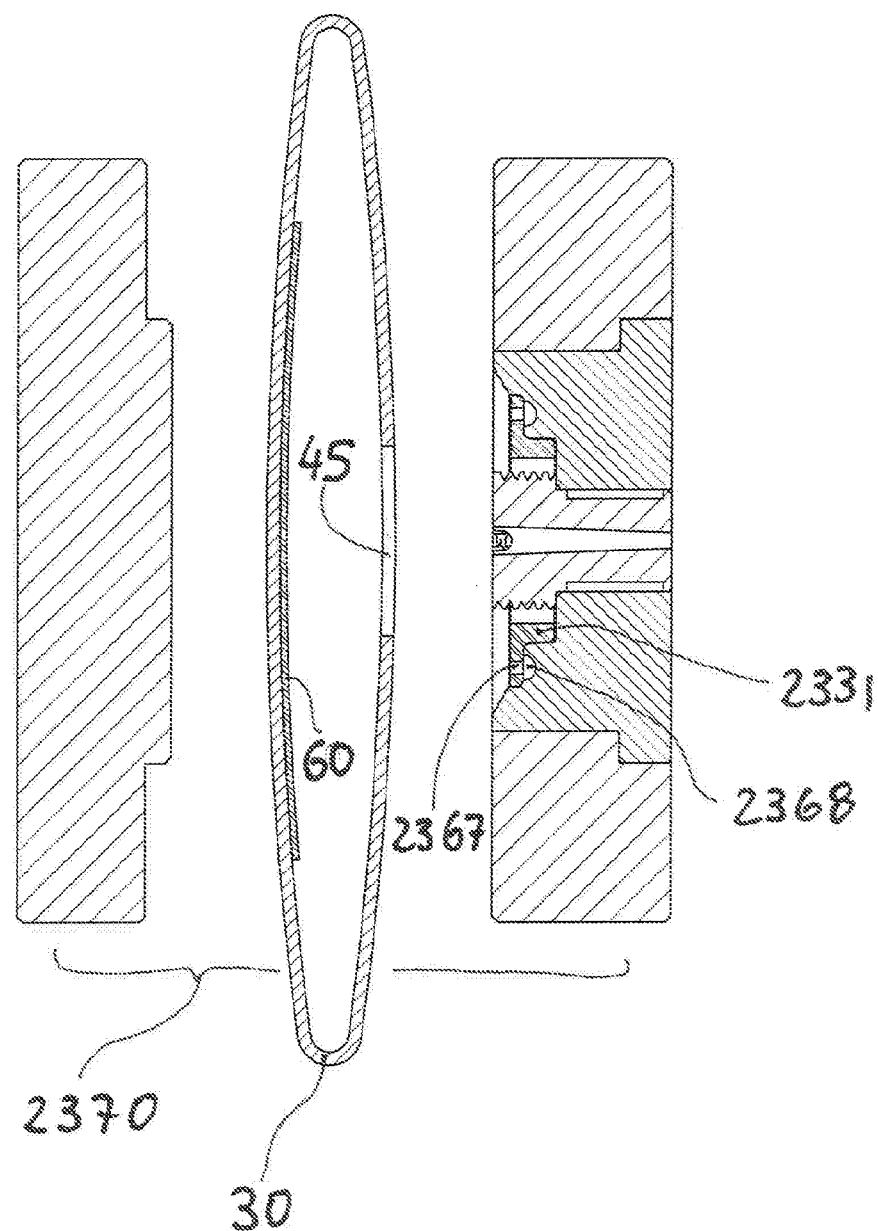
FIG. 25 constitutes a side view in cross section that presents an additional example of the manner of forming a bi component connector's bracket—similarly to the example that was illustrated in FIGS. 23 and 24a to 24e. The one component is prefabricated while the second one is injected into the mold in a manner such that the molten injected material under pressure would erupt (break) passages around the opening with the circumferential edge that was formed at a one wall of the lay-flat pipe.

Reference is given to FIG. 25. The figure is a side view in cross section that presents an additional example of the manner of forming a bi components connector's bracket similar to the example that was illustrated in FIGS. 23 and 24a to 24e—the one component 2331 is manufactured in advance (prefabricated) and the other one is injected into mold 2370 in a manner that the molten material would break for itself, by the pressure, openings around opening 45, which was formed in the one wall of the lay-flat pipe 30 (a pipe without an array of additional openings ready in advance, except opening 45). Any professional would understand that the high injection pressure (for example—1,000 bar) is sufficient to break open the passages in the pipe's thin wall.

Reference is given to FIG. 26. The figure is a view from the outside of a sector of a pipe that might be pipe 2330 (a pipe in which an array of additional openings 2366 was formed in advance), (and according to the illustrated examples in FIGS. 23 and 24a to 24e), or a pipe 30 (a pipe in which the array of openings is formed by the pressure of the molten plastic material flowing during the injection run), (in accordance with the illustrated example in FIG. 25). In the illustrated pipe sector a bi components bracket 2320 was formed for a connector of an irrigation lateral in accordance with the examples illustrated in FIGS. 23, 24a to 24e and 25, and in a manner that presents the circumferential array of a kind of "rivets" 2466 as they were created by the flow of the molten plastic material unto the surface area of the prefabricated component 2331 of the connector's bracket.

Similarly to the description of the variety of connectors, as given above while referring to FIGS. 11 to 22 and brackets 20 and 1520, also bi components brackets are liable to be installed with a variety of connectors from different types (after removing the residual injected material—as much as was left in the brackets as a kind of a "cork", for anchoring an irrigation lateral that would be given to be fed by water from the lay-flat pipe).

So, for example, reference is given to FIGS. 27 and 28. FIG. 27 is a side view in cross section that presents one example of a bi components connector's bracket 2320 that is formable by an apparatus in accordance with the invention (as was described with reference to FIGS. 1, 2, 23, 24*a* to 24*e*, 25 and 26), and connector means 2707 that is installable in bracket 2320. Bracket 2320 was created in a bushing configuration with a sector of an inner thread 23118 formed inside it (see above, where referring to FIGS. 24*d* and 24*e*). Connector 2707 in the illustrated example is a connector of the "tooth" type of connector that is also formed with a matching threaded sector 2718. FIG. 28 is a side view in cross section that presents connector 2707, wherein it is installed inside bracket 2320, while connector 2707 is ready for the installation of irrigation lateral 2814 on it in a manner that lateral 2814 could be fed with water from lay-flat pipe 2330.

Figure 29:
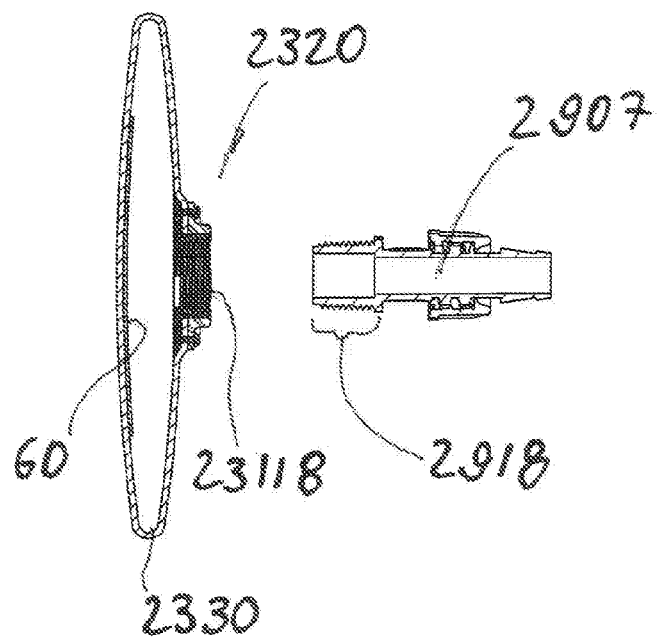
FIG. 29 constitutes a side view in cross section that presents the bi components connector's bracket illustrated in FIG. 26, and an example of an additional connector means that is installable in such a bracket—fastening connector (in the illustrated example—fastening connector of type that is known by its nickname—Pro-grip), that has a matching threaded sector.
Figure 30:
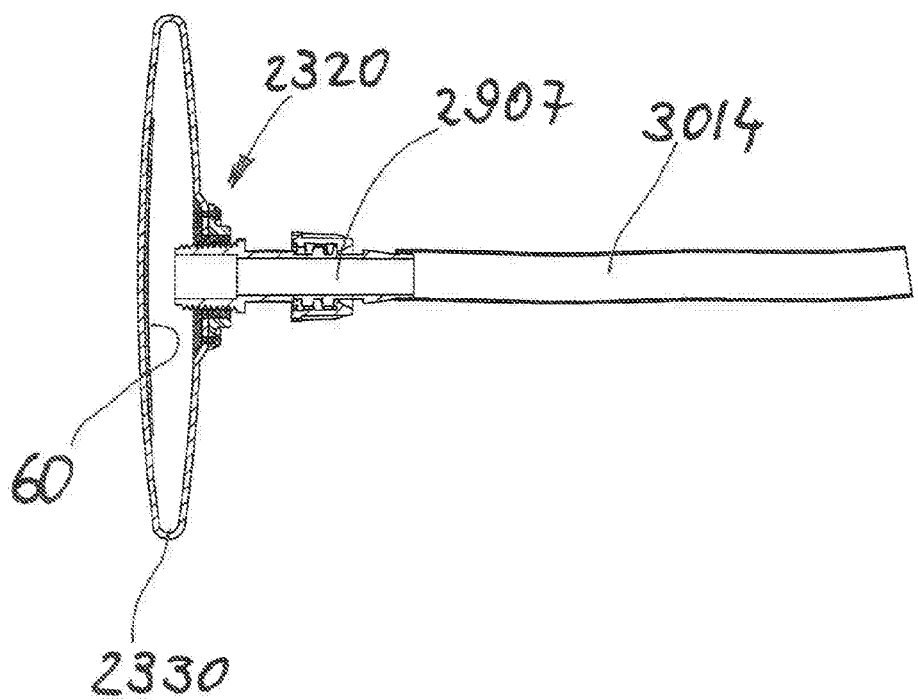
FIG. 30 constitutes a side view in cross section that presents the connector illustrated in FIG. 29, wherein it is installed inside the bracket that is illustrated there and the connector is ready to have an irrigation lateral installed on it in a manner that the lateral would be liable to be fed by water from the lay-flat pipe.

As an additional example, reference is given to FIGS. 29 and 30. FIG. 29 is a side view in cross section that presents the same bi components connector's bracket 2320 wherein it is formed in pipe 2330 and ready to receive another connector means 2907—fastening connector (in the illustrated example—fastening connector from the kind known commercially as Pro-Grip), wherein it too, has a matching threaded sector 2918 to inner threaded sector 23118 that was formed in bracket 2320. FIG. 30 is a side view in cross section that presents the connector 2907, wherein it is installed inside bracket 2320, and the connector is ready for installing an irrigation lateral 3014 on it, in a manner that the lateral would be fed with water from lay-flat pipe 2330.

Figure 31:
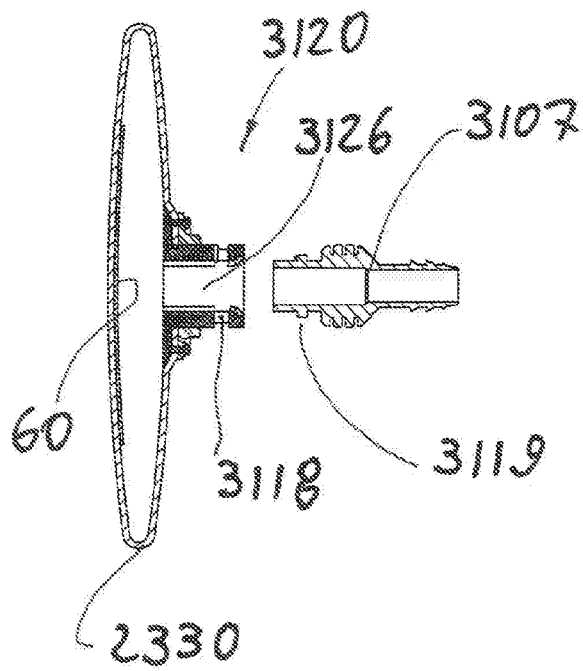
FIG. 31 constitutes a side view in cross section that presents an additional example of a bi components bracket and a connector means that is given to be installed in a bi components bracket—a bi component bracket in the configuration of a bushing with an array of slots that are suited to receive matching protrusions in them as a part of a mechanism of the type known by its nickname "bayonet" connector, and a "tooth" connector having a sector with an array of matching protrusions as said.
Figure 32:
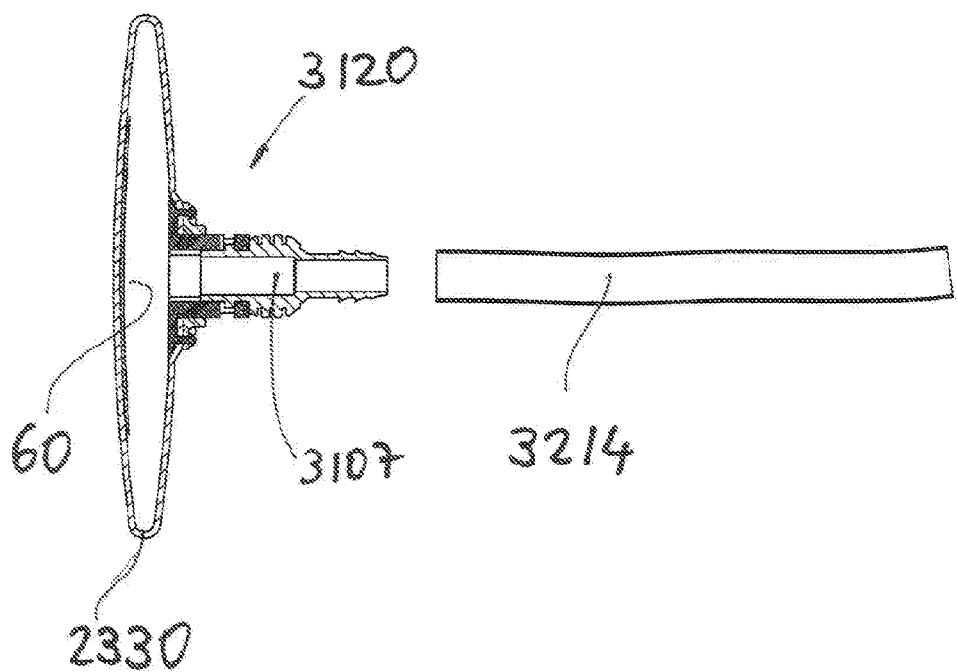
FIG. 32 constitutes a side view in cross section that presents the connector and the bi component bracket that are illustrated in FIG. 31—wherein they are installed one to the other through the bayonet connector mechanism, wherein the connector is ready to have an irrigation lateral mounted on it in a manner that the lateral would be fed by water from the lay-flat pipe.

As yet another additional example, reference is given to FIGS. 31 and 32. FIG. 31 is a side view in cross section that presents another example of a bi components connector's bracket 3120. Bracket 3120 is illustrated wherein it is formed in pipe 2330 alongside with connector means 3107 that is installable in bracket 3120. As different from bi components bracket 2320 that, as said, was formed in the configuration of a bushing with an inner threaded sector, bracket 3120 is formed in a configuration of a bushing with an array of slots 3118 that is formed on the central passage 3126 of the bracket. Slots 3118 are suited to receive in them matching protrusions, and this—as a part from a mechanism of the type that is known by its nick name—"bayonet" connector.

Any professional would understand that that similarly to a bi components bracket 2320, also bi components bracket 3120 is formable by an apparatus in accordance with the invention. This, in view of FIGS. 16 to 19, which, as said, present an injection mold with carriages (cheeks) propelled in a direction perpendicular to the core axis for the sake of creating a connector's bracket in a bushing's configuration with an array of slots suited to receive matching protrusions in them as a part of a mechanism of the type known by its nickname—"bayonet" connector.

Connector 3107 is a tooth connector with an array of matching protrusions 3119 as said. FIG. 32 is a side view in cross section that presents connector 3107 and bracket 3120 wherein they are installed one on the other by a bayonet connector mechanism, wherein connector 3107 is ready for installing an irrigation lateral 3214 on it, in a manner that the lateral would be given to be fed with water from lay-flat pipe 2330.

Forming connectors' brackets according to the invention by the injection molding technique, enables also forming integral brackets with other (more) useful means, for example—filter means.

Figure 33A:
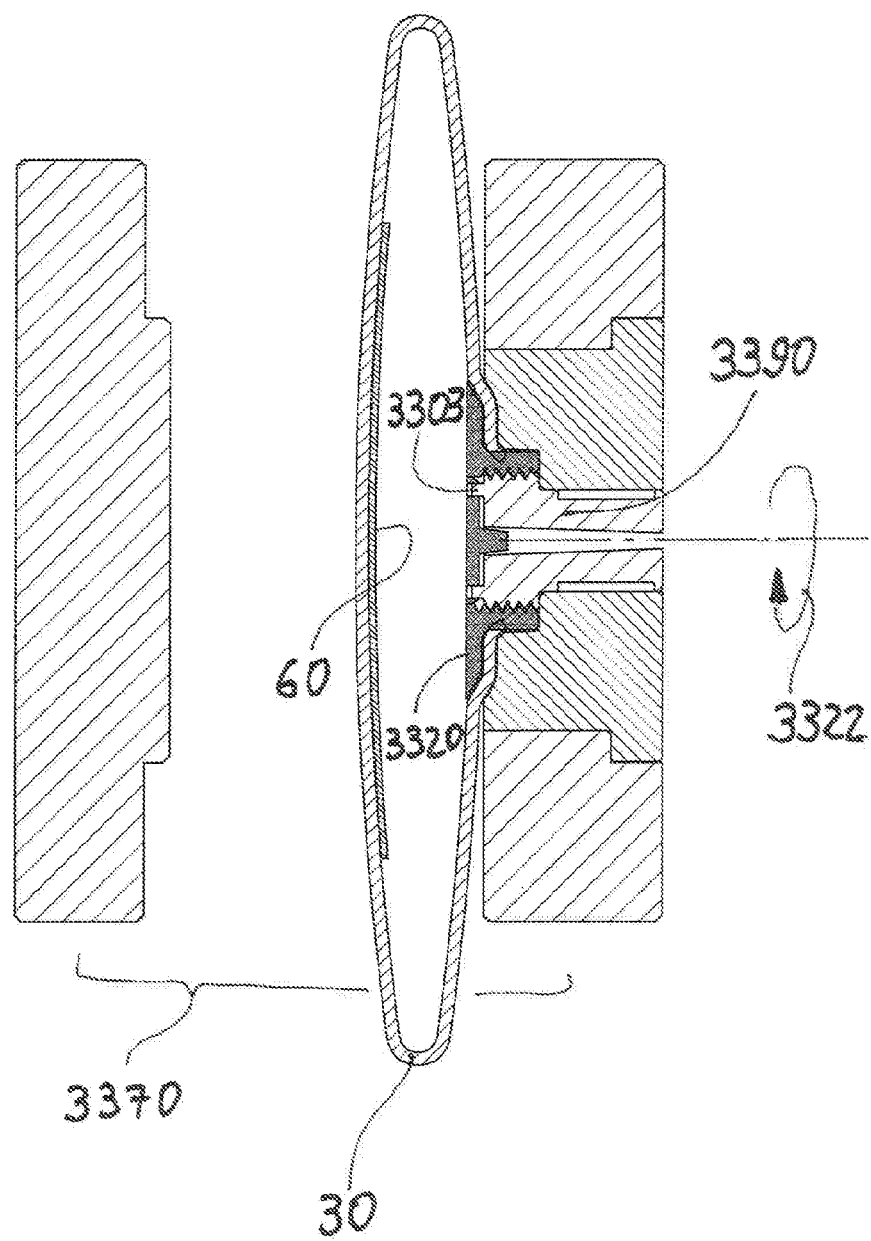
FIGS. 33a and 33b constitute side views in cross section that present a sequence (continuum) of the retraction stage of the mold parts following after the forming of connector's bracket to an irrigation lateral along a lay-flat pipe in accordance with one example of the invention, wherein the connector's bracket is formed with a built-in filter component means for filtering the water to be passed by it from the lay-flat pipe and through the connector that would be installed on it and unto the irrigation lateral that would be installed on it.
Figure 33B:
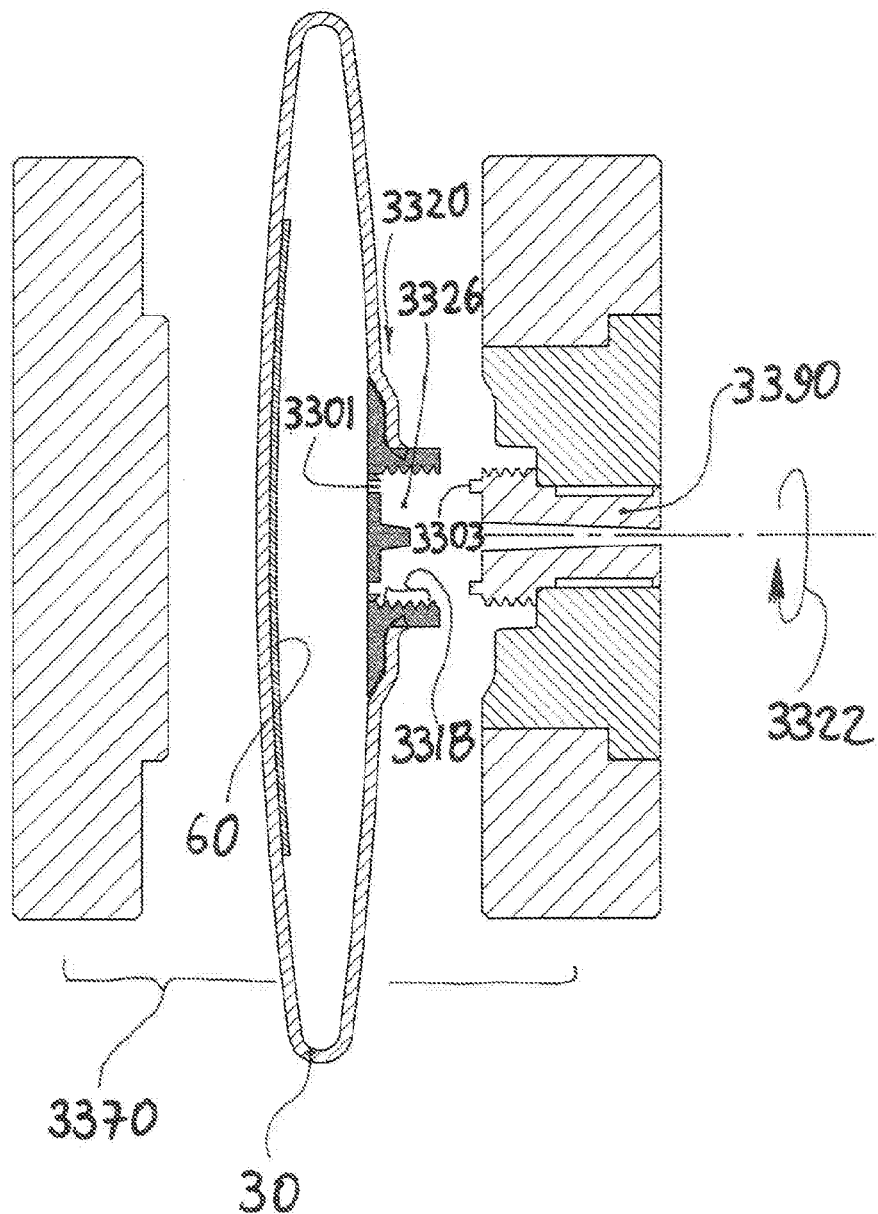
Figure 35:
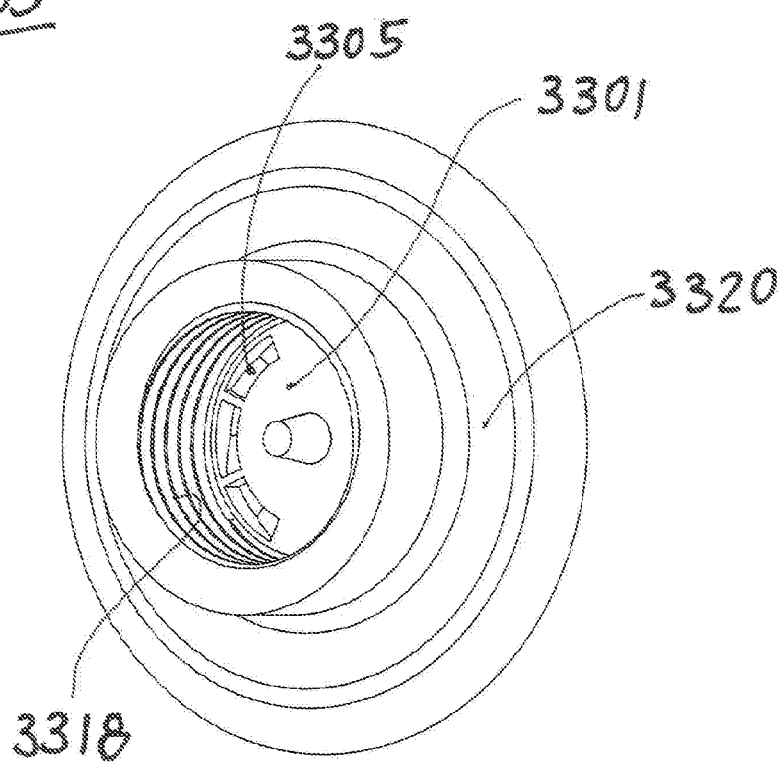
Figure 34:
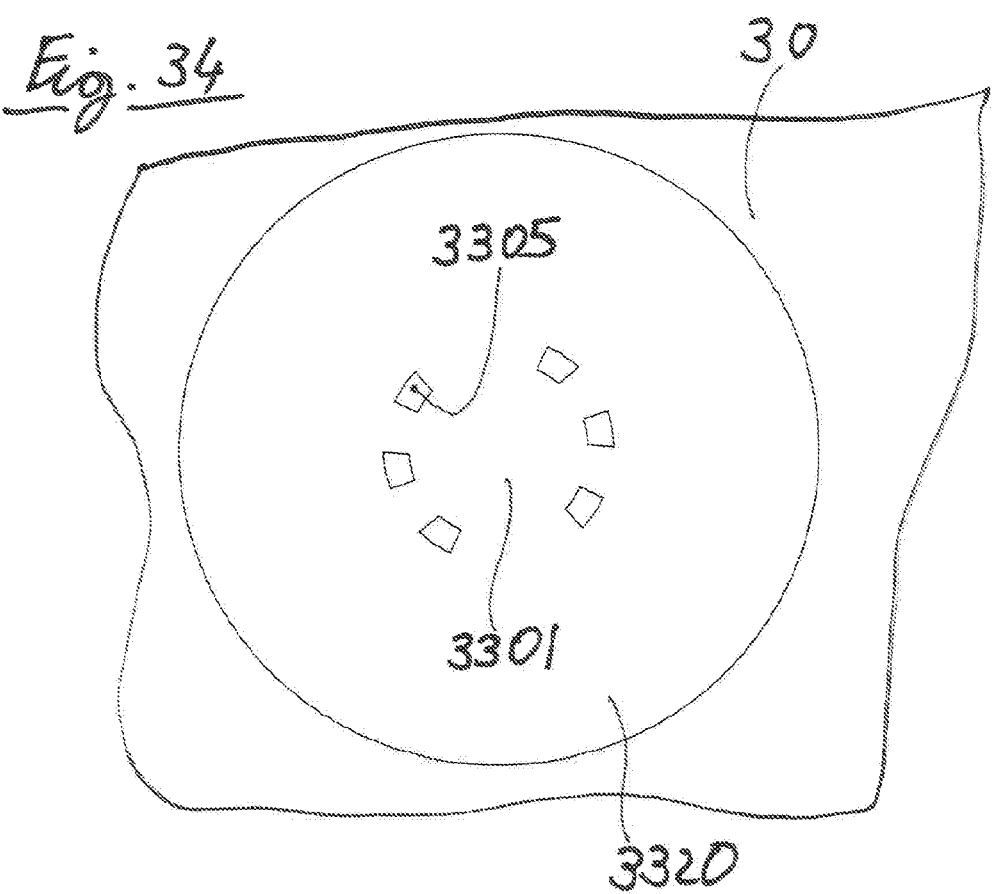
FIG. 34 constitutes a view from inside the lay-flat pipe towards a sector in the one wall of the pipe on which a connector's bracket with a built-in filter in accordance with FIGS. 33a and 33b was formed FIG. 35 constitutes a schematic view in perspective of the connector's bracket with a built-in filter component means that was formed in accordance with FIGS. 33a and 33b.

Reference is given to FIGS. 33*a*, 33*b*, 34 and 35. FIGS. 33*a* and 33*b* are side views in cross section that present by a continuum (sequence) of views, the stage of the mold retreating following the formation of connector's bracket 3320 for an irrigation lateral along a lay-flat pipe 30, wherein connector's bracket 3320 is formed with built in filter means 3301 in order to filter the water that will pass through it from lay-flat pipe 30 and through a connector that would be installed on it—to the irrigating lateral that would be installed on it. FIG. 34 is a view from the inside of lay-flat pipe 30 towards a sector in the one wall of the pipe that on it connector's bracket 3320 was formed with built in filter means 3301. FIG. 35 is a schematic view in perspective of connector's bracket 3320 with built in filter means 3301.

Core component 3390, which serves in mold 3370 for forming bracket 3320, is formed at its end with a circumferential array of protrusions 3303 that from the instant of flattening the pipe (closing the mold before injecting) are brought into contact with separation means 60. Core component 3390 is suited to rotational motion (see arrow 3322) while retreating the mold. In this manner it extracts protrusions 3303 from the bracket as it was formed during the injection molding while forming the built in filter means 3301 for filtering the water that would pass through it from the lay-flat pipe and through the connector that would be installed on it and to the irrigation lateral that would be installed on it. From the instant of extracting core component 3390, the central passage 3326 of connector's bracket 3320 is left wherein there is formed on its side facing the interior of pipe 30 an array of openings 3305 (resulting from extracting protrusions array 3303). Openings array 3305 constitutes the built in filter means 3301 for filtering the water that would pass from the pipe and through the connector that would be installed on bracket 3320 to the irrigation lateral.

Any professional would understand that from the instant that in accordance with the illustrated example, wherein extracting of the core component occurs in a rotational motion, then bracket 3320 is liable to be formed—not only with built in filter means—but also and additionally, with a threaded sector 3318 that extends along central passage 3326 and is suited for installing a connector on it.

Any professional would also understand that an integral forming of filter means can be combined with and implemented in a similar manner, also in the process of forming bi components connector's brackets in accordance with the invention (as such a process were described above when referring to FIGS. 23, 24*a* to 24*e* and 25).

By virtue of the explanations that were given above while referring to the accompanying figures, any professional will surely understand correctly that a dominant characteristic of an apparatus for forming brackets of connectors for irrigation laterals along a lay-flat pipe which was prefabricated as a tubular pipe in advance, in accordance with the invention, and of the method for forming brackets for the connectors as described (along a lay-flat pipe which was prefabricated as a tubular pipe in advance) in accordance with the invention, is the separation means that is positioned inside the inner space of the pipe and participates in the delineating (defining) of the injection cavity. In the examples as they were described above, while referring to the accompanying figures, the separation means was described as a sheet that is given to be affixed to the second wall of the pipe from the instant of it being brought into contact with it. Nevertheless, any professional would understand that we discussed this solely as an example, and in the apparatus and the method according to the invention it is feasible to use also different and other separation means.

Figure 36:
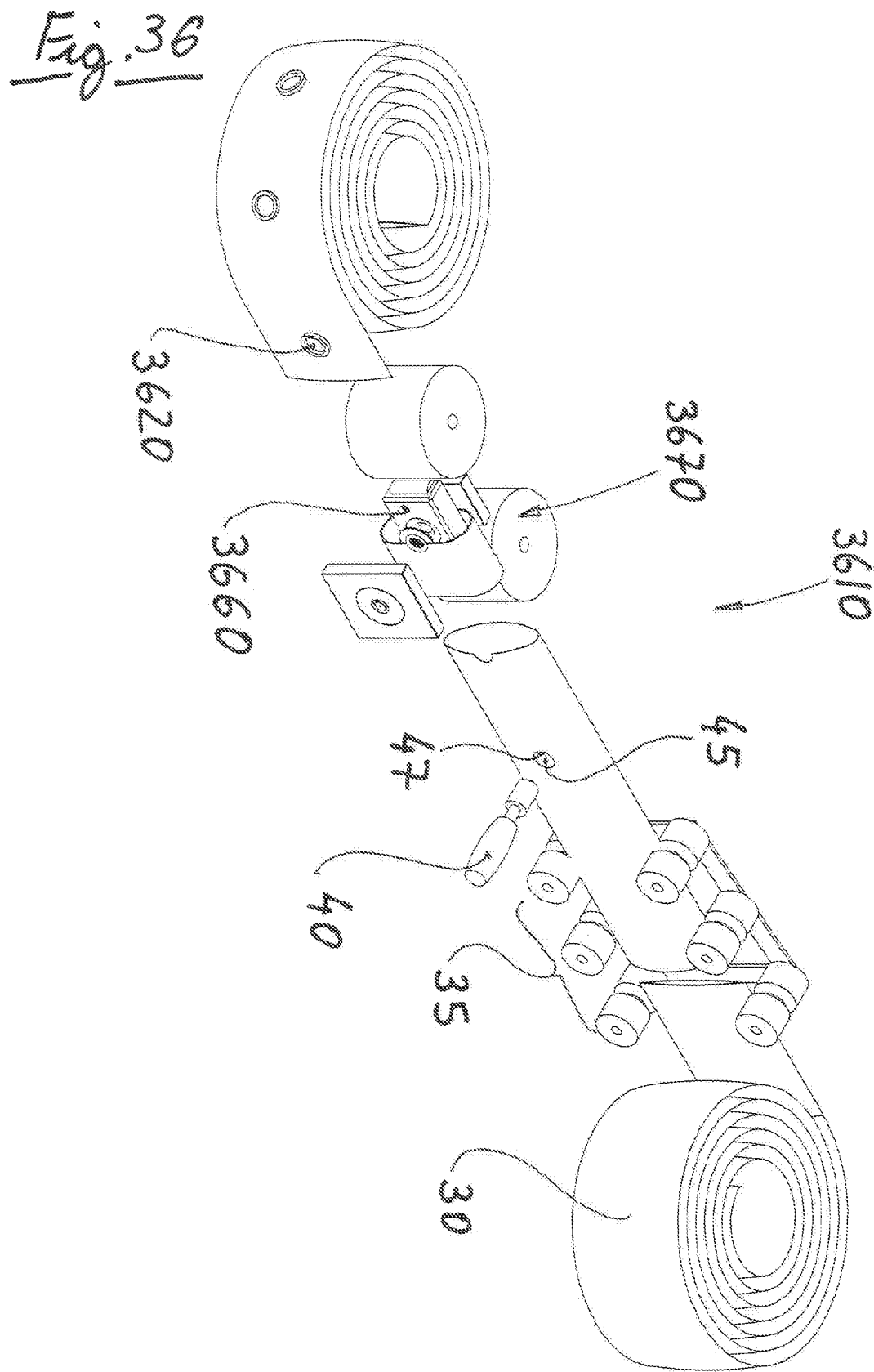
FIG. 36 constitutes a schematic view in perspective of a second configuration of an apparatus for forming connector's brackets for irrigation laterals along a prefabricated lay-flat pipe.
Figure 38C:
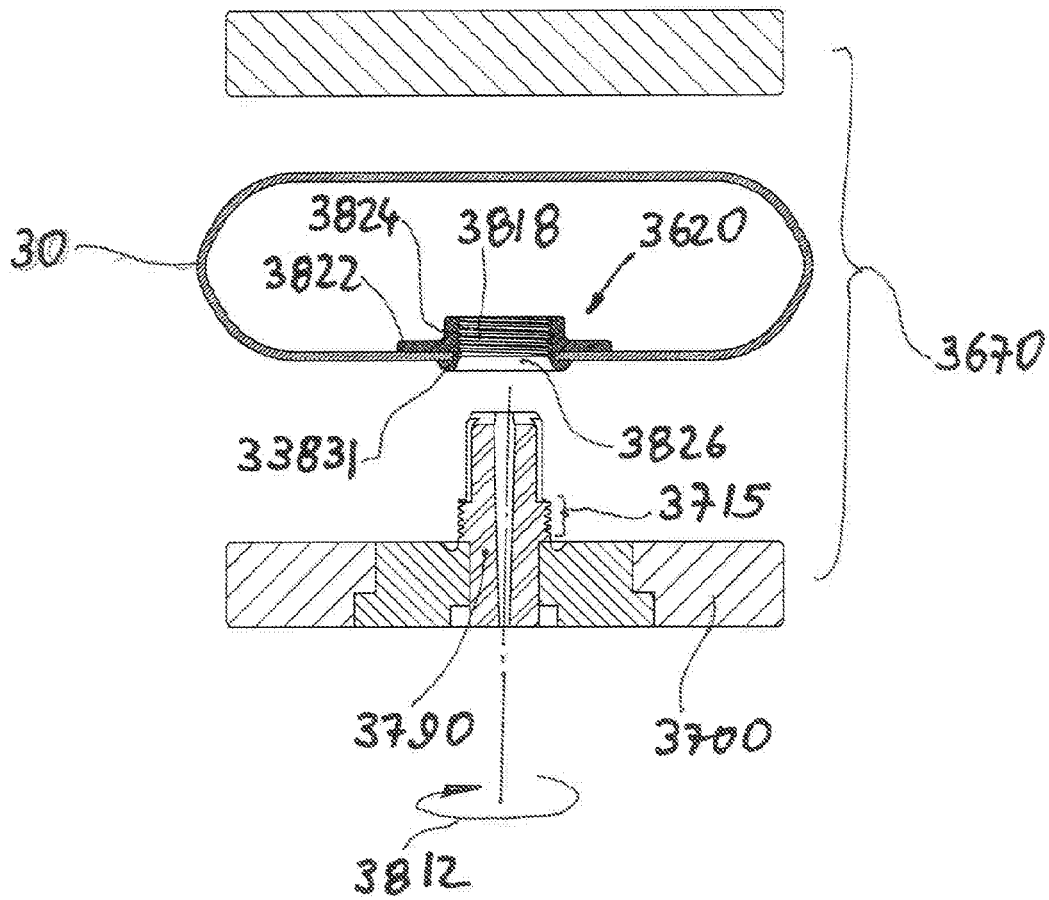

Thus for example, reference is given to FIGS. 36 to 38c. FIG. 36 is a schematic view in perspective of the configuration of second apparatus 3610 in accordance with the invention for forming connectors' brackets 3620 for irrigation laterals along a lay-flat pipe 30 which is already formed to a tubular shape. In apparatus 3610, separation means 3660 is not a flat sheet but rather a bracket assembly that is suited to be positioned inside pipe 30 and carry the "flow" of the pipe 30 wall around it (similarly to the bracket assembly that was described in Patent IL 174875 to which we pointed to above—in the "background of the invention" chapter). According to the illustrated example, pipe 30 was unloaded from a deploying assembly (that is not illustrated). The already manufactured tubular pipe is made to move, advancing around separation means 3660 (here—the bracket assembly) and after finalizing the forming of bracket 3620 there is executed rolling up anew of the pipe with the connector's bracket affixed on it, on top of rolling a new assembly (that is not illustrated). FIG. 37 is a side view in cross section of apparatus 3610 with separation means 3660 positioned inside pipe 30. FIGS. 38a to 38c constitute side views in cross section that present a continuum (sequence) of the manner of forming connector's bracket 3620 for irrigation laterals along lay-flat pipe 30 while utilizing for this purpose apparatus 3610, namely—while making use of separation means 3660 that is not in the configuration of a flat sheet (as was described above when referring to FIGS. 1 to 35), but rather in the configuration of a mechanical assembly that is suited to be positioned inside pipe 30 and to carry the advancing pipe's wall around it.

In accordance with the illustrated example, mold 3670 that serves to form bracket 3620 by injection, comprises core component 3790 that is formed at its end 3792, with at least one passage 3794 for driving the molten plastic material to flow via opening 45 that was formed at pipe 30's wall. Mold 3670 comprises also bushing assembly 3700 that is suited for installing core component 3790 in it, wherein end 3792 of core component protrudes from it. Bushing assembly 3700 is formed with a circumferential conduit 3704 on the surface area of the bushing assembly, in a manner that from the instant of installing core component 3790 in it; conduit 3704 extends around the circumference of the core component.

Terraced bracket 3724 is formed in separation means 3660 wherein it is suited to contain inside it the end 3792 of the core component. Separation means 3660 comprises an array of rotating rollers (two —3741 and 3742 are illustrated in the example), and two rollers 3743 and 3745 that are installed outside of the pipe, on the two sides of separation means 3660, that prevent skipping of the separation means that therefore, remain in the same place while the pipe's wall advances over it following after the injection step (and a continuous step by step type of manufacturing process is enabled, advancing the pipe step by step, forming a connector's bracket, and so on and so forth).

Upon closing of the mold and flattening of the pipe (see FIG. 38a), the surface area of the bushing assembly in which the conduit 3704 was formed, are suited for contact with the outer side of the one wall of pipe 30. From the instant of contact by surface area of the bushing assembly with the outer side of the one wall of the pipe and affixing the inner side of the wall to the separation means 3660, the injection cavity 3800 is delineated (defined), (see FIG. 38a). Thus, injection cavity 3800 is delineated by separation means 3660, the outer surface area of core component 3790 end, and circumferential conduit 3704.

From the instant of injecting the molten plastic material (see FIG. 38b), the circumferential edge 47 of opening 45 that protrudes wherein its lips stick out into cavity 3800 (see FIG. 38a), is found inside the molten material that is injected to fill up the cavity.

Upon retreating the mold (see FIG. 38c), bracket 3620 is left as it is formed on the one wall of the pipe, in a configuration of a bushing with a flat circumferential sector 3822 and a reed sector 3824 that protrudes from the circumferential sector into the pipe. Flat circumferential sector 3822 is affixed to the inner side of the pipe's one wall. The bushing shaped bracket 3620 is formed in addition with a circumferential edge 3831 that is affixed to the external side of the one wall of the pipe, in such a manner that opening 45 edge, which was formed in the pipe's wall before the injection, is positioned between circumferential edge 3831 and flat circumferential sector 3822. Bracket 360 is formed in addition also with central passage 3826 that connects the interior of the pipe to the external side of the pipe and enables passage of water through it.

Any professional would understand that as per the fact that, in accordance with the illustrated example, end 3792 of the core component is positioned inside bushing 3660 and at a distance from injection cavity 3800, namely—in a manner so that the molten material is made to flow in one passage or more, between the core component surface area and the bracket's surface before it enters the designated injection cavity. In light of this fact, this configuration is liable to leave the injected formed bracket 3620, with no residual material (those that will be left, if at all, are removable from the surface area core component 3790 end).

In the illustrated example, central passage 3826 of connector's bracket 3020 is formed with internal threaded sector 3818. To this end, the circumference of core component 3790 is formed with threaded sector 3715 in a manner that it forms the molten material injected to fill cavity 3800 with an inner threaded sector. Here too, the core component is suited to rotational motion during the retreating of the mold (see arrow 3812), in a manner that extracts the core component end from within bracket 3620 as it was formed by injection molding while forming inner threaded sector in (inside) it.

Any professional would understand that through (using) separation means of the bracket assembly (non-flat sheet) type, it is possible to form also bi components brackets for connectors (such as those bi components were described above when referring to FIGS. 23 to 26), and uni- or bi-components brackets as said, that would be suited for the installation of a variety of connectors on them (such as those that were described above in reference to FIGS. 11 to 22 and 27 to 32), and uni- or bi-brackets as said, that would be integrally formed also with an additional means such as for example filter means (as for example those that were described when referring to FIGS. 33a to 35).

Figure 38A:
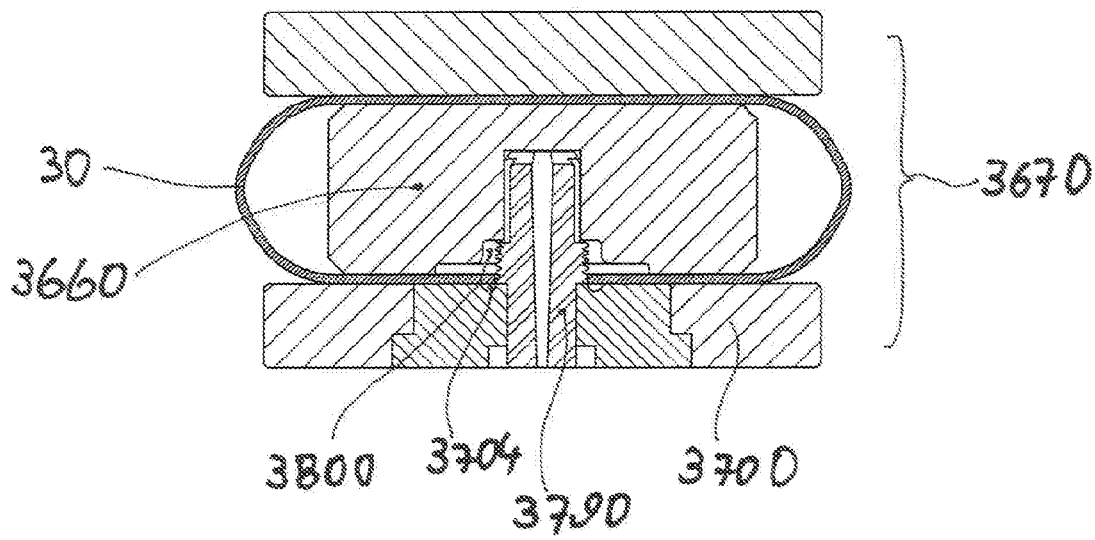

As mentioned above, increased water pressure and the change in the swelled up profile of the pipe as an outcome, are liable to exert significant stress on the bracket. Wherein the bracket is of the configuration of a bushing formed with an internal threaded sector formed along its central passage (see for example bracket 20 as depicted in FIGS. 2h, 2i, 11, 12, 13 and 14, or the bi-component bracket 2320 as depicted in FIGS. 24c, 24d, 24e, 27, 28, 29 and 30, or bracket 3620 as depicted in FIGS. 38a, 38b and 38c), those significant stress as developed upon the pipe swelling, can lead to a deformation within the threaded sector and up to a situation that hinder the ability of installing a connector with a matching external threaded sector. In order to minimize this potential phenomenon the bracket geometry may be predesign while taking into account the pipe swelling.

Reference is being made to FIGS. 39, 39a and 39b. FIG. 39 depict a top view of a connector's bracket 3920 which can be manufactured too while using an apparatus similar to the example apparatus which its parts were illustrated in FIGS. 1 and 2. In bracket 3920, the flat circumferential sector 3922 of the bushing like bracket, is formed having a shape of an ellipse or similar. The flat circumferential sector 3922 is rounded (see FIG. 39a which depict the bracket cross section along line K-K as marked in FIG. 39 and FIG. 39b that depict the bracket cross section along line L-L as marked in FIG. 39). Any professional in the field will appreciate the fact that the roundness of sector 3922 is design in accordance with the expected pattern of the lay-flat pipe diameter upon swelling into its full tubular profile. Furthermore, any professional in the field will understand that that the ellipse shape of the 3922 sector is just an example and other circumferential flat sectors shapes can be pre-designed while taking into account the expected lay-flat pipe swelled diameter in order to minimize the stress and the eventual deformation of the threaded sector while still keeping the overall height of the bracket relatively low (in order not to spoil the ability to tightly rollup the lay-flat pipe with the brackets mounted on it, in a minimum volume).

Figure 40B:
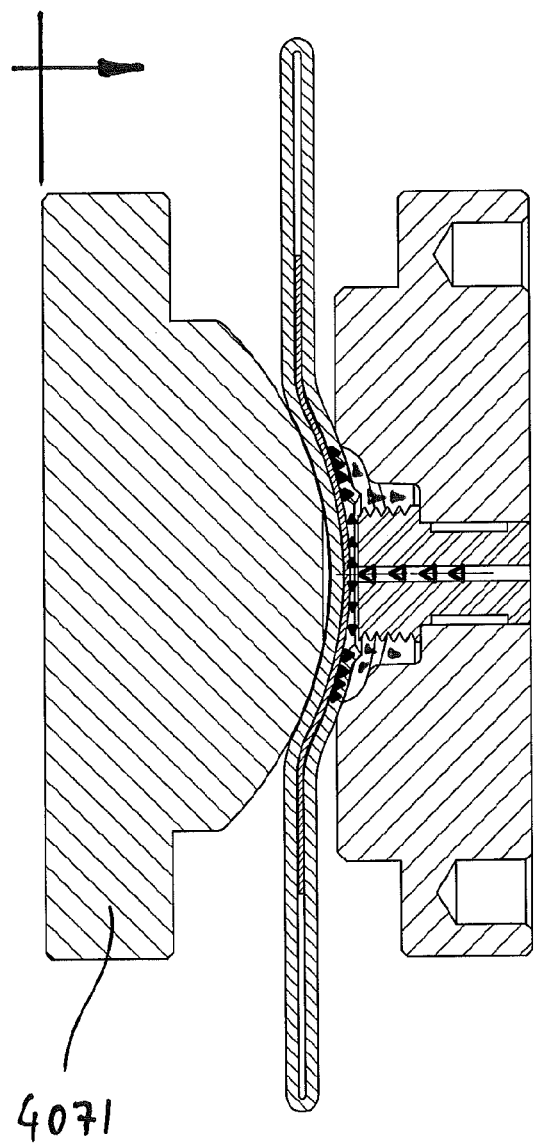
FIGS. 40a to 40c constitute side views of cross sections that present a sequence (continuum) of the manner of forming the connector's bracket illustrated in FIGS. 39, 39a and 39b, along the length of a prefabricated lay-flat pipe, while using an apparatus such as the example apparatus whose parts were illustrated in FIGS. 1 and 2.
Figure 40C:
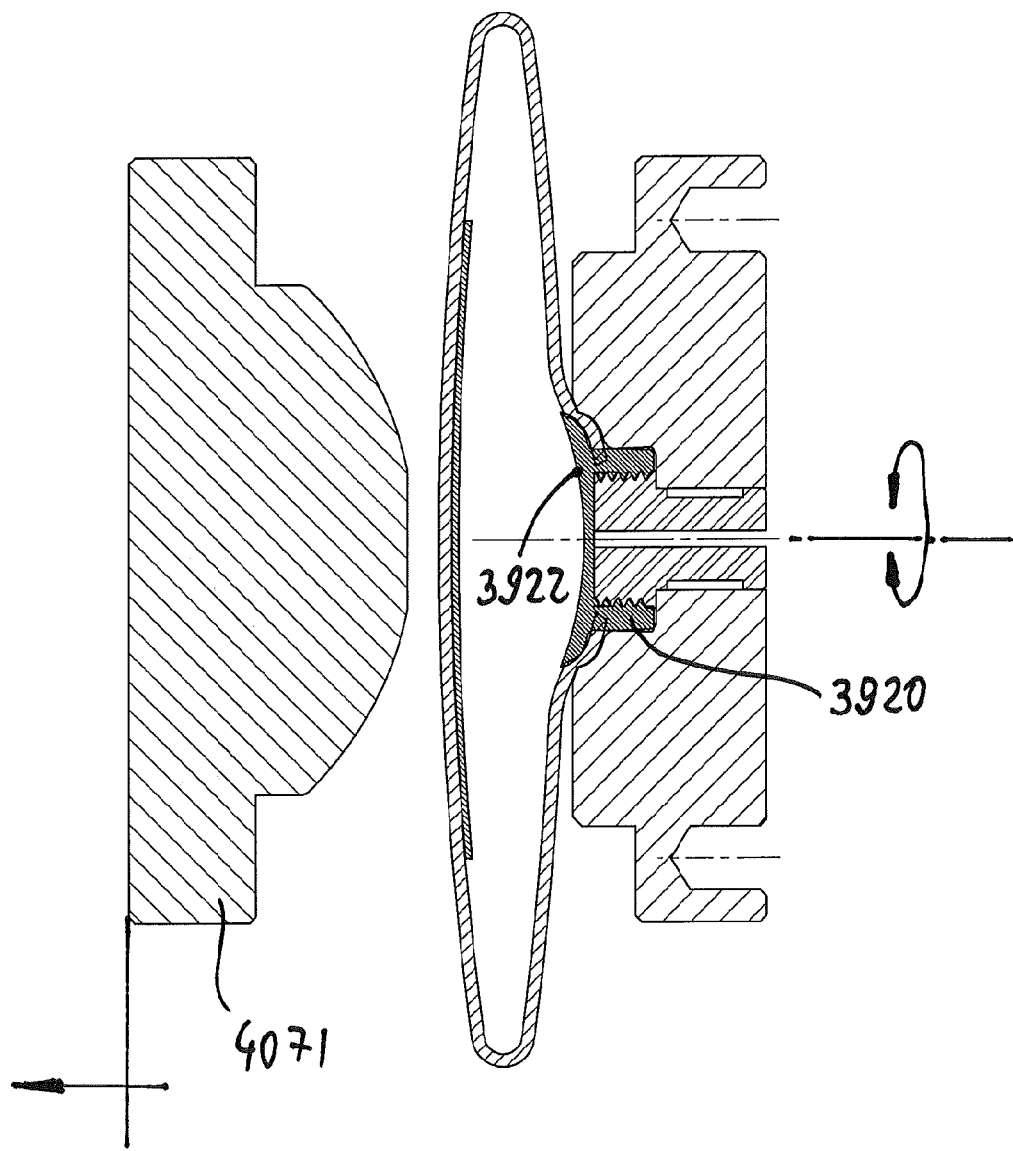
Figure 40D:
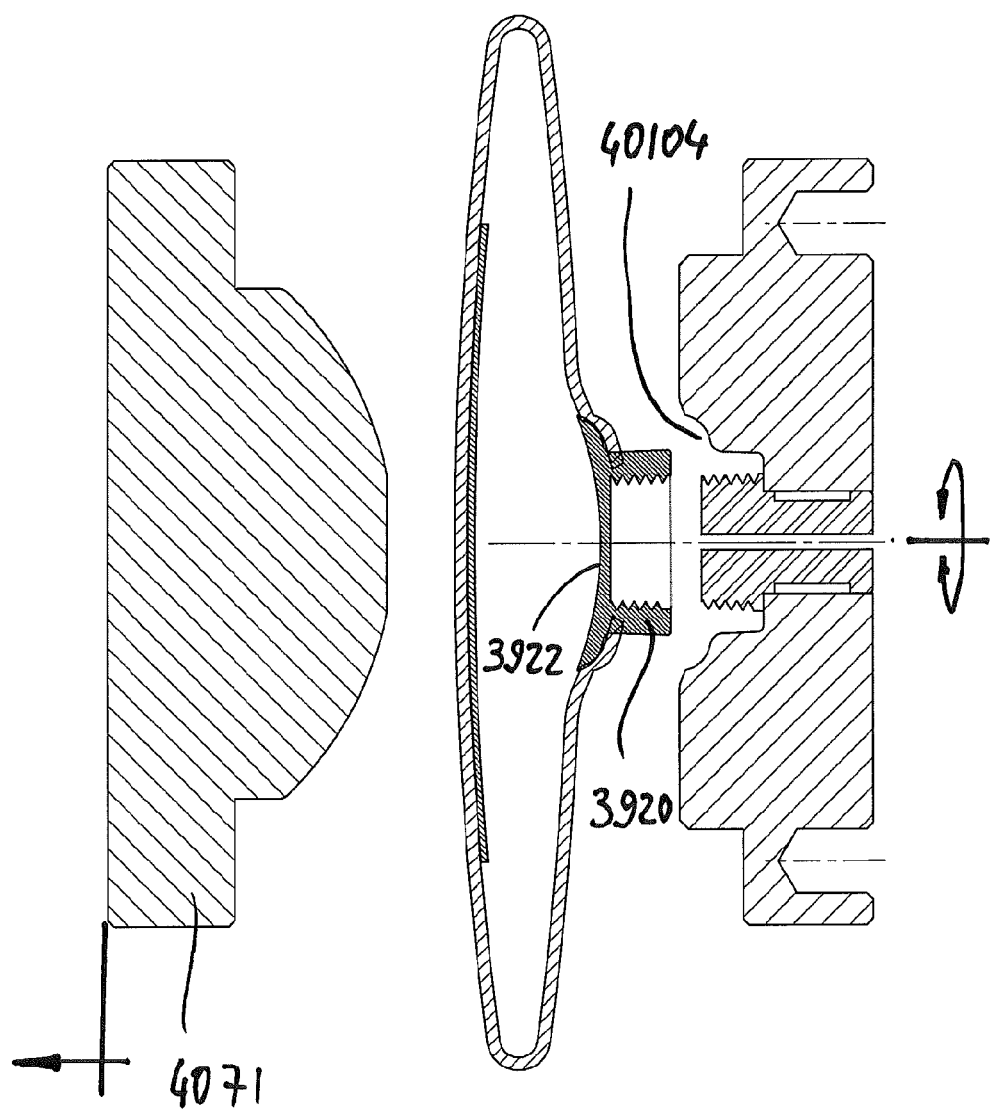

Reference is being made to FIG. 40a to 40c. the figures constitute side views of cross sections that present a sequence (continuum) of the manner of forming the connector's bracket 3920 illustrated in FIGS. 39, 39a and 39b, along the length of a prefabricated lay-flat pipe 30, while using an apparatus similar to the example apparatus which its parts were illustrated in FIGS. 1 and 2. At this stage and while compering FIGS. 40a to 40c to FIG. 2a to 2i that constitute side views of cross sections that present a sequence (continuum) of the manner of forming a connector's bracket 20 and the related description, any professional will understand that the only required modifications are the forming of mold 4070 with a rounded surface plane 4084 and rounded terraced shaped bracket 4014. A reference is being made to the formation of bracket 3920 with the longer axis of the ellipse coincide with the pipe lengthwise direction while the roundness of circumferential flat sector 3922 coincide with the radial direction of the pipe.

Thus, the invention, which is the subject matter of this patent application, provides a solution to the need of forming connectors' brackets for irrigation laterals along a lay-flat that was already formed to a tubular shape, namely—along a pipe that is already formed as a kind of a long sleeve with a cylindrical profile. There is nothing in the fact of the existence of an opposing wall and an internal space that extends along the pipe, no reason to prevent or hinder the implementability of the invention in order to form connector's brackets along the premanufactured lay-flat pipe. Furthermore, connectors' brackets that would be formed in accordance with the invention, would seal the edges of the openings at the wall of the pipe in which they were formed, and all without distracting from the capability to roll up again the pipe on a reel, this time with a connector's brackets mounted along its length.

Having described above several aspects of at least one embodiment, it is to be appreciated that various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

The invention claimed is:

1. An apparatus for forming connector brackets for irrigation laterals along a premanufactured lay-flat pipe, comprising:
   an opening formation apparatus configured to form an opening in a first wall of the lay-flat pipe, the opening having a circumferential edge;
   a positioning apparatus having an elongated nozzle sized to extend through the opening in the first wall of the lay-flat pipe and configured to position a separator inside the lay-flat pipe on a second wall of the pipe opposite the opening such that the separator is between the second wall and the first wall;
   an injection mold movable between an open state to receive the opening of the lay-flat pipe and a closed state, the mold comprising:
      at least two opposing surfaces configured to flatten the lay-flat pipe with the opening positioned opposite the separator when the mold is in the closed state;
      a core component comprising at least one passage configured for the pressured injection of a molten plastic material into a cavity formed when the mold is in the closed position, the core component positioned such that a first end of the core component is inside the opening in the first wall of the pipe when the mold is in the closed position;
   wherein the cavity is delineated by the separator, the mold, and a portion of the first wall proximate the opening such that the circumferential edge of the opening protrudes into the cavity, the cavity shaped to form a connector bracket upon injection of the molten plastic material, the bracket configured for coupling an irrigation lateral to the lay-flat pipe; and
   wherein the separator excludes the second wall of the lay-flat pipe from the cavity when the mold is in the closed position.

2. The apparatus of claim 1, wherein the separator is a sheet of material that couples with the second wall of the pipe upon contact.

3. The apparatus of claim 2:
   wherein the elongated nozzle is configured to convey the separator into contact with the second wall, the nozzle movable between outside the lay-flat pipe and inside the lay-flat pipe through the opening and towards the second wall;
   wherein the nozzle comprises a controlled vacuum mouthpiece on an end and is shaped such that the nozzle carries the separator in a converged configuration while a vacuum is applied; and
   wherein the nozzle is configured to transition the separator from the converged configuration outside the pipe to an open configuration beyond the opening to a deployed configuration on the second wall, said transitions timed with the conveyance of the separator by the positioning apparatus from outside the pipe towards the second wall inside the pipe.

4. The apparatus of claim 3, wherein the nozzle transitions the separator into the deployed configuration through a timed biasing by pressurized air delivered via the nozzle.

5. The apparatus of claim 3, wherein the nozzle further comprises an inflatable balloon positioned around the circumference of the nozzle, and wherein the nozzle transitions the separator into the deployed configuration through a timed inflation of the balloon.

6. The apparatus of claim 2, wherein the separator is a discrete disk installed inside the lay-flat pipe after the lay-flat pipe was manufactured.

7. The apparatus of claim 2, wherein the separator is an elongated strip installed inside the lay-flat pipe at the time the pipe was manufactured.

8. The apparatus of claim 1, wherein the mold further comprises:
a bushing assembly surrounding the core component and positioned such that a first end of the bushing assembly is in contact with an external side of the first wall of the pipe when the mold is in the closed position, the first end of the bushing assembly comprising a terraced bracket gap between the bushing assembly and the core component, the gap shaped like a terraced bracket around the circumference of the core component;
wherein the cavity is further delineated by a surface of the gap and an outer surface of the core component;
wherein the circumferential edge of the opening protruding into the cavity is sized to move toward the surface of the gap of the bushing assembly in response to the pressured injection of the molten plastic material such that a portion of the first wall proximate the circumferential edge is affixed to the surface of the gap while the circumferential edge is protruding into the plastic-filled cavity.

9. The apparatus of claim 8:
wherein the core component is formed around an axis extending along the length of the core component; and
wherein the bushing assembly comprises a plurality of propelled carriages movable in directions perpendicular to the axis of the core component between a closed state surrounding and proximate to the core component and an open state a distance further from the core component.

10. The apparatus of claim 8:
wherein the circumference of the core component is shaped such that the cavity formed when the mold is in the closed position comprises an internal threaded sector; and
wherein the core component is configured to rotate in a direction of the internal threaded sector as the mold moves from a closed position to an open position after the pressured injection of the molten plastic material.

11. The apparatus of claim 8, wherein the core component further comprises a circumferential array of protrusions extending from the first end such that when the mold is in the closed position the protrusions are in contact with the separator, the array of protrusions positioned such that the resulting bracket comprises a water filter to filter water passing from the lay-flat pipe to a coupled irrigation lateral.

12. The apparatus of claim 1, wherein the mold further comprises:
a bushing assembly surrounding the core component and positioned such that a first end of the bushing assembly is in contact with an external side of the first wall of the pipe when the mold is in the closed position, the first end of the bushing assembly comprising a terraced bracket gap between the bushing assembly and the core component, the gap shaped like a terraced bracket around the circumference of the core component;
wherein the terraced bracket gap is shaped to receive a prefabricated component; and
wherein the cavity is delineated in part by an internal surface and an external surface of the first wall when the mold is in the closed position such that the bracket formed after the pressured injection of the molten plastic material is a bi-components bracket.

13. The apparatus of claim 12:
wherein the opening formation apparatus is further configured to form an array of additional openings around the opening in the first wall of the pipe;
wherein the terraced bracket gap comprises an array of depressions surrounding the core component;
wherein the prefabricated component is a bushing comprising a flat circumferential sector, a reed sector extending out from the flat circumferential sector, an array of passages passing through the flat circumferential sector, and a central passage surrounding the first end of the core component;
wherein the cavity is further delineated by a surface of the terrace bracket gap, a surface of the prefabricated component, and an outer surface of the core component;
wherein each additional opening of the array of additional openings is aligned with a different depression of the array of depressions and a different passage of the array of passages such that, in response to the pressured injection, molten plastic material will pass through each of the additional openings to fill the aligned passage and depression; and
wherein the circumferential edge of the opening protruding into the cavity is sized to move toward the surface of the terrace bracket gap of the bushing assembly and the surface of the prefabricated component in response to the pressured injection of the molten plastic material such that a portion of the first wall proximate the circumferential edge is affixed to the surface of the gap and the surface of the prefabricated component while the circumferential edge is protruding into the plastic-filled cavity.

* * * * *